United States Patent
Wang et al.

(10) Patent No.: US 12,304,155 B2
(45) Date of Patent: May 20, 2025

(54) FUSION STRUCTURE, INFLATABLE PRODUCT HAVING THE FUSION STRUCTURE, MANUFACTURING METHOD THEREOF, AND RAPIDLY PRODUCED INFLATABLE PRODUCT HAVING COVERING LAYER SIMULTANEOUSLY POSITIONED WITH INFLATABLE BODY

(71) Applicant: INNOVATOR PLASTIC & ELECTRONICS (HUIZHOU) COMPANY LIMITED, Guangdong (CN)

(72) Inventors: Cheng-Chung Wang, Huizhou (CN); Chien-Hua Wang, Huizhou (CN); Yao-Hua Wang, Guangdong (CN)

(73) Assignee: INNOVATOR PLASTIC & ELECTRONICS (HUIZHOU) COMPANY LIMITED, Huizhou (HT)

( * ) Notice: Subject to any disclaimer, the term of this patent is extended or adjusted under 35 U.S.C. 154(b) by 1237 days.

(21) Appl. No.: 16/612,353

(22) PCT Filed: May 8, 2018

(86) PCT No.: PCT/CN2018/085922
§ 371 (c)(1),
(2) Date: Nov. 8, 2019

(87) PCT Pub. No.: WO2018/205910
PCT Pub. Date: Nov. 15, 2018

(65) Prior Publication Data
US 2020/0114588 A1     Apr. 16, 2020

(30) Foreign Application Priority Data

May 9, 2017 (CN) .......................... 201710321892.9

(51) Int. Cl.
*B29C 65/00* (2006.01)
*A47C 27/08* (2006.01)
(Continued)

(52) U.S. Cl.
CPC .......... *B29C 66/729* (2013.01); *A47C 27/081* (2013.01); *A47C 27/087* (2013.01);
(Continued)

(58) Field of Classification Search
CPC ......... B29D 22/02; B32B 3/266; B32B 27/12; B32B 2307/5825; B32B 3/06; B32B 3/08;
(Continued)

(56) References Cited

U.S. PATENT DOCUMENTS 2,269,342 A * 1/1942 Johnson ............... A47C 27/128
156/289
3,056,980 A * 10/1962 Holladay ............... A47C 27/10
5/710
(Continued)

*Primary Examiner* — Jasper Saberi

(57) ABSTRACT

A fusion structure, an inflatable product having the fusion structure, a manufacturing method thereof, and a rapidly produced inflatable product having a covering layer simultaneously positioned with an inflatable body are provided. The fusion structure of the inflatable product includes a fusion unit, and the fusion unit includes a target fusion layer, a first fusion reinforcement layer and a first auxiliary fusion layer which are fused together. The fusion reinforcement layer and the auxiliary fusion layer are alternately disposed at a side of the target fusion layer, while the outermost layers of two sides of the fusion unit are the target fusion layer and the auxiliary fusion layer. Alternatively, the fusion reinforcement layer and the auxiliary fusion layer are alternately disposed at two sides of the target fusion layer, while the outermost layers of two sides of the fusion unit are auxiliary fusion layers.

3 Claims, 35 Drawing Sheets

(51) Int. Cl.
*B29C 65/02* (2006.01)
*B29D 22/02* (2006.01)
*B32B 3/26* (2006.01)
*B32B 5/02* (2006.01)
*B32B 27/12* (2006.01)
*B29L 22/02* (2006.01)
*B32B 7/09* (2019.01)
*B32B 7/12* (2006.01)

(52) U.S. Cl.
CPC .............. *B29C 65/02* (2013.01); *B29C 66/41* (2013.01); *B29C 66/7232* (2013.01); *B29D 22/02* (2013.01); *B32B 3/266* (2013.01); *B32B 5/02* (2013.01); *B32B 27/12* (2013.01); *B29L 2022/02* (2013.01); *B32B 7/09* (2019.01); *B32B 7/12* (2013.01); *Y10T 428/1366* (2015.01)

(58) Field of Classification Search
CPC .. B29L 2022/02; B29C 66/723; B29C 66/439
See application file for complete search history.

(56) References Cited

U.S. PATENT DOCUMENTS

| | | | | |
|---|---|---|---|---|
| 4,823,417 | A * | 4/1989 | Fukuichi | A47C 27/087 5/655.3 |
| 6,220,629 | B1 * | 4/2001 | Wipasuramonton | B60R 21/235 280/730.2 |
| 10,631,659 | B2 * | 4/2020 | Xia | B29C 66/1122 |
| 2010/0320736 | A1 * | 12/2010 | Traber | B60R 21/235 280/743.1 |
| 2014/0083595 | A1 * | 3/2014 | LeBlanc | B29C 66/73921 156/290 |
| 2015/0157133 | A1 * | 6/2015 | Lau | B29C 66/1122 5/706 |
| 2017/0368782 | A1 * | 12/2017 | Abisror | B64B 1/08 |

* cited by examiner

FUSION STRUCTURE, INFLATABLE PRODUCT HAVING THE FUSION STRUCTURE, MANUFACTURING METHOD THEREOF, AND RAPIDLY PRODUCED INFLATABLE PRODUCT HAVING COVERING LAYER SIMULTANEOUSLY POSITIONED WITH INFLATABLE BODY

CROSS REFERENCE

This application is based on international application number pct/cn2018/085922, filed May 8, 2018, which claims the benefit of china application no. 201710321892.9, filed May 9, 2017.

BACKGROUND OF THE INVENTION

Field of the Invention

The invention relates to an inflatable product, and more particularly to a fusion structure, an inflatable product having the fusion structure, a manufacturing method thereof, and a rapidly produced inflatable product having a covering layer simultaneously positioned with an inflatable body.

Description of the Related Art

An inflatable product is lightweight, easy to store and portable. Therefore, the application of an inflatable product is wide (not only outdoor products and toys, but also household products can be inflatable products). However, the user can seldom expect a good durability of the inflatable product since an inflatable product is mostly manufactured by way of fusion. Damage to the inflatable product generally occurs at the fusion location, except that the inflatable product is cut or pierced. In order to improve the durability, resistance of the inflatable product to rupture in the fusion zone must be enhanced. Further, cutting or piercing the inflatable product becomes easier when the inflatable product bears a great pressure. Therefore, how an inflatable product is improved is a significant issue.

BRIEF SUMMARY OF THE INVENTION

To address at least one shortcoming of above-described prior art, the invention provides a fusion structure, an inflatable product having the fusion structure, a manufacturing method thereof, and a rapidly produced inflatable product having a covering layer simultaneously positioned with an inflatable body. The invention is simple in structure and is convenient to use. Further, the invention is able to greatly enhance the resistance of the inflatable product to rupture in the fusion zone, to increase stability of use of the inflatable product, to reduce weight of the inflatable product, and to reduce the cost.

To solve the above-described problems, the invention provides the following technical solutions:

A fusion structure for an inflatable product includes at least one fusion unit, and the fusion unit includes a target fusion layer, at least one first fusion reinforcement layer and at least one first auxiliary fusion layer which are fused together. The fusion reinforcement layer and the auxiliary fusion layer are alternately disposed at a side of the target fusion layer, while outermost layers of two sides of the fusion unit are the target fusion layer and the auxiliary fusion layer. Alternatively, the fusion reinforcement layer and the auxiliary fusion layer are alternately disposed at two sides of the target fusion layer, while outermost layers of two sides of the fusion unit are the auxiliary fusion layers. A material of which the target fusion layer is made is the same as or compatible with a material of which the auxiliary fusion layer is made. The fusion reinforcement layer is made of a flexible anti-stretch material having a plurality of through holes, and the way to produce the anti-stretch material includes punching, braiding, weaving and fiber pressing. Preferably, the fusion reinforcement layer is a mesh fabric. In such design, the target fusion layer and at least one auxiliary fusion layer hold at least one fusion reinforcement layer therebetween. During the fusion, the target fusion layer and the auxiliary fusion layer are melted into the through holes of the fusion reinforcement layer and are restricted by anti-stretch material which is provided at edges of the through holes, and the direction of restriction is the same as the direction of a pulling force produced by expansion of the inflatable product. It functions similar to reinforcement steels in concrete. Therefore, the ability of the fusion site to resist stretch is greatly enhanced, the ability of the inflatable product to resist pressure of inflation is relatively enhanced, and the durability of the inflatable product is improved.

The above-described fusion structure can be made into a plurality of preferred forms. In a first form, the fusion structure includes a fusion unit, the fusion unit comprises a target fusion layer, a first fusion reinforcement layer and a first auxiliary fusion layer which are sequentially arranged, and the target fusion layer, the first fusion reinforcement layer and the first auxiliary fusion layer are simultaneously connected by fusion.

In a second form, the fusion structure includes a fusion unit, the fusion unit includes a target fusion layer, a second auxiliary fusion layer, a first fusion reinforcement layer and a first auxiliary fusion layer which are sequentially arranged, and the target fusion layer, the second auxiliary fusion layer, the first fusion reinforcement layer and the first auxiliary fusion layer are simultaneously connected by fusion. The fusion structure of this form is formed by additionally providing the second auxiliary fusion layer between the target fusion layer and the first fusion reinforcement layer which are based on the fusion structure of the first form. Because the second auxiliary fusion layer is provided, the fusion structure of this form is several times higher than the fusion structure of the first form in strength.

In a third form, the fusion structure includes a fusion unit, the fusion unit includes a target fusion layer, a second auxiliary fusion layer, a first fusion reinforcement layer and a first auxiliary fusion layer which are sequentially arranged, a periphery of the second auxiliary fusion layer is connected to the target fusion layer by a first fusion, the first fusion reinforcement layer and the first auxiliary fusion layer are connected to the second auxiliary fusion layer and the target fusion layer by a second fusion, and the fusion portions formed by the first fusion and the second fusion are not overlapped. The fusion structure of this form is similar to that of the second form in structure, and the difference therebetween is that the fusion structure of this form is formed by fusion twice. The first fusion is used for connecting the periphery of the second auxiliary fusion layer and the target fusion layer together, while the second fusion is used for connecting the first fusion reinforcement layer, the first auxiliary fusion layer, the second auxiliary fusion layer and the target fusion layer.

In a fourth form, the fusion structure includes a fusion unit, the fusion unit includes a target fusion layer, a second auxiliary fusion layer, a first fusion reinforcement layer and a first auxiliary fusion layer which are sequentially arranged, the second auxiliary fusion layer is connected to the target fusion layer by a first fusion, the first fusion reinforcement layer and the first auxiliary fusion layer are connected to the second auxiliary fusion layer and the target fusion layer by a second fusion, the fusion portion formed by the first fusion is greater than that formed by the second fusion in area, and the fusion portion formed by the second fusion does not extend beyond that formed by the first fusion. The fusion structure of this form is the same as the fusion structure of the third form in structure, times of fusion and sequence of fusion, and the difference therebetween is that in the fusion structure of the third form, the fusion portions formed by the first fusion and the second fusion are not overlapped while in the fusion structure of this form, the fusion portion formed by the first fusion is greater than that formed by the second fusion in area, and the fusion portion formed by the second fusion does not extend beyond that formed by the first fusion.

In a fifth form, the fusion structure includes a fusion unit, the fusion unit includes a target fusion layer, a second fusion reinforcement layer, a second auxiliary fusion layer, a first fusion reinforcement layer and a first auxiliary fusion layer which are sequentially arranged, the second fusion reinforcement layer and the second auxiliary fusion layer are connected to the target fusion layer by a first fusion, the first fusion reinforcement layer and the first auxiliary fusion layer are connected to the second fusion reinforcement layer, the second auxiliary fusion layer and the target fusion layer by a second fusion, the fusion portion formed by the first fusion is greater than that formed by the second fusion in area, and the fusion portion formed by the second fusion does not extend beyond that formed by the first fusion. The fusion structure of this form is formed by additionally providing the second fusion reinforcement layer between the target fusion layer and the second auxiliary fusion layer based on the fusion structure of the fourth form. Because the second fusion reinforcement layer is provided, the fusion structure of this form is at least five times higher than the fusion structure of the fourth form in strength.

In a sixth form, the fusion structure includes a fusion unit, and the fusion unit includes a third auxiliary fusion layer, a third fusion reinforcement layer, a target fusion layer, a second auxiliary fusion layer, a first fusion reinforcement layer and a first auxiliary fusion layer which are sequentially arranged. The third auxiliary fusion layer, the third fusion reinforcement layer and the second auxiliary fusion layer are connected to the target fusion layer by a first fusion, the first fusion reinforcement layer and the first auxiliary fusion layer are connected to the third auxiliary fusion layer, the third fusion reinforcement layer, the second auxiliary fusion layer and the target fusion layer by a second fusion, the fusion portion formed by the first fusion is greater than that formed by the second fusion in area, and the fusion portion formed by the second fusion does not extend beyond that formed by the first fusion.

In a seventh form, the fusion structure includes a first fusion unit and a second fusion unit. The first fusion unit includes a target fusion layer, a first fusion reinforcement layer and a first auxiliary fusion layer which are sequentially arranged. The target fusion layer, the first fusion reinforcement layer and the first auxiliary fusion layer are connected by a first fusion. The second fusion unit is the same as the first fusion unit in structure. The first fusion unit and the second fusion unit are connected by a second fusion. The first auxiliary fusion layer of the first fusion unit is attached to the first auxiliary fusion layer of the second fusion unit. The fusion portion formed by the first fusion is greater than that formed by the second fusion in area. The fusion portion formed by the second fusion does not extend beyond the fusion portion formed by the first fusion. Actually, the fusion structure of this form is formed by two fusion structures of the first form fused together. The fusion structure of this form has the greatest strength among the above-described fusion structures.

The invention further provides various inflatable products including the above-described fusion structures, described as follows.

In a first form, an inflatable product includes a top sheet and a bottom sheet, and peripheries of the top sheet and the bottom sheet are connected by any of the fusion structures of the first, second, third, fourth, fifth and sixth forms. An air chamber is formed between the top sheet and the bottom sheet. The top sheet is the target fusion layer of the fusion structure, and the bottom sheet is the first auxiliary fusion layer of the fusion structure.

In a second form, an inflatable product includes a top sheet and a bottom sheet, and peripheries of the top sheet and the bottom sheet are connected by the fusion structure of the seventh form. An air chamber is formed between the top sheet and the bottom sheet. The top sheet is the target fusion layer of the first fusion unit, and the bottom sheet is the target fusion layer of the second fusion unit.

In a third form, an inflatable product includes a top sheet and a bottom sheet, and peripheries of the top sheet and the bottom sheet are directly fused. A plurality of linear fusion sites formed by any of the fusion structures of the first, second, third, fourth, fifth and sixth forms are provided between the top sheet and the bottom sheet. The fusion sites are arranged to form a plurality of spaces between the top sheet and the bottom sheet into air chambers with a predetermined shape. The top sheet is the target fusion layer of the fusion structure, and the bottom sheet is the first auxiliary fusion layer of the fusion structure.

In a fourth form, an inflatable product includes a top sheet and a bottom sheet, and peripheries of the top sheet and the bottom sheet are directly fused. A plurality of linear fusion sites which are formed by the fusion structure of the seventh form are provided between the top sheet and the bottom sheet. The fusion sites are arranged to form a plurality of spaces between the top sheet and the bottom sheet into air chambers with a predetermined shape. The top sheet is the target fusion layer of the first fusion unit, and the bottom sheet is the first auxiliary fusion layer of the second fusion unit.

In a fifth form, an inflatable product includes a top sheet, a plurality of tensioning strips and a bottom sheet. Peripheries of the top sheet and the bottom sheet are directly fused, and the tensioning strips are connected to inner surfaces of the top sheet and the bottom sheet by any of the fusion structures of the first, second, third, fourth, fifth and sixth forms. The top sheet and the bottom sheet are the target fusion layer of the fusion structure, and the tensioning strips are the first fusion reinforcement layer of the fusion structure.

In a sixth form, an inflatable product includes a top sheet, a periphery sheet, a plurality of tensioning strips and a bottom sheet. Two sides of the periphery sheet are directly connected to peripheries of the top sheet and the bottom sheet by ww forming an air chamber, and the tensioning strips are connected to inner surfaces of the top sheet and the bottom sheet by any of the fusion structures of the first, second, third, fourth, fifth and sixth forms. The top sheet and the bottom sheet are the target fusion layer of the fusion structure, and the tensioning strips are the first fusion reinforcement layer of the fusion structure.

In a seventh form, an inflatable product includes a top sheet, a periphery sheet, a plurality of tensioning strips and a bottom sheet. Two sides of the periphery sheet are connected to peripheries of the top sheet and the bottom sheet by any of the fusion structures of the first, second, third, fourth, fifth and sixth forms for forming an air chamber. The top sheet and the bottom sheet are the target fusion layer of the fusion structure, and the periphery sheet is the first auxiliary fusion layer of the fusion structure. The tensioning strips are connected to inner surfaces of the top sheet and the bottom sheet by fusion.

In an eighth form, an inflatable product includes a top sheet, a periphery sheet, a plurality of tensioning strips and a bottom sheet. Two sides of the periphery sheet are connected to peripheries of the top sheet and the bottom sheet by the fusion structure of the seventh form for forming an air chamber. The top sheet and the bottom sheet are the target fusion layer of the first fusion unit of the fusion structure, and the periphery sheet is the target fusion layer of the second fusion unit of the fusion structure. The tensioning strips are connected to inner surfaces of the top sheet and the bottom sheet by fusion.

Further, the tensioning strips of the inflatable products of the third and fourth forms can be classified into two categories according to the structure thereof and the fusion way that the tensioning strips are connected to the inner surfaces of the top sheet and the bottom sheet. A first category is that the tensioning strips are connected to the inner surfaces of the top sheet and the bottom sheet by any of the fusion structures of the first, second, third, fourth, fifth and sixth forms. The top sheet and the bottom sheet are the target fusion layer of the fusion structure, and the tensioning strips are the first fusion reinforcement layer of the fusion structure.

A second category is that each of the tensioning strips includes a strip body, and the strip body is fused with the inner surfaces of the top sheet and the bottom sheet at a location where the first auxiliary fusion piece and the second auxiliary fusion piece are provided to hold and fuse with the strip body. The strip body is made of a flexible anti-stretch material having a plurality of through holes, and the strip body is a mesh fabric. The first auxiliary fusion piece and the second auxiliary fusion piece are made of the same material as the auxiliary fusion layer of the above-described fusion structure. Alternatively, the first auxiliary fusion piece or the second auxiliary fusion piece is fixed to a side of the strip body.

Further, the tensioning strips are arranged between the top sheet and the bottom sheet in a serration pattern, and most of the teeth of the serration pattern are trapezoidal or triangular.

Further, the inner surfaces of the top sheet and the bottom sheet can be directly connected to the tensioning strips by fusion. Alternatively, a variety of auxiliary structures can be provided at the locations where the inner surfaces of the top sheet and the bottom sheet are connected to the tensioning strips. A first auxiliary structure is a third auxiliary fusion piece which is provided at the location where at least one of the outer surfaces and the inner surfaces of the top sheet and the bottom sheet fuses with the tensioning strips. A second auxiliary structure is a first auxiliary reinforcement piece and a third auxiliary fusion piece which are provided at the location where at least one of the outer surfaces and inner surfaces of the top sheet and the bottom sheet fuses with the tensioning strips. The first auxiliary reinforcement piece is attached to at least one of the outer surfaces and the inner surfaces of the top sheet and the bottom sheet, and the third auxiliary fusion piece is placed over the first auxiliary reinforcement piece. The auxiliary structure can directly fuse with at least one of the outer surfaces and the inner surfaces of the top sheet and the bottom sheet, and then the tensioning strips are connected thereto by fusion. Alternatively, the auxiliary structure is kept in position and then the tensioning strips are fused with the auxiliary structure and at least one of the outer surfaces and the inner surfaces of the top sheet and the bottom sheet. A third auxiliary structure is a fiber glue layer which has a plurality of through holes and is applied to the location where at least one of outer surfaces and the inner surfaces of the top sheet and the bottom sheet fuses with the tensioning strips. The third auxiliary fusion piece is made of a material which is the same as or compatible with the auxiliary fusion layer of the above-described fusion structure. The first auxiliary reinforcement piece is made of a material which is the same as or compatible with the fusion reinforcement layer of the above-described fusion structure.

Further, a thickness of the top sheet and the bottom sheet without the fusion structure is equal to or is smaller than one-third of a thickness of the top sheet and the bottom sheet with the fusion structure which is formed by including the auxiliary fusion layer but excluding the fusion reinforcement layer. The fusion structure can greatly enhance the ability of the inflatable product to resist stretch at the fusion locations. Thus, there is no need to thicken the top sheet and the bottom sheet of the inflatable product. Also, the cost and the weight of the inflatable product can be decreased.

The invention further provides a method for manufacturing the tensioning strips of the second category described above, wherein the method includes the following steps:

In step S1, a roll of mesh fabric is loaded and unrolled to a predetermined length.

In step S2, a roll of the first auxiliary fusion piece and a roll of the second auxiliary fusion piece are cut into strips and the strips are sent and positioned at predetermined locations on an upper side and a lower side of the mesh fabric. Alternatively, a roll of the first auxiliary fusion piece or a roll of the second auxiliary fusion piece is cut into strips and the strips are sent and positioned on a side of the mesh fabric.

In step S3, the strips cut from the first auxiliary fusion piece and the second auxiliary fusion piece are placed to hold the mesh fabric and fuse with the mesh fabric. Alternatively, the strips cut from the first auxiliary fusion piece or the second auxiliary fusion piece are fixed to a side of the mesh fabric.

In step S4, the mesh fabric which fuses with the strips cut from the first auxiliary fusion piece and the second auxiliary fusion piece is cut into strips for obtaining tensioning strips. Alternatively, the mesh fabric, a side of which has the strips cut from the first auxiliary fusion piece or the second auxiliary fusion piece attached thereto, is cut into strips for obtaining the tensioning strips.

An alternative method for manufacturing the tensioning strips includes the following steps:

In step S1, a roll of mesh fabric is loaded and unrolled.

In step S2, the mesh fabric is cut into strips for obtaining the strip body.

In step S3, the first auxiliary fusion piece and the second auxiliary fusion piece are respectively sent and positioned at predetermined locations on an upper side and a lower side of the strip body. Alternatively, the first auxiliary fusion piece or the second auxiliary fusion piece is sent and positioned at predetermined location on a side of the strip body.

In step S4, the first auxiliary fusion piece and the second auxiliary fusion piece are placed to hold the strip body and fuse with the strip body for obtaining the tensioning strips. Alternatively, the first auxiliary fusion piece or the second auxiliary fusion piece is fixed to a side of the strip body for obtaining the tensioning strips.

The present embodiment further provide a method for manufacturing the above-described inflatable product of the seventh or eighth form including the tensioning strips of the second category. The method includes following steps.

In step S1, rolls of the top sheet and the bottom sheet are loaded, unrolled and kept in position.

In step S2, the tensioning strips, which are manufactured by the above-described method, are sent and positioned at predetermined locations between the top sheet and the bottom sheet.

In step S3, the parts of the tensioning strips which have the first auxiliary fusion pieces and the second auxiliary fusion pieces thereon are fused with the inner surfaces of the top sheet and the bottom sheet. Alternatively, the parts of the tensioning strips, a side of which has the first auxiliary fusion pieces or the second auxiliary fusion pieces fixed thereto, are fused with the inner surfaces of the top sheet and the bottom sheet.

In step S4, the sides of the periphery sheet are connected to the peripheries of the top sheet and the bottom sheet by any of the fusion structures described in the first, second, third, fourth, fifth and sixth forms for forming the air chamber and obtaining the inflatable product.

Alternatively, the method for manufacturing the inflatable product includes the following steps:

In step S1, rolls of the top sheet and the bottom sheet are loaded and unrolled and kept in position.

In step S2, the third auxiliary fusion pieces are fused with the outer surfaces or the inner surfaces of the top sheet and the bottom sheet at predetermined locations where the tensioning strips are going to fuse with the top sheet and the bottom sheet.

In step S3, the tensioning strips which are manufactured by the above-described method are sent and kept at the predetermined locations between the top sheet and the bottom sheet.

In step S4, the parts of the tensioning strips having the first auxiliary fusion pieces and the second auxiliary fusion pieces thereon are fused with the parts of the inner surfaces of the top sheet and the bottom sheet having the third auxiliary fusion pieces thereon. Alternatively, the parts of the tensioning strips, each of which has the first auxiliary fusion piece or the second auxiliary fusion piece fixed to a side thereof, are fused with the parts of the inner surfaces of the top sheet and the bottom sheet which have the third auxiliary fusion pieces fixed thereto.

In step S5, the sides of the periphery sheet are connected to the peripheries of the top sheet and the bottom sheet by any of the fusion structures described in the first, second, third, fourth, fifth, sixth and seventh forms for forming the air chamber and obtaining the inflatable product.

Further alternatively, a method for manufacturing the inflatable product includes the following steps:

In step S1, rolls of the top sheet and the bottom sheet are loaded, unrolled and kept in position.

In step S2, the first auxiliary reinforcement pieces and the third auxiliary fusion pieces are placed on the outer surfaces or the inner surfaces of the top sheet and the bottom sheet at predetermined locations where the top sheet and the bottom sheet are going to fuse with the tensioning strips, wherein the first auxiliary reinforcement pieces and the third auxiliary fusion pieces are only kept in position without fusing with the top sheet and the bottom sheet.

In step S3, the tensioning strips which are manufactured by the above-described method are sent and positioned at predetermined locations between the top sheet and the bottom sheet.

In step S4, the parts of the tensioning strips which have the first auxiliary fusion pieces and the second auxiliary fusion pieces thereon are fused with the parts of the inner surfaces of the top sheet and the bottom sheet which have the first auxiliary reinforcement pieces and the third auxiliary fusion pieces thereon. Alternatively, the parts of the tensioning strips, each of which has the first auxiliary fusion piece or the second auxiliary fusion piece fixed to a side thereof, are fused with the parts of the inner surfaces of the top sheet and the bottom sheet which have the third auxiliary fusion pieces fixed thereto.

In step S5, the sides of the periphery sheet are connected to the peripheries of the top sheet and the bottom sheet by any of the fusion structures described in the first, second, third, fourth, fifth, sixth and seventh forms for forming the air chamber and obtaining the inflatable product.

Yet further alternatively, a method for manufacturing the inflatable product includes following steps:

In step S1, rolls of the top sheet and the bottom sheet are loaded, unrolled and kept in position.

In step S2, the first auxiliary reinforcement pieces and the third auxiliary fusion pieces are placed on the outer surfaces or the inner surfaces of the top sheet and the bottom sheet at predetermined locations where the top sheet and the bottom sheet are going to fuse with the tensioning strips, and the first auxiliary reinforcement pieces and the third auxiliary fusion pieces are fused with the inner surfaces of the top sheet and the bottom sheet.

In step S3, the tensioning strips which are manufactured by the above-described method are sent and positioned at predetermined locations between the top sheet and the bottom sheet.

In step S4, the parts of the tensioning strips which have the first auxiliary fusion pieces and the second auxiliary fusion pieces thereon are fused with the parts of the inner surfaces of the top sheet and the bottom sheet which have the first auxiliary reinforcement pieces and the third auxiliary fusion pieces thereon. Alternatively, the parts of the tensioning strips, each of which has the first auxiliary fusion piece or the second auxiliary fusion piece fixed to a side thereof, are fused with the parts of the inner surfaces of the top sheet and the bottom sheet which have the first auxiliary reinforcement pieces and the third auxiliary fusion pieces thereon.

In step S5, the sides of the periphery sheet 10 are connected to the peripheries of the top sheet 8 and the bottom sheet 9 by any of the fusion structures described in the first, second, third, fourth, fifth, sixth and seventh forms for forming the air chamber and obtaining the inflatable product.

Further alternatively, a method for manufacturing the inflatable product includes the following steps:

In step S1, rolls of the top sheet and the bottom sheet are loaded, unrolled and kept in position.

In step S2, a fiber glue layer which has a plurality of through holes is formed on the outer surfaces or the inner surfaces of the top sheet and the bottom sheet at predetermined locations where the top sheet and the bottom sheet are going to fuse with the tensioning strips.

In step S3, the tensioning strips which are manufactured by the above-described method are sent and positioned at predetermined locations between the top sheet and the bottom sheet.

In step S4, the parts of the tensioning strips which have the first auxiliary fusion pieces and the second auxiliary fusion pieces thereon are fused with the parts of the inner surfaces of the top sheet and the bottom sheet which have the fiber glue layer formed thereon, wherein the fiber glue layer has through holes. Alternatively, the parts of the tensioning strips, each of which has the first auxiliary fusion piece or the second auxiliary fusion piece fixed to a side thereof, are fused with the parts of the inner surfaces of the top sheet and the bottom sheet which have the fiber glue layer formed thereon, wherein the fiber glue layer has through holes.

In step S5, the sides of the periphery sheet are connected to the peripheries of the top sheet and the bottom sheet by any of the fusion structures described in the first, second, third, fourth, fifth, sixth and seventh forms for forming the air chamber and obtaining the inflatable product.

The invention further provides various inflatable products rapidly produced and provided with covering layers simultaneously positioned with inflatable bodies, described as follows.

The inflatable product of a first form includes at least one inflatable body, and the inflatable body is provided with a fusion portion formed thereon. An anti-stretch sheet is disposed outside or within the inflatable body for covering the inflatable body or being covered by the inflatable body. The anti-stretch sheet is provided with a fusion portion formed thereon. The fusion portion of the inflatable body and the fusion portion of the anti-stretch sheet are fixed to each other.

The inflatable body is made of an airtight polymer material, such as plastic film (different kinds of plastic films can be selected according to different products, e.g. polyvinyl chloride, PVC). The anti-stretch sheet is made of an anti-stretch material, such as fabric, net (mesh fabric), and threads (weaving mesh). When the anti-stretch sheet covers the inflatable body, the inflatable body is prevented from being excessively expanded because of excessive pressure. When the anti-stretch sheet covers the inflatable body, the load bearing capacity of the inflatable body is improved. It is understood that the anti-stretch sheet is a material that can prevent the inflatable body from rupture because of excessive pressure, and the inflatable body is restricted thereby.

The inflatable body is capable of sealing air therein, and the anti-stretch sheet is capable of restricting the inflatable body. Generally, the materials of the inflatable body and the anti-stretch sheet are different. When the fusion portions of the inflatable body and the anti-stretch sheet are fused together, the connection therebetween is liable to failure. Therefore, the fusion portion of the anti-stretch sheet has penetrability, and the material of the inflatable body is melted into through holes of the anti-stretch sheet during the fusion and is restricted by the through holes. The direction of restriction is the same as the direction of pulling force produced by expansion of the inflatable product during inflation. It is similar to reinforcement steels in concrete, and therefore ability of the fusion portion to resist stretch is greatly enhanced.

The inflatable body can be entirely or partly covered by the anti-stretch sheet. Similarly, the anti-stretch sheet body can be entirely or partly covered by the inflatable body.

"To fix" or "to be fixed" described in this specification is for purposes of formation of an airtight inflatable body after the fusion portions are firmly connected. "To fix" or "to be fixed" can be done by various ways which include fusion, joining, pressing, hot pressing, gluing, sewing, means of Velcro, latching and so on.

For improving the ability of the fusion portion to resist stretch, the inflatable product further includes at least one airtight auxiliary fusion layer configured to fix to the fusion portions of the inflatable body and the anti-stretch sheet. The material of the airtight auxiliary fusion layer is the same as or compatible with the material of the inflatable body. During the fusion, material of the airtight auxiliary fusion layer is melted into the through holes, so that the ability of the fusion portion to resist stretch is further improved.

The fusion portions of the airtight auxiliary fusion layer and the anti-stretch sheet are placed in contact with each other and firmly connected. The airtight auxiliary fusion layer is adjacent to the anti-stretch sheet, so that the material thereof is easier to enter the through holes.

The inflatable product further includes at least one fusion reinforcement layer configured to fix to the fusion portions of the inflatable body and the anti-stretch sheet. The fusion reinforcement layer is capable of improving the strength of the fusion portion, so as to prevent rupture.

The fusion reinforcement layer is made of an anti-stretch material, and/or the structure of the fusion reinforcement layer is the same as that of the anti-stretch sheet. The fusion reinforcement layer is placed in contact with and is fixed to the fusion portion of the inflatable product and/or the airtight auxiliary fusion layer. The fusion reinforcement layer is adjacent to the fusion portion of the inflatable body or the airtight auxiliary fusion layer. The material of the inflatable body is easily melted into the through holes of the fusion reinforcement layer and kept therein.

Formation of penetrability can be done by various ways which includes punching, weaving, threads and forming spaces between fibers.

The fusion portions can be formed to be right-angled, bent, curved, beveled, stacked, annular, circular, elliptical, triangular or flat.

The inflatable body can include an assembly of columns, a bed body, a seat, a deckchair, a cushion body, a concave body, a box-shaped body, a boat-shaped body, a skateboard body or an airtight body.

The inflatable product of a second form includes at least one inflatable body, and the inflatable body is provided with a fusion structure formed thereon. The fusion structure includes a first fusion unit and a second fusion unit which are fixed to each other. The first fusion unit and/or the second fusion unit is fixed in a way that two airtight auxiliary fusion layers are placed to hold a fusion portion of an anti-stretch sheet and are then fixed to a fusion potion of the inflatable body.

The inflatable product of a third form includes at least one inflatable body, and the inflatable body is provided with a fusion structure formed thereon. The fusion structure includes a first fusion unit and a second fusion unit which are fixed to each other. The first fusion unit and/or the second fusion unit is fixed in a way that an airtight auxiliary fusion layer or a fusion reinforcement layer is fixed to a fusion portion of an anti-stretch sheet by sewing and is then fixed to a fusion potion of the inflatable body. The fusion potion of the inflatable body is in contact with the airtight auxiliary fusion layer or the fusion reinforcement layer.

The inflatable product of a fourth form includes at least one inflatable body, and the inflatable body is provided with a fusion structure formed thereon. The fusion structure includes a first fusion unit and a second fusion unit which are fixed to each other. The first fusion unit and/or the second fusion unit is fixed in a way that an airtight auxiliary fusion layer or a fusion reinforcement layer is fixed to a fusion portion of an anti-stretch sheet by sewing, and the airtight auxiliary fusion layer or the fusion reinforcement layer is fixed to another airtight auxiliary fusion layer and then fixed to a fusion potion of the inflatable body. The fusion potion of the inflatable body is in contact with the airtight auxiliary fusion layer.

The inflatable product of a fifth form includes at least one inflatable body, and the inflatable body is provided with a fusion structure formed thereon. The fusion structure includes a first fusion unit and a second fusion unit which are fixed to each other. The first fusion unit and/or the second fusion unit is fixed in a way that a portion of a fusion reinforcement layer is wrapped by a cloth and is then fixed to a fusion portion of an anti-stretch sheet by sewing. Two airtight auxiliary fusion layers are placed to hold the unwrapped portion of the fusion reinforcement layer (not wrapped by the cloth) and are then fixed to a fusion portion of the inflatable body. The fusion potion of the inflatable body is in contact with the airtight auxiliary fusion layers.

Comparing to the prior art, the invention has following advantages:

1. The fusion structure of the invention is that the target fusion layer and at least one auxiliary fusion layer are fused together with at least one fusion reinforcement layer held therebetween. During the fusion, the target fusion layer and the auxiliary fusion layer are melted into the through holes of the fusion reinforcement layer and are restricted by an anti-stretch material at an edge of the through holes, and the direction of restriction is the same as the direction of pulling force produced by expansion of the inflatable body during inflation. It is similar to reinforcement steels in concrete. Therefore, ability of the inflatable body to resist stretch at the fusion site is greatly enhanced. That is, ability of the inflatable body to resist pressure of inflation is relatively enhanced, so as to improve the durability of the inflatable product.
2. It is required that an inflatable product is not liable to rupture at the fusion location. Therefore, the top sheet and the bottom sheet of the conventional inflatable product are thickened, so that the ability of the inflatable product to resist stretch at the fusion location can meet the requirement. The fusion structure of the invention can greatly improve the ability of the inflatable product to resist stretch at the fusion location, so that thickening the top sheet and the bottom sheet of the inflatable product is not necessary. Therefore, the cost can be saved, and the weight of the inflatable product can be decreased.
3. The anti-stretch sheet of the application covers or is covered by the inflatable body. When the pressure in the air chamber formed by the inflatable body is excessive, the anti-stretch sheet restricts the inflatable body, thereby improving the ability of the inflatable body to resist pressure and preventing rupture.
4. In the product of the invention, the fusion portion of the inflatable body, the fusion portion of the anti-stretch sheet, and the fusion portion of the airtight auxiliary fusion layer (or the fusion portion of the fusion reinforcement layer) can be simultaneously fixed at the same location, and the inflatable body and the covering layer (one of them covers or is covered by the other) are positioned with respect to each other by fusion.

DETAILED DESCRIPTION OF THE INVENTION

Figure 1:
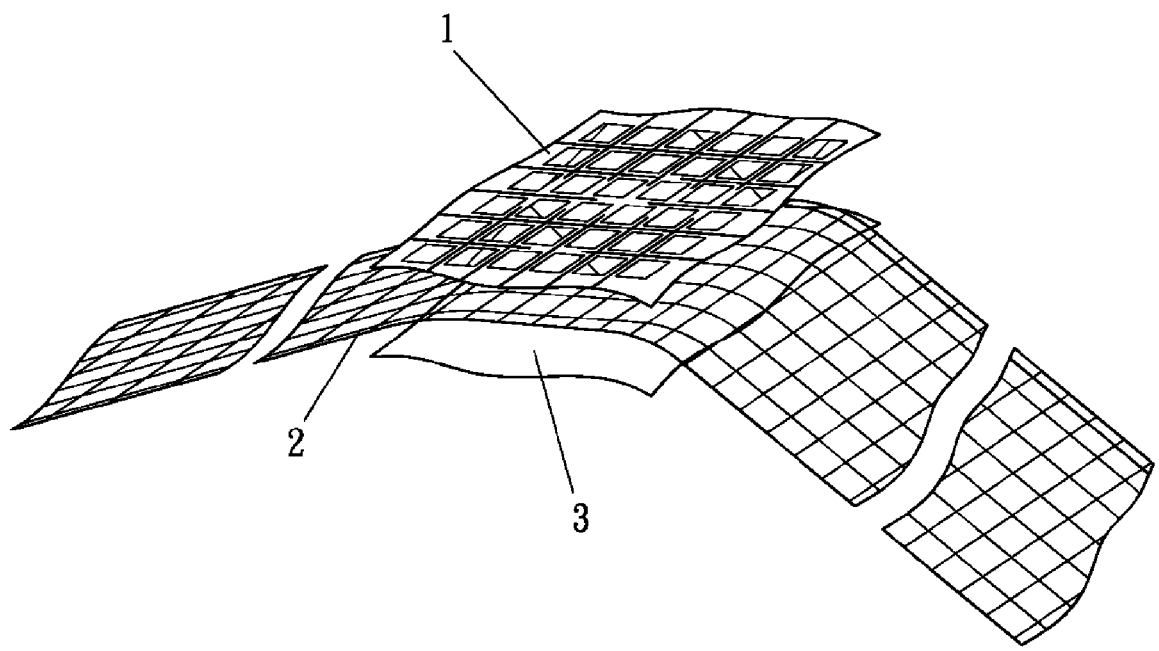
FIG. 1 is a schematic view of a first embodiment.

The drawings are for purposes of illustration only and are not to be construed as limiting the scope of the invention. For better description of the embodiments, some parts of the drawings may be omitted, enlarged or reduced, and do not represent the actual product size. It will be apparent to those skilled in the art that some known structures in the drawings and the descriptions thereof may be omitted. The position relationship shown in the drawings are for purposes of illustration only and are not to be construed as limiting the scope of the invention.

First Embodiment

Figure 2:
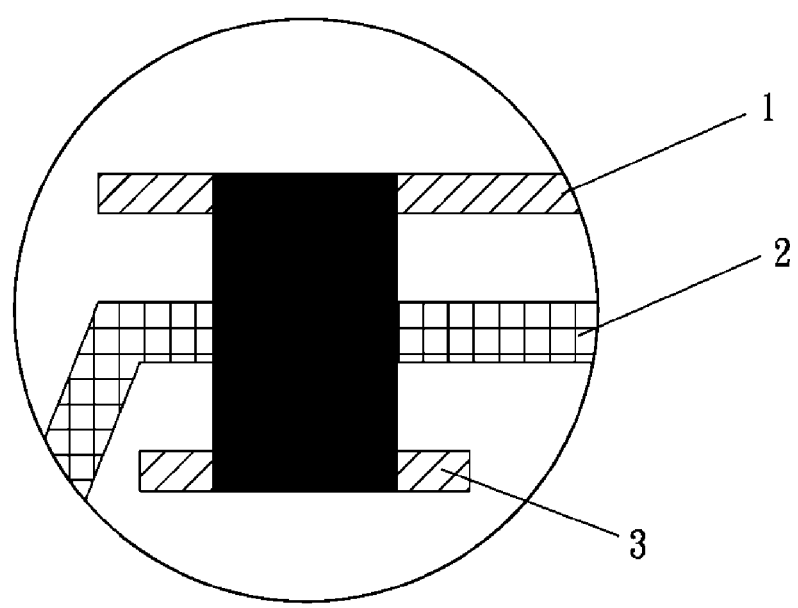
FIG. 2 is a schematic view of the first embodiment.

Referring to FIGS. 1 and 2, a fusion structure of an inflatable product includes a fusion unit, and the fusion unit includes a target fusion layer 1, a first fusion reinforcement layer 2 and a first auxiliary fusion layer 3 which are sequentially arranged. The target fusion layer 1, the first fusion reinforcement layer 2 and the first auxiliary fusion layer 3 are connected together by a single fusion. The target fusion layer 1 is made of an airtight polymer material (e.g. plastic sheet) and can be used as surface material (e.g. top sheet, bottom sheet or periphery sheet) of the inflatable product. The first fusion reinforcement layer 2 is made of a flexible anti-stretch material (e.g. mesh fabric) having a plurality of through holes and is configured to restrict or resist the pulling forces produced by expansion of the inflatable product. It is worth noting that since the materials of the target fusion layer 1 and the first fusion reinforcement layer 2 are different, the target fusion layer 1 and the first fusion reinforcement layer 2 cannot be directly fused together. The first auxiliary fusion layer 3 is made of the same material as the target fusion layer 1, and therefore the first auxiliary fusion layer 3 and the target fusion layer 1 can be fused together. In other words, the first auxiliary fusion layer 3 not only can be used as a surface material (e.g. top sheet, bottom sheet or periphery sheet) of the inflatable product, but also enables connection of the first fusion reinforcement layer 2 to the target fusion layer 1 during the fusion.

Second Embodiment

Figure 3:
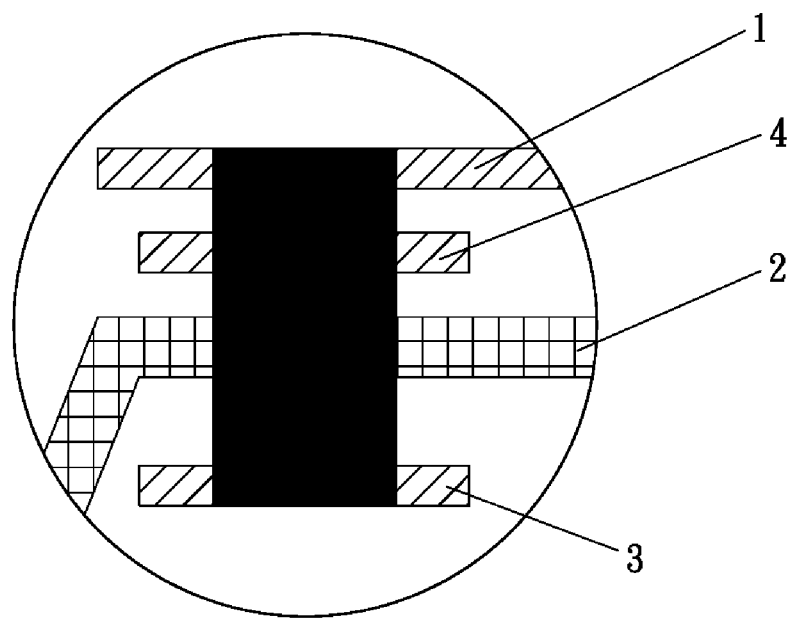
FIG. 3 is a schematic view of a second embodiment.

Referring to FIG. 3, a fusion structure of an inflatable product includes a fusion unit, and the fusion unit includes a target fusion layer 1, a second auxiliary fusion layer 4, a first fusion reinforcement layer 2 and a first auxiliary fusion layer 3 which are sequentially arranged. The target fusion layer 1, the second auxiliary fusion layer 4, the first fusion reinforcement layer 2 and the first auxiliary fusion layer 3 are connected together by a single fusion. The fusion structure of this form is formed by additionally providing the second auxiliary fusion layer 4 between the target fusion layer 1 and the first fusion reinforcement layer 2 of the fusion structure of the first embodiment. Because the second auxiliary fusion layer 4 is provided, the fusion structure of this form is several times higher than the fusion structure of the first embodiment in strength. The second auxiliary fusion layer 4 functions the same as the first auxiliary fusion layer 3 described in the first embodiment.

Third Embodiment

Figure 4:
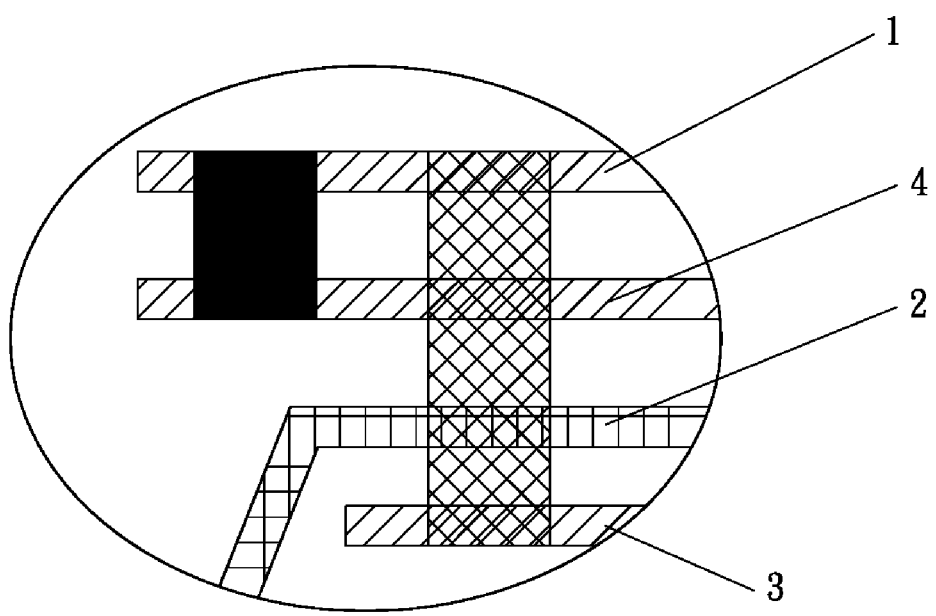
FIG. 4 is a schematic view of a third embodiment.

Referring to FIG. 4, a fusion structure of an inflatable product includes a fusion unit, and the fusion unit includes a target fusion layer 1, a second auxiliary fusion layer 4, a first fusion reinforcement layer 2 and a first auxiliary fusion layer 3 which are sequentially arranged. A periphery of the second auxiliary fusion layer 4 is connected to the target fusion layer 1 by a first fusion, and the first fusion reinforcement layer 2 and the first auxiliary fusion layer 3 are connected to the second auxiliary fusion layer 4 and the target fusion layer 1 by a second fusion, wherein the fusion portions formed by the first fusion and the second fusion are not overlapped. The fusion structure of this form is similar to the fusion structure described in the second embodiment, and the difference therebetween is that the fusion structure of this form is formed by twice fusion. The first fusion is done for connecting the periphery of the second auxiliary fusion layer 4 and the target fusion layer 1, and the second fusion is done for connecting the first fusion reinforcement layer 2, the first auxiliary fusion layer 3, the second auxiliary fusion layer 4 and the target fusion layer 1.

Fourth Embodiment

Figure 5:
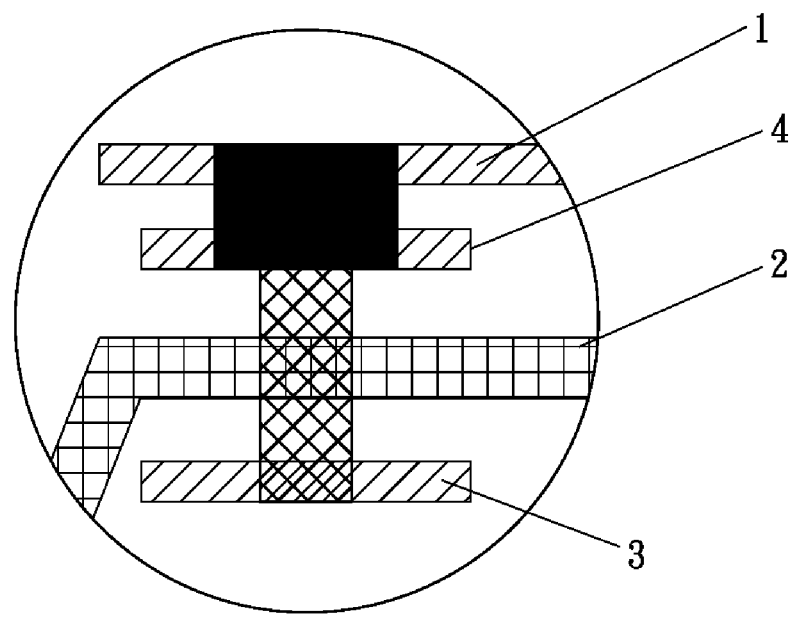
FIG. 5 is a schematic view of a fourth embodiment.

Referring to FIG. 5, a fusion structure of an inflatable product includes a fusion unit, and the fusion unit includes a target fusion layer 1, a second auxiliary fusion layer 4, a first fusion reinforcement layer 2 and a first auxiliary fusion layer 3 which are sequentially arranged. The second auxiliary fusion layer 4 is connected to the target fusion layer 1 by a first fusion, the first fusion reinforcement layer 2 and the first auxiliary fusion layer 3 are connected to the second auxiliary fusion layer 4 and the target fusion layer 1 by a second fusion, wherein a fusion portion formed by the first fusion is greater than that of the second fusion in area, and the fusion portion formed by the second fusion does not extend beyond that formed by the first fusion. The fusion structure of this form is the same as the fusion structure described in the third embodiment in structure, times of fusion and sequence of fusion, and the difference therebetween is that in the fusion structure of the third embodiment, the fusion portions formed by the first fusion and the second fusion are not overlapped while in the fusion structure of this form, the fusion portion formed by the first fusion is greater than that formed by the second fusion in area, and the fusion portion formed by the second fusion does not extend beyond that formed by the first fusion.

Fifth Embodiment

Figure 6:
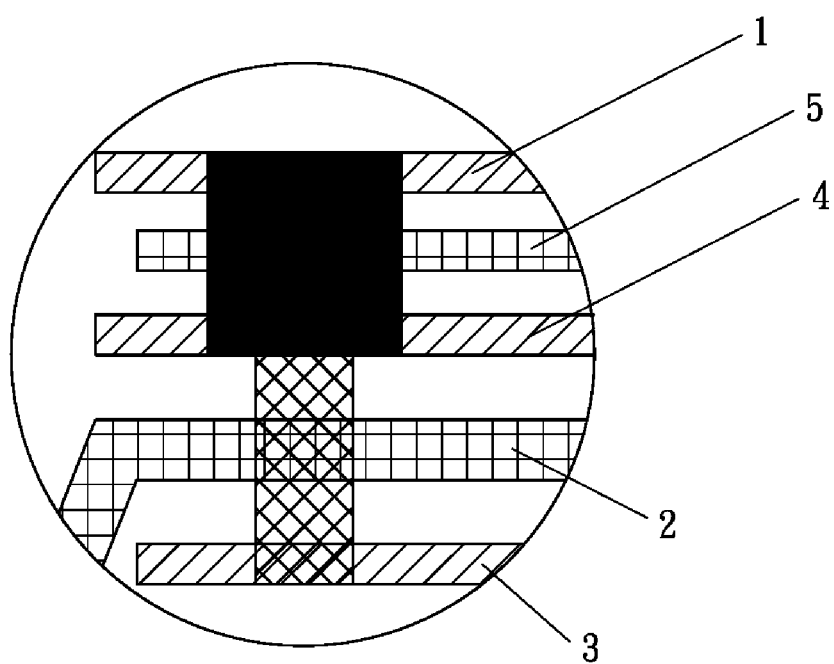
FIG. 6 is a schematic view of a fifth embodiment.

Referring to FIG. 6, a fusion structure of an inflatable product includes a fusion unit, and the fusion unit includes a target fusion layer 1, a second fusion reinforcement layer 5, a second auxiliary fusion layer 4, a first fusion reinforcement layer 2 and a first auxiliary fusion layer 3 which are sequentially arranged. The second fusion reinforcement layer 5 and the second auxiliary fusion layer 4 are connected to the target fusion layer 1 by a first fusion, and the first fusion reinforcement layer 2 and the first auxiliary fusion layer 3 are connected to the second fusion reinforcement layer 5, the second auxiliary fusion layer 4 and the target fusion layer 1 by a second fusion, wherein a fusion portion formed by the first fusion is greater than that formed by the second fusion in area, and the fusion portion formed by the second fusion does not extend beyond that formed by the first fusion. The fusion structure of this form is formed by additionally providing the second fusion reinforcement layer 5 between the target fusion layer 1 and the second auxiliary fusion layer 4 of the fusion structure of the fourth embodiment. Because the second fusion reinforcement layer 5 is provided, the fusion structure of this form is at least five times higher than the fusion structure of the fourth embodiment in strength. The second fusion reinforcement layer 5 functions the same as the first fusion reinforcement layer 2 described in the first embodiment.

Sixth Embodiment

Figure 7:
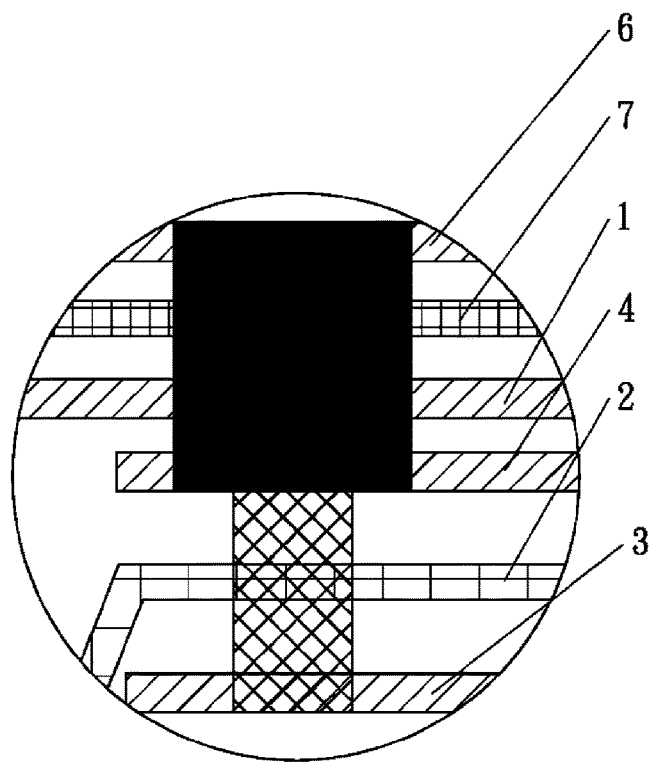
FIG. 7 is a schematic view of a sixth embodiment.

Referring to FIG. 7, a fusion structure of an inflatable product includes a fusion unit, and the fusion unit includes a third auxiliary fusion layer 6, a third fusion reinforcement layer 7, a target fusion layer 1, a second auxiliary fusion layer 4, a first fusion reinforcement layer 2 and a first auxiliary fusion layer 3 which are sequentially arranged. The third auxiliary fusion layer 6, the third fusion reinforcement layer 7 and the second auxiliary fusion layer 4 are connected to the target fusion layer 1 by a first fusion, and the first fusion reinforcement layer 2 and the first auxiliary fusion layer 3 are connected to the third auxiliary fusion layer 6, the third fusion reinforcement layer 7, the second auxiliary fusion layer 4 and the target fusion layer 1 by a second fusion, wherein a fusion portion formed by the first fusion is greater than that formed by the second fusion in area, and the fusion portion formed by the second fusion does not extend beyond that formed by the first fusion. The third auxiliary fusion layer 6 functions the same as the first auxiliary fusion layer 3 described in the first embodiment, and the third fusion reinforcement layer 7 functions the same as the first fusion reinforcement layer 2 described in the first embodiment.

Seventh Embodiment

Figure 8:
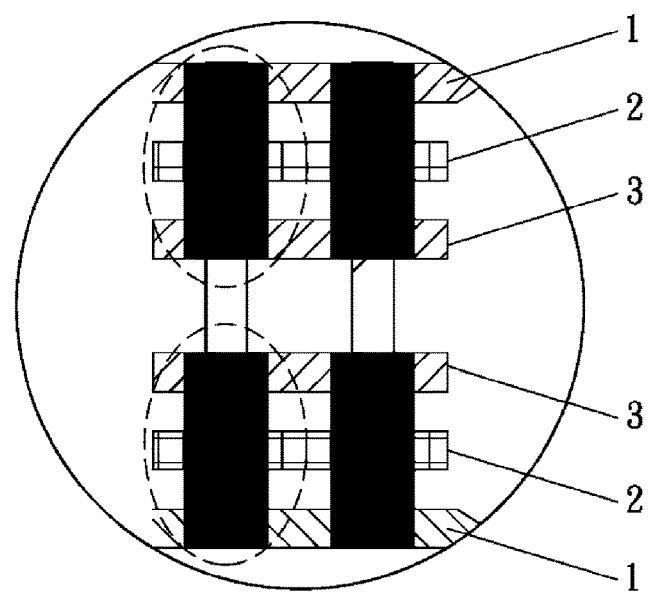
FIG. 8 is a schematic view of a seventh embodiment.
Figure 8A:
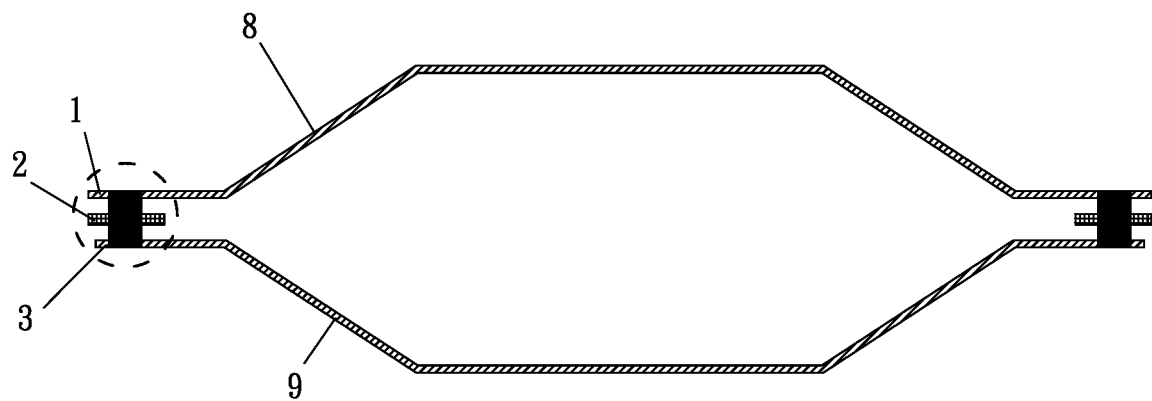
FIG. 8A is a schematic view of an eighth embodiment wherein an inflatable product includes a top sheet and a bottom sheet, the peripheries of which are fused by the fusion structure described in the first embodiment.
Figure 8B:
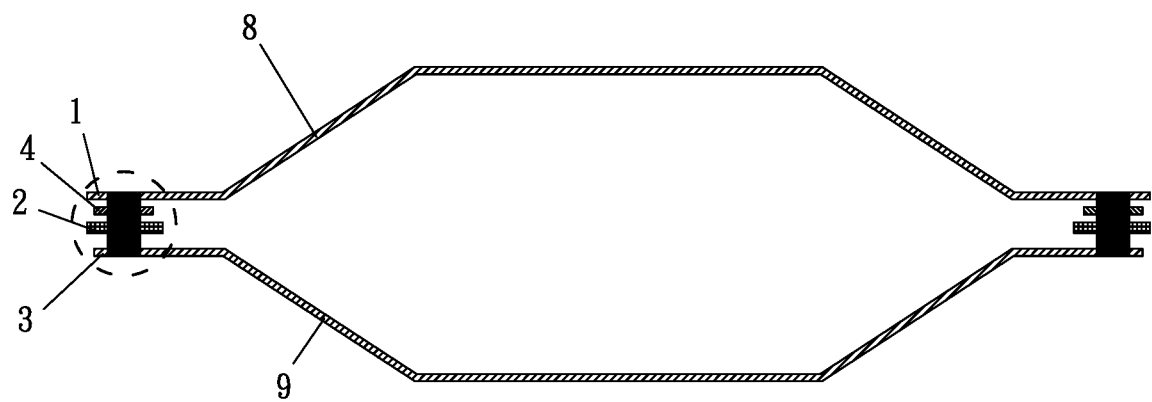
FIG. 8B is a schematic view of an eighth embodiment wherein an inflatable product includes a top sheet and a bottom sheet, the peripheries of which are fused by the fusion structure described in the second embodiment.
Figure 8C:
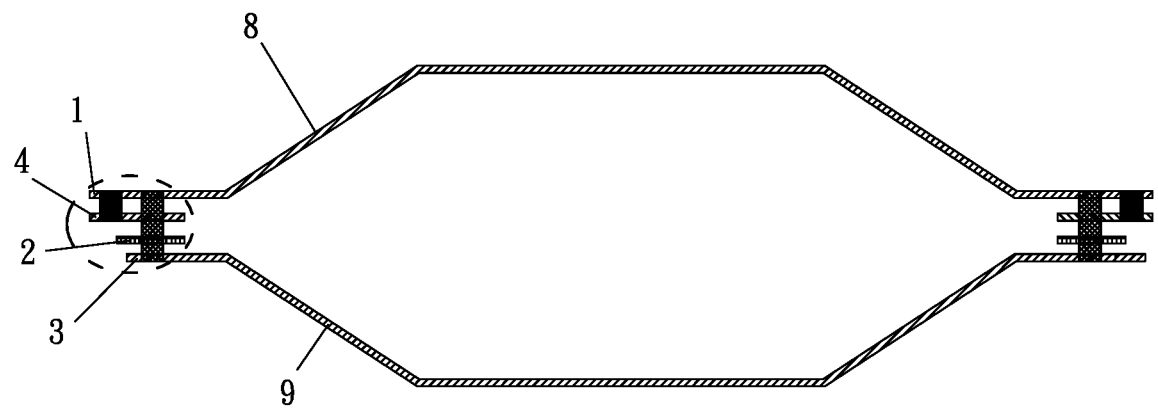
FIG. 8C is a schematic view of an eighth embodiment wherein an inflatable product includes a top sheet and a bottom sheet, the peripheries of which are fused by the fusion structure described in the third embodiment.
Figure 8D:
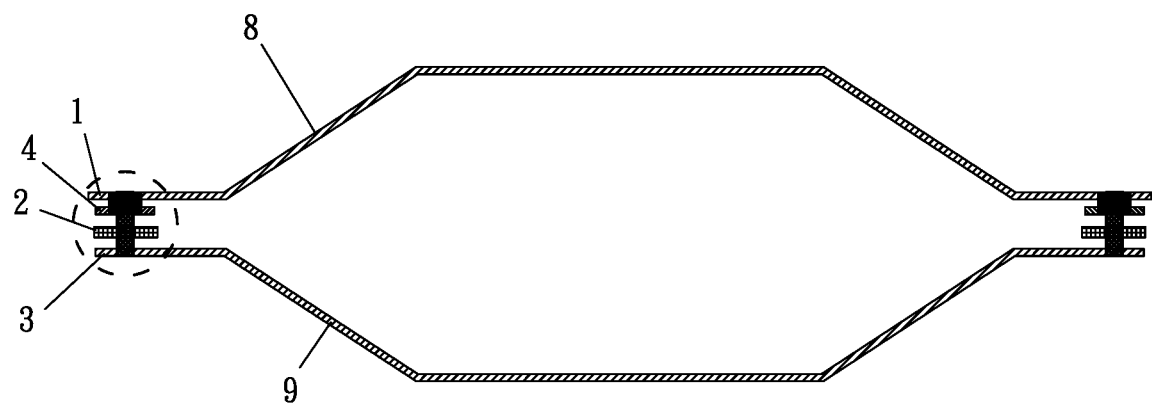
FIG. 8D is a schematic view of an eighth embodiment wherein an inflatable product includes a top sheet and a bottom sheet, the peripheries of which are fused by the fusion structure described in the fourth embodiment.
Figure 8E:
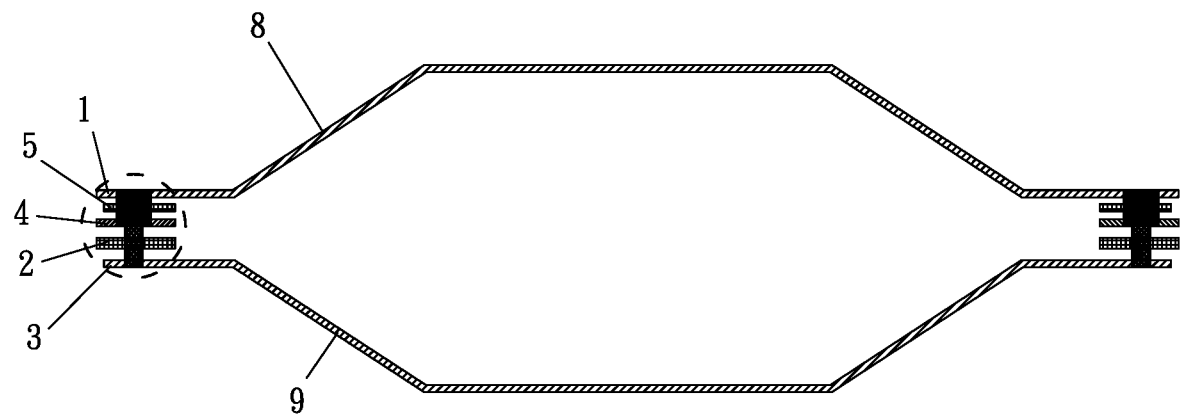
FIG. 8E is a schematic view of an eighth embodiment wherein an inflatable product includes a top sheet and a bottom sheet, the peripheries of which are fused by the fusion structure described in the fifth embodiment.
Figure 8F:
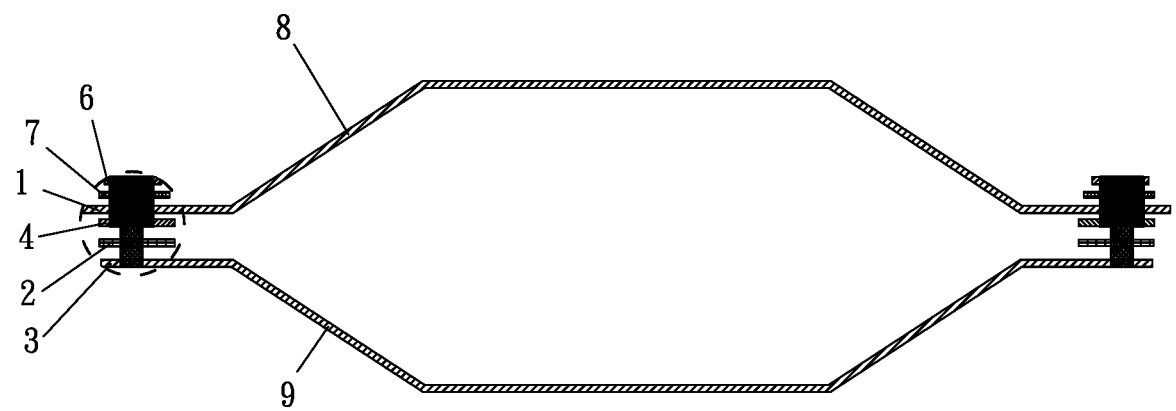
FIG. 8F is a schematic view of an eighth embodiment wherein an inflatable product includes a top sheet and a bottom sheet, the peripheries of which are fused by the fusion structure described in the sixth embodiment.

Referring to FIG. 8, a fusion structure of an inflatable product includes a first fusion unit and a second fusion unit. The first fusion unit includes a target fusion layer 1, a first fusion reinforcement layer 2 and a first auxiliary fusion layer 3 which are sequentially arranged. The target fusion layer 1, the first fusion reinforcement layer 2 and the first auxiliary fusion layer 3 are connected by a first fusion. The second fusion unit is same as the first fusion unit in structure, and the first fusion unit and the second fusion unit are connected by a second fusion. The first auxiliary fusion layer 3 of the first fusion unit is attached to the first auxiliary fusion layer 3 of the second fusion unit. A fusion portion formed by the first fusion is greater than that formed by the second fusion in area, and the fusion portion formed by the second fusion does not extend beyond that formed by the first fusion. Actually, the fusion structure of this form is formed by fusing two fusion structures described in the first embodiment. The fusion structure of this form has the greatest strength among the above-described fusion structures.

Eighth Embodiment

An inflatable product includes a top sheet 8 and a bottom sheet 9, and peripheries of the top sheet 8 and the bottom sheet 9 are fused by any of the fusion structures described in the first, second, third, fourth, fifth and sixth embodiments, respectively shown in FIGS. 8A, 8B, 8C, 8D, 8E and 8F. An air chamber is formed between the top sheet 8 and the bottom sheet 9. The top sheet 8 can be regarded as the target fusion layer 1 of the fusion structure, and the bottom sheet 9 can be regarded as the first auxiliary fusion layer 3 of the fusion structure.

Ninth Embodiment

Figure 9:
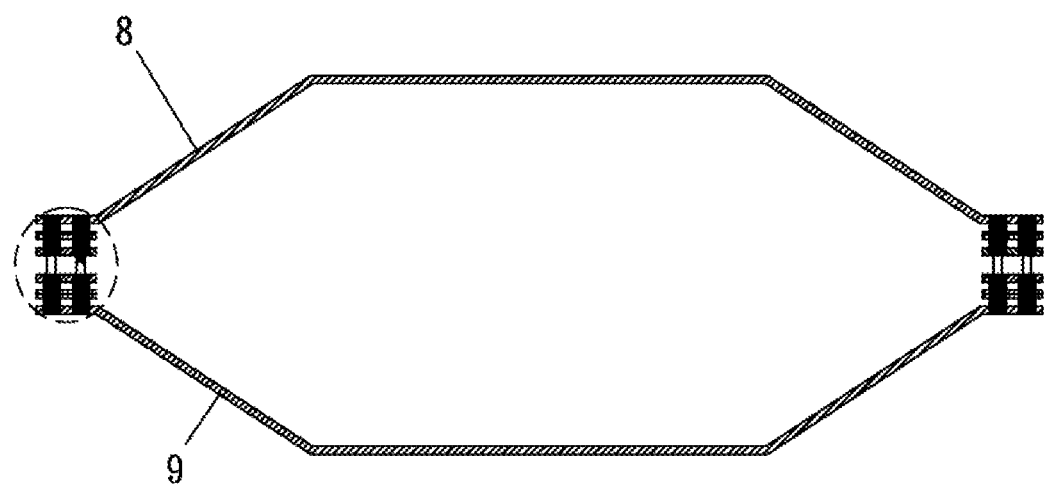
FIG. 9 is a schematic view of a ninth embodiment.

Referring to FIG. 9, an inflatable product includes a top sheet 8 and a bottom sheet 9, and peripheries of the top sheet 8 and the bottom sheet 9 are fused by the fusion structure described in the seventh embodiment. An air chamber is formed between the top sheet 8 and the bottom sheet 9. The top sheet 8 can be regarded as the target fusion layer 1 of the first fusion unit, and the bottom sheet 9 can be regarded as the target fusion layer 1 of the second fusion unit.

Tenth Embodiment

Figure 10:
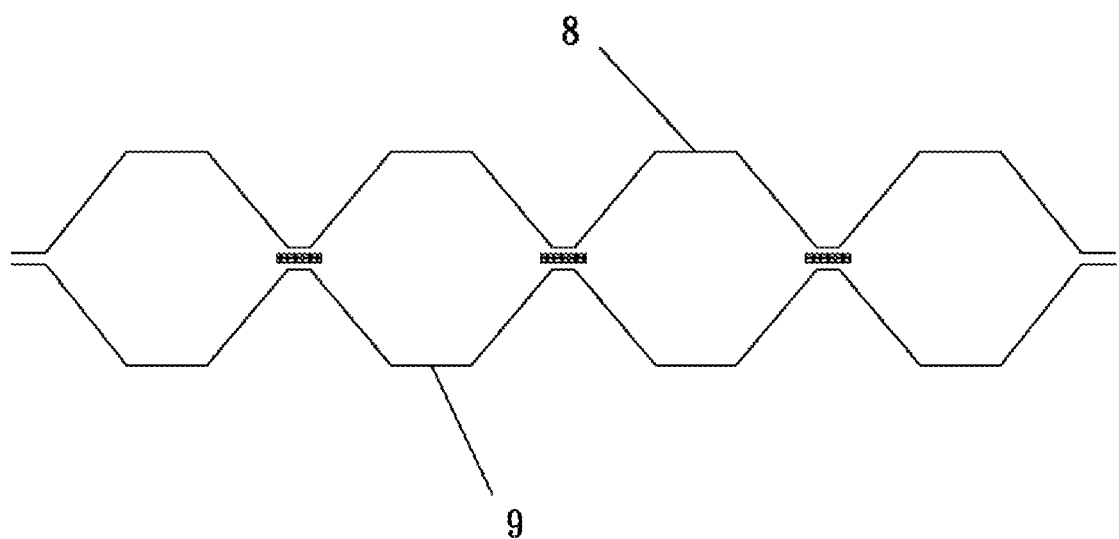
FIG. 10 is a schematic view of a tenth embodiment.

Referring to FIG. 10, an inflatable product includes a top sheet 8 and a bottom sheet 9, and peripheries of the top sheet 8 and the bottom sheet 9 are directly fused to form a plurality of linear fusion sites where the fusion structures described in the first, second, third, fourth, fifth and sixth embodiments are formed. The fusion sites are arranged to form a plurality of spaces between the top sheet 8 and the bottom sheet 9 into air chambers with a predetermined shape. The top sheet 8 can be regarded as the target fusion layer 1 of the fusion structure, and the bottom sheet 9 can be regarded as the first auxiliary fusion layer 3 of the fusion structure.

Eleventh Embodiment

Figure 11:
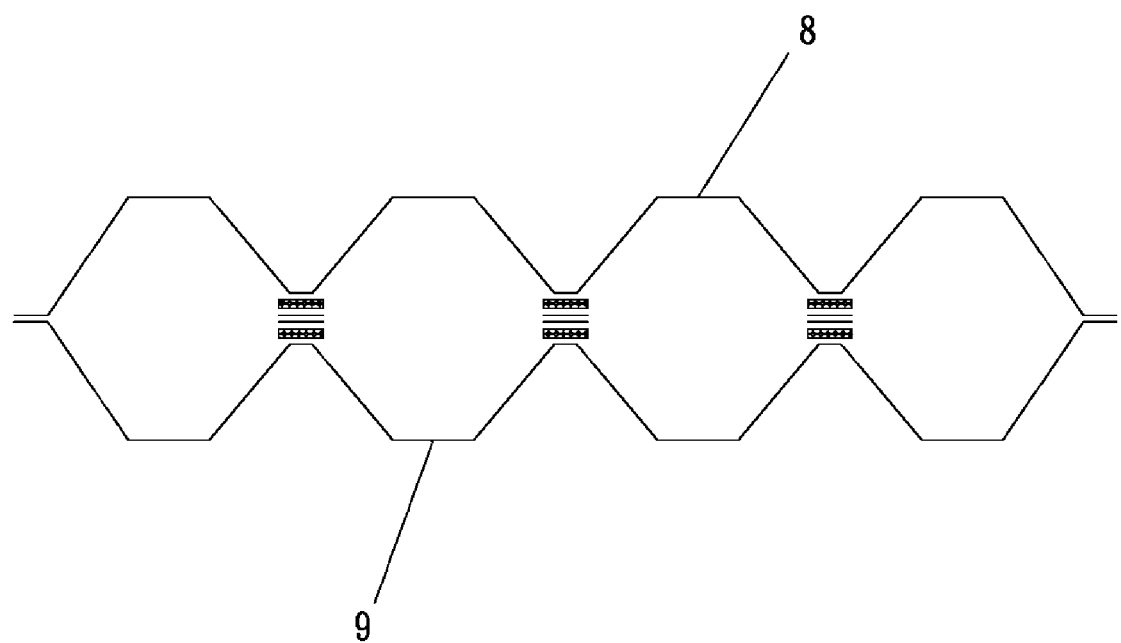
FIG. 11 is a schematic view of an eleventh embodiment.

Referring to FIG. 11, an inflatable product includes a top sheet 8 and a bottom sheet 9, and peripheries of the top sheet 8 and the bottom sheet 9 are directly fused to form a plurality of linear fusion sites where the fusion structure described in the seventh embodiment are formed. The fusion sites are arranged so that a plurality of spaces formed between the top sheet 8 and the bottom sheet 9 are air chambers with a predetermined shape. The top sheet 8 can be regarded as the target fusion layer 1 of the first fusion unit, and the bottom sheet 9 can be regarded as the first auxiliary fusion layer 3 of the second fusion unit.

Twelfth Embodiment

Figure 12:
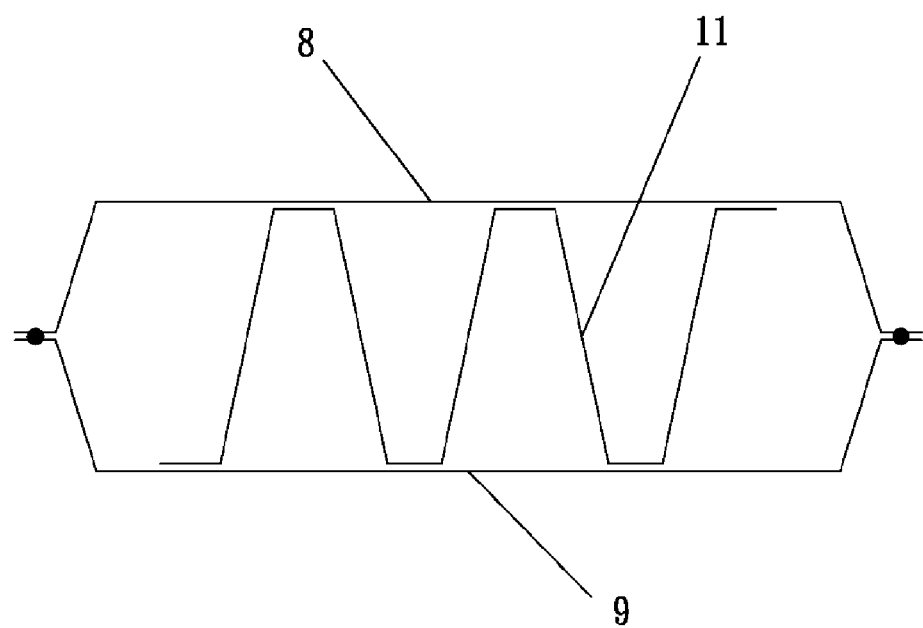
FIG. 12 is a schematic view of a twelfth embodiment.

Referring to FIG. 12, an inflatable product includes a top sheet 8, a plurality of tensioning strips 11 and a bottom sheet 9. Peripheries of the top sheet 8 and the bottom sheet 9 are directly fused, and the tensioning strips 11 are connected to inner surfaces of the top sheet 8 and the bottom sheet 9 by any of the fusion structures described in the first, second, third, fourth, fifth and sixth embodiments. The top sheet 8 and the bottom sheet 9 can be regarded as the target fusion layer 1 of the fusion structure, and the tensioning strips 11 can be regarded as the first fusion reinforcement layer 2 of the fusion structure.

Thirteenth Embodiment

Figure 13:
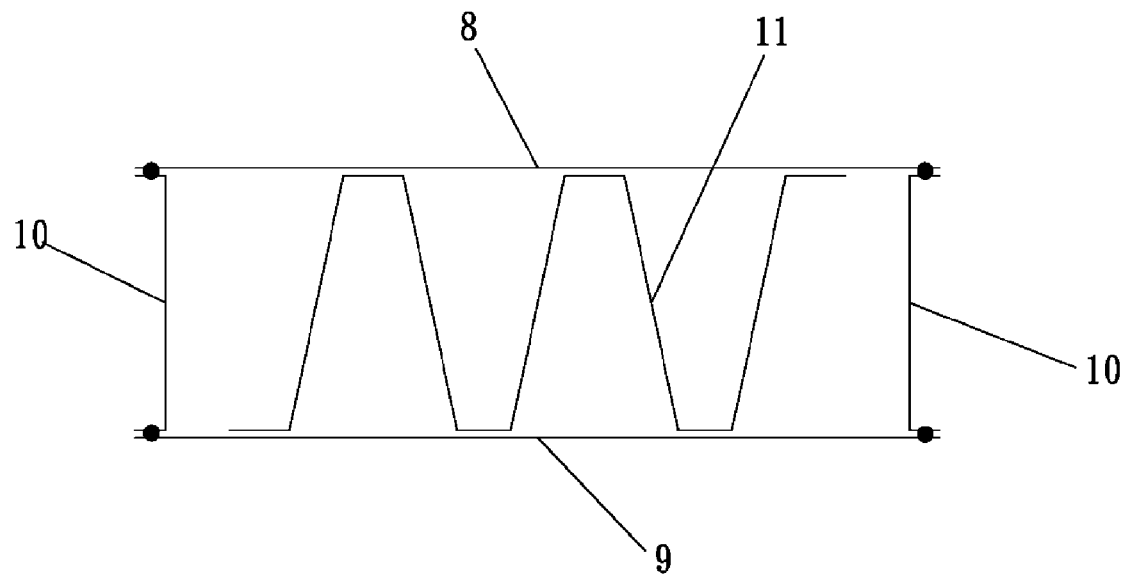
FIG. 13 is a schematic view of a thirteenth embodiment.
Figure 14:
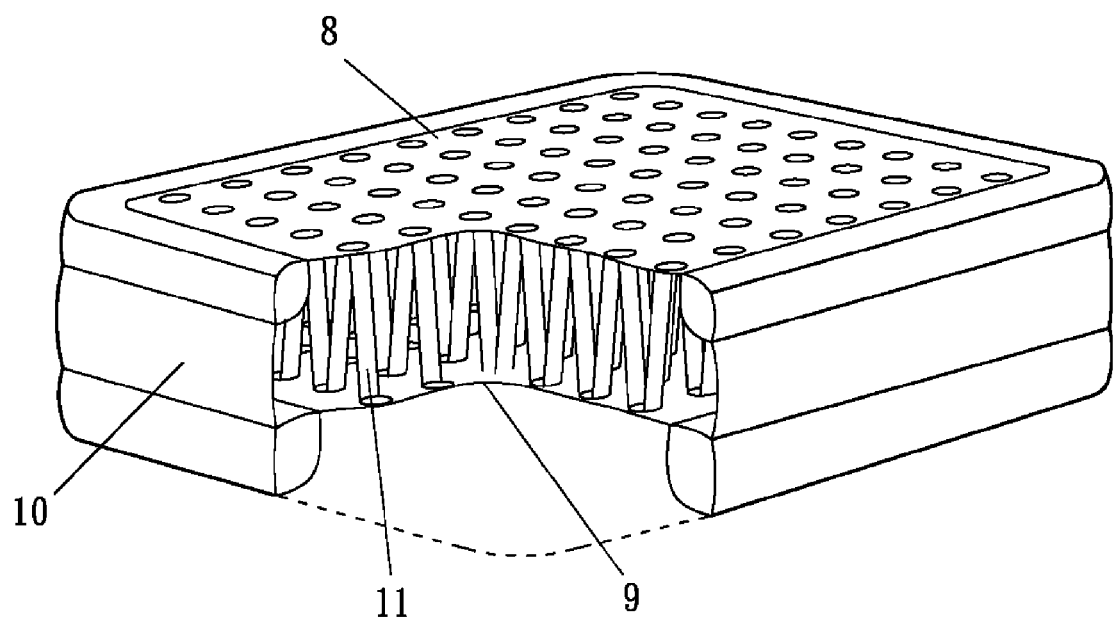
FIG. 14 is a schematic view of a sixteenth embodiment.

Referring to FIG. 13, an inflatable product includes a top sheet 8, a periphery sheet 10, a plurality of tensioning strips 11 and a bottom sheet 9. Two sides of the periphery sheet 10 are directly welded to peripheries of the top sheet 8 and the bottom sheet 9 for forming an air chamber, and the tensioning strips 11 are welded to inner surfaces of the top sheet 8 and the bottom sheet 9 by any of the fusion structures described in the first, second, third, fourth, fifth and sixth embodiments. The top sheet 8 and the bottom sheet 9 can be regarded as the target fusion layer 1 of the fusion structure, and the tensioning strips 11 can be regarded as the first fusion reinforcement layer 2 of the fusion structure.

Fourteenth Embodiment

An inflatable product includes a top sheet 8, a periphery sheet 10, a plurality of tensioning strips 11 and a bottom sheet 9. Two sides of the periphery sheet 10 are connected to peripheries of the top sheet 8 and the bottom sheet 9 by any of the fusion structures described in the first, second, third, fourth, fifth and sixth embodiments for forming an air chamber. The top sheet 8 and the bottom sheet 9 can be regarded as the target fusion layer 1 of the fusion structure, and the periphery sheet 10 can be regarded as the first auxiliary fusion layer 3 of the fusion structure. The tensioning strips 11 are connected to inner surfaces of the top sheet 8 and the bottom sheet 9 by fusion.

The tensioning strips 11 are connected to the inner surfaces of the top sheet 8 and the bottom sheet 9 by any of the fusion structures described in the first, second, third, fourth, fifth and sixth embodiments. The top sheet 8 and the bottom sheet 9 can be regarded as the target fusion layer 1 of the fusion structure, and the tensioning strips 11 can be regarded as the first fusion reinforcement layer 2 of the fusion structure.

Fifteenth Embodiment

The fifteenth embodiment is similar to the fourteenth embodiment, and the difference therebetween is that two sides of the periphery sheet 10 is connected to peripheries of the top sheet 8 and the bottom sheet 9 by the fusion structure described in the seventh embodiment for forming an air chamber. The top sheet 8 and the bottom sheet 9 can be regarded as the target fusion layer 1 of the first fusion unit of the fusion structure, and the periphery sheet 10 can be regarded as the target fusion layer 1 of the second fusion unit of the fusion structure. The tensioning strips 11 are connected to inner surfaces of the top sheet 8 and the bottom sheet 9 by fusion.

Sixteenth Embodiment

Referring to FIGS. 14-21, an inflatable product includes a top sheet 8, a periphery sheet 10, a plurality of tensioning strips 11 and a bottom sheet 9. Two sides of the periphery sheet 10 are connected to peripheries of the top sheet 8 and the bottom sheet 9 by any of the fusion structures described in the first, second, third, fourth, fifth and sixth embodiments for forming an air chamber. The top sheet 8 and the bottom sheet 9 can be regarded as the target fusion layer 1 of the fusion structure, and the periphery sheet 10 can be regarded as the first auxiliary fusion layer 3 of the fusion structure. The tensioning strips 11 are connected to inner surfaces of the top sheet 8 and the bottom sheet 9 by fusion.

Each of the tensioning strips 11 includes a strip body 111, a first auxiliary fusion piece 12 and a second auxiliary fusion piece 13. The strip body 111 is connected to the inner surfaces of the top sheet 8 and the bottom sheet 9 by fusion where the first auxiliary fusion piece 12 and the second auxiliary fusion piece 13 are provided to hold and fuse with the strip body 111. Alternatively, the first auxiliary fusion piece 12 or the second auxiliary fusion piece 13 is fixed to a side of the strip body 111. The strip body 111 is made of a flexible anti-stretch material (e.g. mesh fabric) having a plurality of through holes and is configured to restrict or resist the pulling force produced by expansion of the inflatable product. The first auxiliary fusion piece 12 and the second auxiliary fusion piece 13 are made of the same material (that is, airtight polymer material) (e.g. plastic sheet) as the top sheet 8 and the bottom sheet 9 and enable connection of the strip body 111 to the inner surfaces of the top sheet 8 and the bottom sheet 9 during the fusion.

The inner surfaces of the top sheet 8 and the bottom sheet 9 can be directly connected to the tensioning strips 11 by fusion. Alternatively, a variety of auxiliary structures can be provided at the locations where the inner surfaces of the top sheet 8 and the bottom sheet 9 are connected to the tensioning strips 11. The auxiliary structure can be a third auxiliary fusion piece 14 which is provided at the location where at least one of the inner surfaces of the top sheet 8 and the bottom sheet 9 fuses with the tensioning strips 11. The auxiliary structure can also be a first auxiliary reinforcement piece 15 and a third auxiliary fusion piece 14 which are provided at the location where at least one of the outer surfaces and inner surfaces of the top sheet 8 and the bottom sheet 9 fuses with the tensioning strips 11. The first auxiliary reinforcement piece 15 is attached to at least one of the outer surfaces and the inner surfaces of the top sheet 8 and the bottom sheet 9, and the third auxiliary fusion piece 14 is placed over the first auxiliary reinforcement piece 15. The auxiliary structure can directly fuse with at least one of the outer surfaces and the inner surfaces of the top sheet 8 and the bottom sheet 9, and then the tensioning strips 11 are connected thereto by fusion. Alternatively, the auxiliary structure is kept in position and then the tensioning strips 11 are fused with the auxiliary structure and at least one of the outer surfaces and the inner surfaces of the top sheet 8 and the bottom sheet 9. Further, the auxiliary structure can be a fiber glue layer 16 which has a plurality of through holes and is applied to the location where at least one of outer surfaces and the inner surfaces of the top sheet 8 and the bottom sheet 9 fuses with the tensioning strips 11. The first auxiliary reinforcement piece 15 is made of a flexible anti-stretch material (e.g. mesh fabric) having a plurality of through holes and is configured to restrict or resist pulling force produced by expansion of the inflatable product during inflation. The fiber glue layer 16 is formed by applying fiber glue (glue with fiber added therein) to the location where at least one of the outer surfaces and the inner surfaces of the top sheet 8 and the bottom sheet 9 fuses with the tensioning strips 11, for restricting or resisting the pulling force produced by expansion of the inflatable product during inflation. The third auxiliary fusion piece 14 is made of the same material as the top sheet 8 and the bottom sheet 9 that facilitates connection of the first auxiliary reinforcement piece 15 to at least one of the outer surfaces and the inner surfaces of the top sheet 8 and the bottom sheet 9 by fusion.

Figure 15:
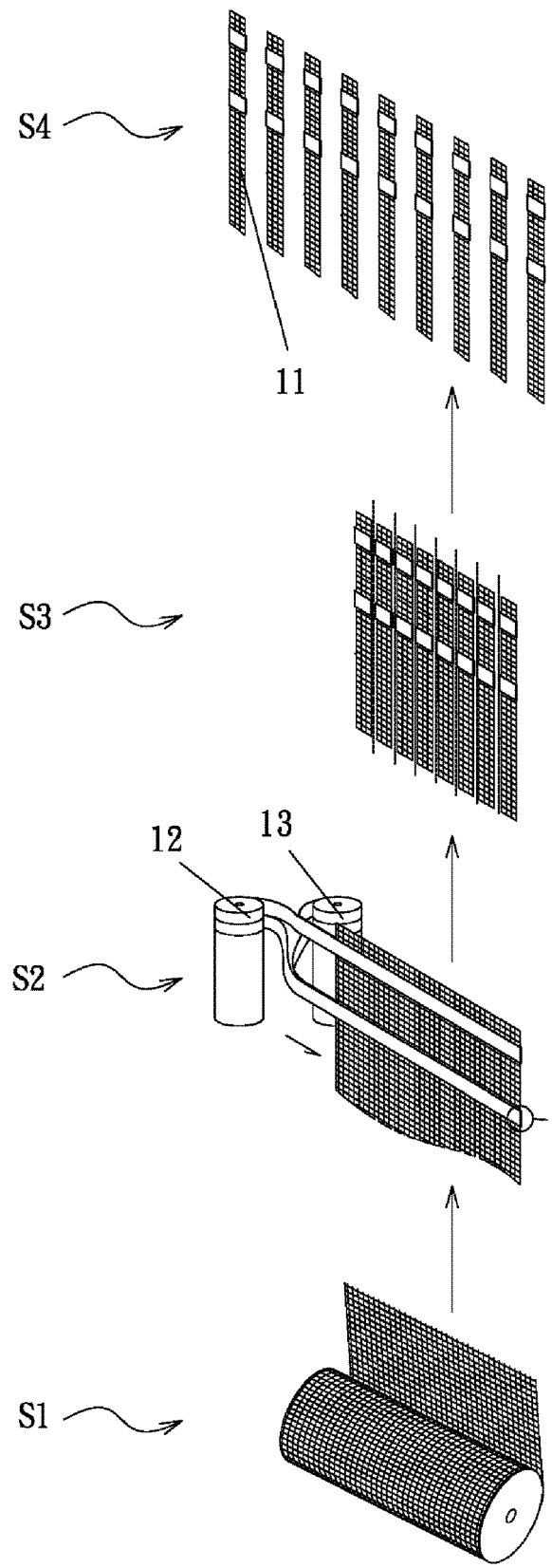
FIG. 15 is a schematic view showing the process for manufacturing tensioning strips of the sixteenth embodiment.

As shown in FIG. 15, in the present embodiment, a method for manufacturing the tensioning strips 11 includes following steps:

In step S1, a roll of mesh fabric is loaded and unrolled.

In step S2, a roll of the first auxiliary fusion piece 12 and a roll of the second auxiliary fusion piece 13 are cut into strips and the strips are placed at predetermined locations on an upper side and a lower side of the mesh fabric. Alternatively, a roll of the first auxiliary fusion piece 12 or a roll of the second auxiliary fusion piece 13 is cut into strips and the strips are placed on a side of the mesh fabric.

In step S3, the strips cut from the first auxiliary fusion piece 12 and the second auxiliary fusion piece 13 are placed to hold the mesh fabric and fuse with the mesh fabric. Alternatively, the strips cut from the first auxiliary fusion piece 12 or the second auxiliary fusion piece 13 are fixed to a side of the mesh fabric.

In step S4, the mesh fabric which fuses with the strips cut from the first auxiliary fusion piece 12 and the second auxiliary fusion piece 13 is cut into strips for obtaining tensioning strips 11. Alternatively, the mesh fabric, a side of which has the strips cut from the first auxiliary fusion piece 12 or the second auxiliary fusion piece 13 attached thereto, is cut into strips for obtaining the tensioning strips 11.

Figure 16:
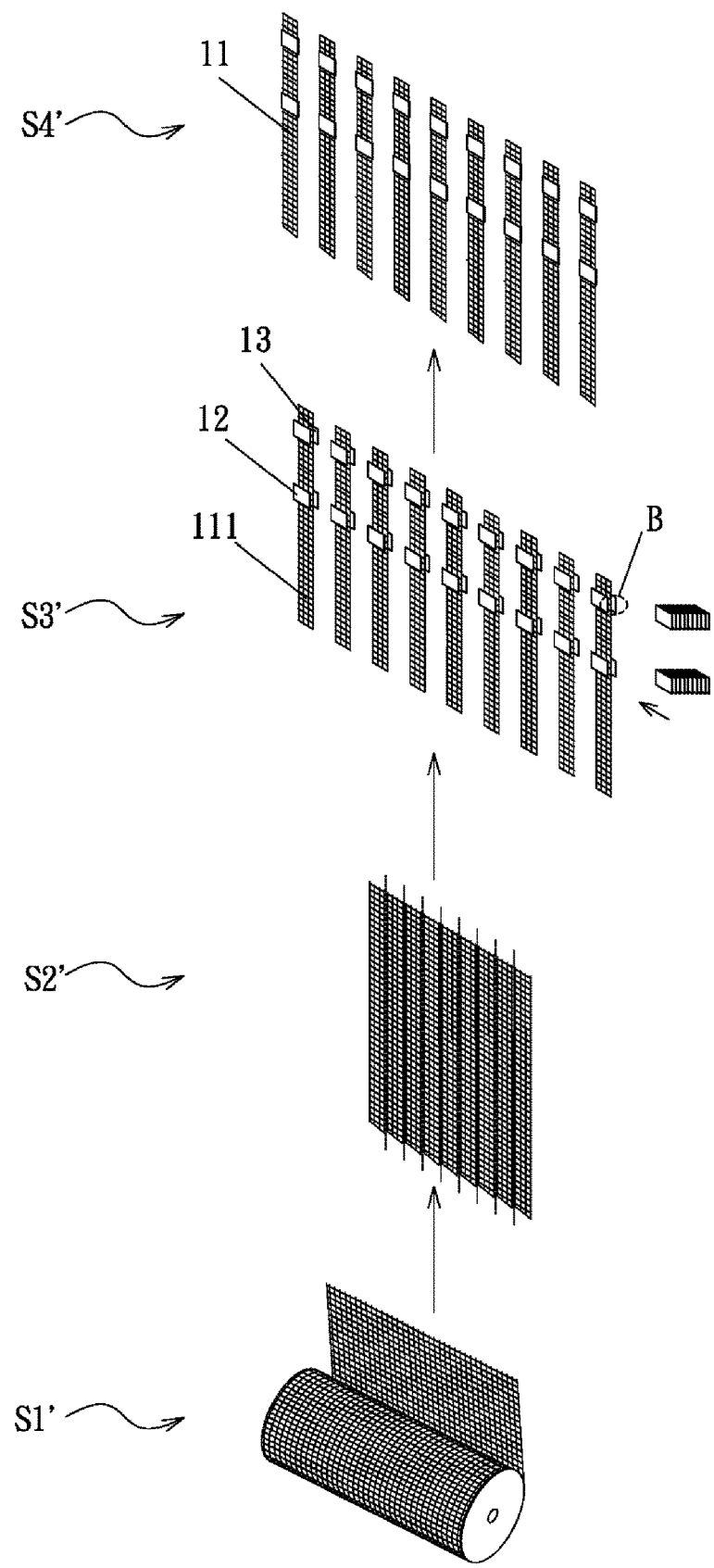
FIG. 16 is a schematic view showing the process for manufacturing tensioning strips of the sixteenth embodiment.
Figure 17:
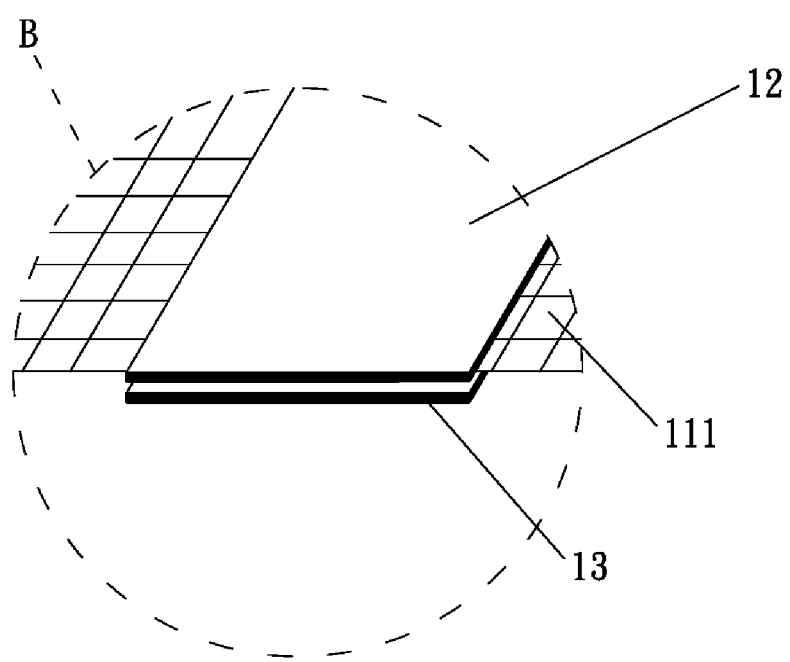
FIG. 17 is an enlarged view of portion "B" of FIG. 16.

As shown in FIGS. 16-17, an alternative method for manufacturing the tensioning strips 11 includes the following steps:

In step S1', a roll of mesh fabric is loaded and unrolled.

In step S2', the mesh fabric is cut into strips for obtaining the strip body 111.

In step S3', the first auxiliary fusion piece 12 and the second auxiliary fusion piece 13 are respectively placed and positioned at predetermined locations on an upper side and a lower side of the strip body 111. Alternatively, the first auxiliary fusion piece 12 or the second auxiliary fusion piece 13 is placed and positioned at predetermined location on a side of the strip body 111.

In step S4', the first auxiliary fusion piece 12 and the second auxiliary fusion piece 13 are placed to hold the strip body 111 and fuse with the strip body 111 for obtaining the tensioning strips 11. Alternatively, the first auxiliary fusion piece 12 or the second auxiliary fusion piece 13 is fixed to a side of the strip body 111 for obtaining the tensioning strips 11.

In the present embodiment, a method for manufacturing the inflatable product includes the following steps:

In step S5, rolls of the top sheet 8 and the bottom sheet 9 are loaded, unrolled and kept in position.

In step S6, the tensioning strips 11, which are manufactured by the above-described method, are placed at predetermined locations between the top sheet 8 and the bottom sheet 9, and the parts of the tensioning strips 11 which have the first auxiliary fusion pieces 12 and the second auxiliary fusion pieces 13 thereon are fused with the inner surfaces of the top sheet 8 and the bottom sheet 9. Alternatively, the parts of the tensioning strips 11, a side of which has the first auxiliary fusion pieces 12 or the second auxiliary fusion pieces 13 fixed thereto, are fused with the inner surfaces of the top sheet 8 and the bottom sheet 9.

In step S7, the sides of the periphery sheet 10 are connected to the peripheries of the top sheet 8 and the bottom sheet 9 by any of the fusion structures described in the first, second, third, fourth, fifth and sixth embodiments for forming the air chamber and obtaining the inflatable product.

Figure 18:
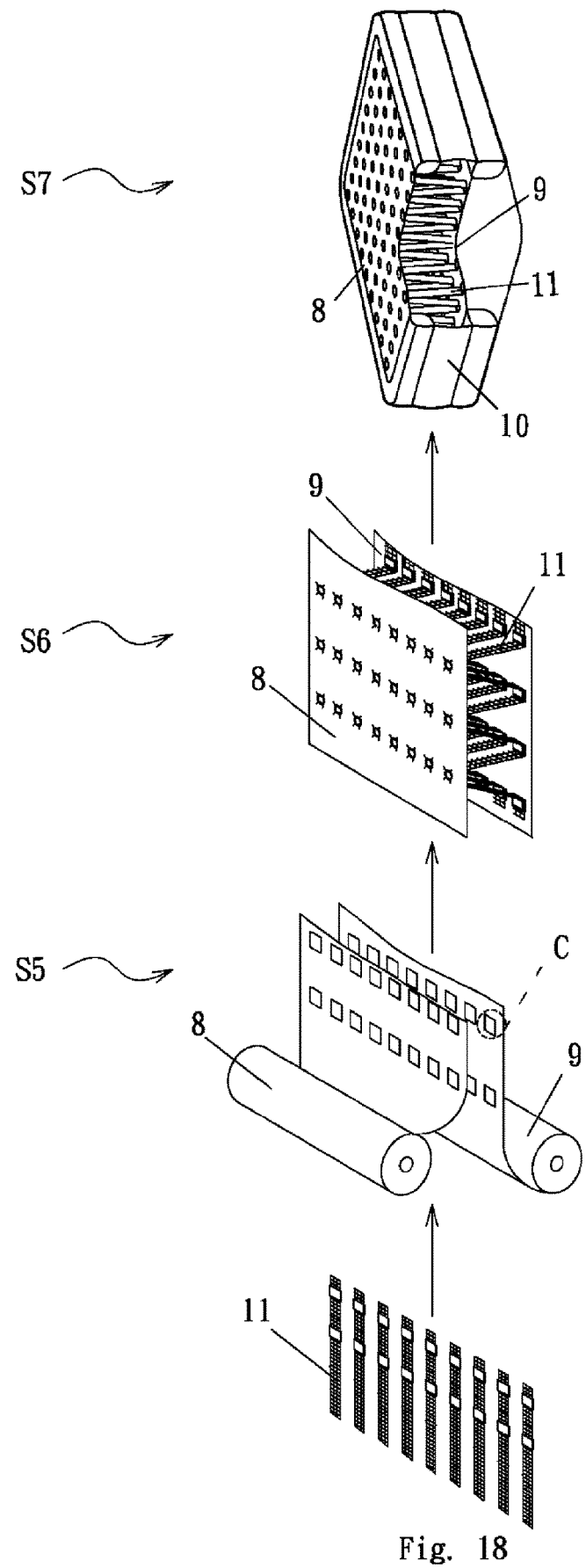
FIG. 18 is a schematic view showing the process for manufacturing inflatable product of the sixteenth embodiment.
Figure 19:
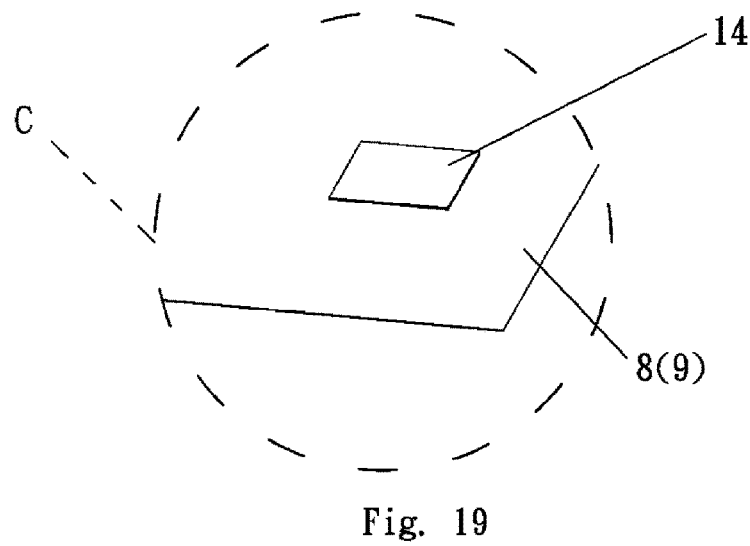
FIG. 19 is an enlarged view of portion "C" of FIG. 18 showing the outer surface or inner surface of a top sheet and a bottom sheer of the sixteenth embodiment has a third auxiliary fusion piece thereon.

As shown in FIGS. 18-19, an alternative method for manufacturing the inflatable product includes the following steps:

In step S5, rolls of the top sheet 8 and the bottom sheet 9 are loaded and unrolled and kept in position, and the third auxiliary fusion pieces 14 are fused with the outer surfaces or the inner surfaces of the top sheet 8 and the bottom sheet 9 at predetermined locations where the tensioning strips 11 are going to fuse with the top sheet 8 and the bottom sheet 9.

In step S6, the tensioning strips 11 which are manufactured by the above-described method are sent and kept at the predetermined locations between the top sheet 8 and the bottom sheet 9, and the parts of the tensioning strips 11 having the first auxiliary fusion pieces 12 and the second auxiliary fusion pieces 13 thereon are fused with the parts of the inner surfaces of the top sheet 8 and the bottom sheet 9 having the third auxiliary fusion pieces 14 thereon. Alternatively, the parts of the tensioning strips 11, each of which has the first auxiliary fusion piece 12 or the second auxiliary fusion piece 13 fixed to a side thereof, are fused with the parts of the inner surfaces of the top sheet 8 and the bottom sheet 9 which have the third auxiliary fusion pieces 14 fixed thereto.

In step S7, the sides of the periphery sheet 10 are connected to the peripheries of the top sheet 8 and the bottom sheet 9 by any of the fusion structures described in the first, second, third, fourth, fifth and sixth embodiments for forming the air chamber and obtaining the inflatable product.

Figure 20:
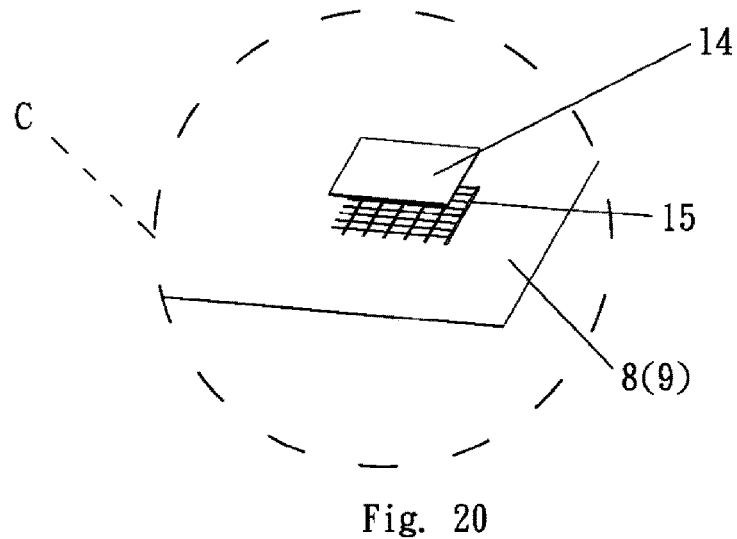
FIG. 20 is an enlarged view of portion "C" of FIG. 18 showing the outer surface or inner surface of a top sheet and a bottom sheer of the sixteenth embodiment has a third auxiliary fusion piece and a first auxiliary reinforcement piece thereon.

As shown in FIGS. 18 and 20, an alternative method for manufacturing the inflatable product includes the following steps:

In step S5, rolls of the top sheet 8 and the bottom sheet 9 are loaded, unrolled and kept in position, and the first auxiliary reinforcement pieces 15 and the third auxiliary fusion pieces 14 are placed on the outer surfaces or the inner surfaces of the top sheet 8 and the bottom sheet 9 at predetermined locations where the top sheet 8 and the bottom sheet 9 are going to fuse with the tensioning strips 11, wherein the first auxiliary reinforcement pieces 15 and the third auxiliary fusion pieces 14 are only kept in position without fusing with other elements.

In step S6, the tensioning strips 11 which are manufactured by the above-described method are sent and positioned at predetermined locations between the top sheet 8 and the bottom sheet 9, and the parts of the tensioning strips 11 which have the first auxiliary fusion pieces 12 and the second auxiliary fusion pieces 13 thereon are fused with the parts of the inner surfaces of the top sheet 8 and the bottom sheet 9 which have the first auxiliary reinforcement pieces 15 and the third auxiliary fusion pieces 14 thereon. Alternatively, the parts of the tensioning strips 11, each of which has the first auxiliary fusion piece 12 or the second auxiliary fusion piece 13 fixed to a side thereof, are fused with the parts of the inner surfaces of the top sheet 8 and the bottom sheet 9 which have the third auxiliary fusion pieces 14 fixed thereto.

In step S7, the sides of the periphery sheet 10 are connected to the peripheries of the top sheet 8 and the bottom sheet 9 by any of the fusion structures described in the first, second, third, fourth, fifth and sixth embodiments for forming the air chamber and obtaining the inflatable product.

As shown in FIGS. 18 and 20, a further alternative method for manufacturing the inflatable product includes the following steps:

In step S5, rolls of the top sheet 8 and the bottom sheet 9 are loaded, unrolled and kept in position, the first auxiliary reinforcement pieces 15 and the third auxiliary fusion pieces 14 are placed on the outer surfaces or the inner surfaces of the top sheet 8 and the bottom sheet 9 at predetermined locations where the top sheet 8 and the bottom sheet 9 are going to fuse with the tensioning strips 11, and the first auxiliary reinforcement pieces 15 and the third auxiliary fusion pieces 14 are fused with the inner surfaces of the top sheet 8 and the bottom sheet 9.

In step S6, the tensioning strips 11 which are manufactured by the above-described method are placed at predetermined locations between the top sheet 8 and the bottom sheet 9, and the parts of the tensioning strips 11 which have the first auxiliary fusion pieces 12 and the second auxiliary fusion pieces 13 thereon are fused with the parts of the inner surfaces of the top sheet 8 and the bottom sheet 9 which have the first auxiliary reinforcement pieces 15 and the third auxiliary fusion pieces 14 thereon. Alternatively, the parts of the tensioning strips 11, each of which has the first auxiliary fusion piece 12 or the second auxiliary fusion piece 13 fixed to a side thereof, are fused with the parts of the inner surfaces of the top sheet 8 and the bottom sheet 9 which have the first auxiliary reinforcement pieces 15 and the third auxiliary fusion pieces 14 thereon.

In step S7, the sides of the periphery sheet 10 are connected to the peripheries of the top sheet 8 and the bottom sheet 9 by any of the fusion structures described in the first, second, third, fourth, fifth and sixth embodiments for forming the air chamber and obtaining the inflatable product.

Figure 21:
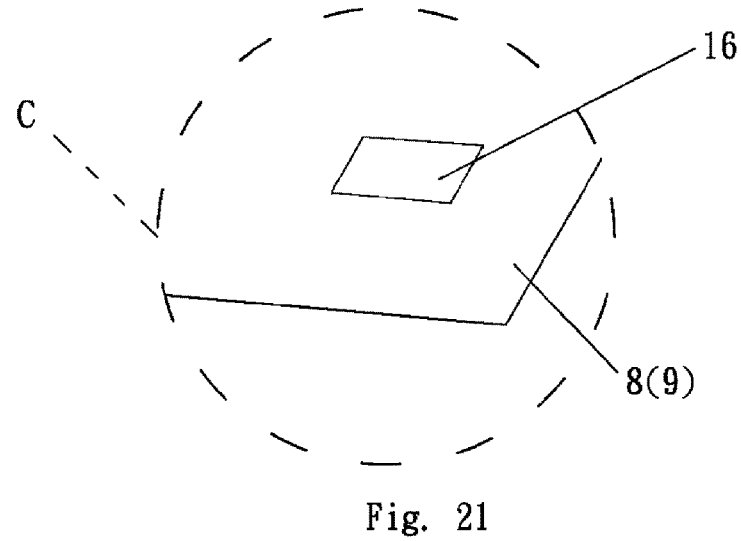
FIG. 21 is an enlarged view of portion "C" of FIG. 18 showing the outer surface or inner surface of a top sheet and a bottom sheer of the sixteenth embodiment has a fiber glue layer thereon.

As shown in FIGS. 18 and 21, a yet further alternative method for manufacturing the inflatable product includes the following steps:

In step S5, rolls of the top sheet 8 and the bottom sheet 9 are loaded, unrolled and kept in position, and a fiber glue layer 16 which has a plurality of through holes is formed on the outer surfaces or the inner surfaces of the top sheet 8 and the bottom sheet 9 at predetermined locations where the top sheet 8 and the bottom sheet 9 are going to fuse with the tensioning strips 11.

In step S6, the tensioning strips 11 which are manufactured by the above-described method are sent and positioned at predetermined locations between the top sheet 8 and the bottom sheet 9, and the parts of the tensioning strips 11 which have the first auxiliary fusion pieces 12 and the second auxiliary fusion pieces 13 thereon are fused with the parts of the inner surfaces of the top sheet 8 and the bottom sheet 9 which have the fiber glue layer 16 formed thereon, wherein the fiber glue layer 16 has through holes. Alternatively, the parts of the tensioning strips 11, each of which has the first auxiliary fusion piece 12 or the second auxiliary fusion piece 13 fixed to a side thereof, are fused with the parts of the inner surfaces of the top sheet 8 and the bottom sheet 9 which have the fiber glue layer 16 formed thereon, wherein the fiber glue layer 16 has through holes.

In step S7, the sides of the periphery sheet 10 are connected to the peripheries of the top sheet 8 and the bottom sheet 9 by any of the fusion structures described in the first, second, third, fourth, fifth and sixth embodiments for forming the air chamber and obtaining the inflatable product.

Seventeenth Embodiment

The seventeenth embodiment is similar to the sixteenth embodiment, and the difference therebetween is that two sides of the periphery sheet 10 are connected to peripheries of the top sheet 8 and the bottom sheet 9 by the fusion structure described in the seventh embodiment for forming an air chamber. The top sheet 8 and the bottom sheet 9 can be regarded as the target fusion layer 1 of the first fusion unit of the fusion structure, and the periphery sheet 10 can be regarded as the target fusion layer 1 of the second fusion unit of the fusion structure. The tensioning strips 11 are connected to inner surfaces of the top sheet 8 and the bottom sheet 9 by fusion.

Eighteenth Embodiment

Figure 22:
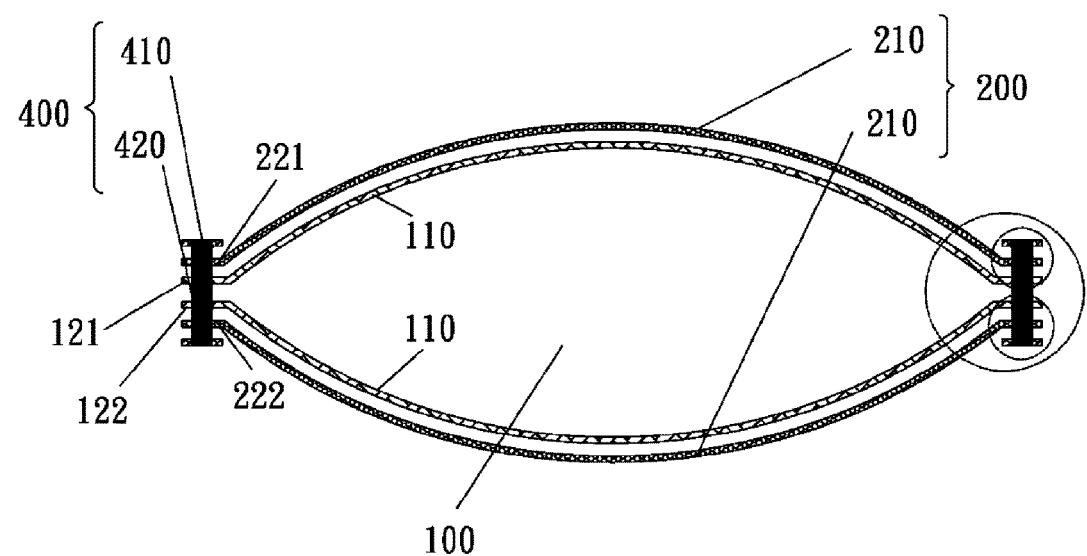
FIG. 22 is a schematic view of an eighteenth embodiment.

Referring to FIG. 22, an inflatable product includes an inflatable body 100. The inflatable body 100 includes two target fusion layers 110 which are connected by fusion, thereby forming a fusion portion. The fusion portion includes a first fusion portion 121 and a second fusion portion 122.

An anti-stretch sheet 200 is disposed outside the inflatable body 100 for covering the inflatable body 100. The anti-stretch sheet 200 includes two fusion reinforcement layers 210, a fusion portion is formed thereon, and the fusion portion includes a first fusion portion 221 and a second fusion portion 222.

The inflatable product further includes a plurality of airtight auxiliary fusion layers 400 which are fused with the fusion portion of the inflatable body and the fusion portion of the anti-stretch sheet. The airtight auxiliary fusion layers 400 include auxiliary fusion layers 410, 420. The target fusion layers 110 and the auxiliary fusion layers 410, 420 are made of polyvinyl chloride (PVC), and the fusion reinforcement layers 210 are mesh fabric.

The first fusion portion 121 and the second fusion portion 122 of the target fusion layers 110 are placed in contact with each other. The first fusion portion 221 and the second fusion portion 222 of the fusion reinforcement layers 210 are respectively placed in contact with the first fusion portion 121 and the second fusion portion 122 of the target fusion layers 110. The auxiliary fusion layers 410, 420 are placed in contact with the first fusion portion 221 and the second fusion portion 222 of the fusion reinforcement layers 210. The inflatable product provided with an air chamber is formed by fusion and has an angle at the fusion location after inflation of the inflatable body.

Nineteenth Embodiment

Figure 23:
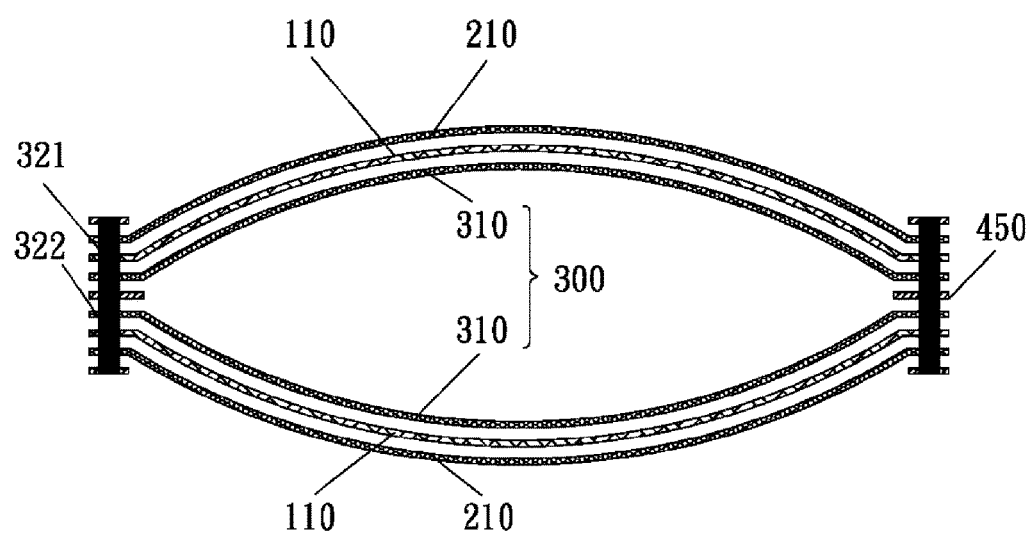
FIG. 23 is a schematic view of a nineteenth embodiment.

Referring to FIG. 23, the nineteenth embodiment is similar to the eighteenth embodiment, and the difference therebetween is that an anti-stretch sheet 300 is provided within the inflatable body 100 for being covered by the inflatable body 100. The anti-stretch sheet 300 includes two fusion reinforcement layers 310, a fusion portion is formed thereon, and the fusion portion includes a first fusion portion 321 and a second fusion portion 322. An auxiliary fusion layer 450 is provided between the first fusion portion 321 and the second fusion portion 322. The inflatable product having an air chamber is formed by fusion and has an angle at the fusion location.

Twentieth Embodiment

Figure 24:
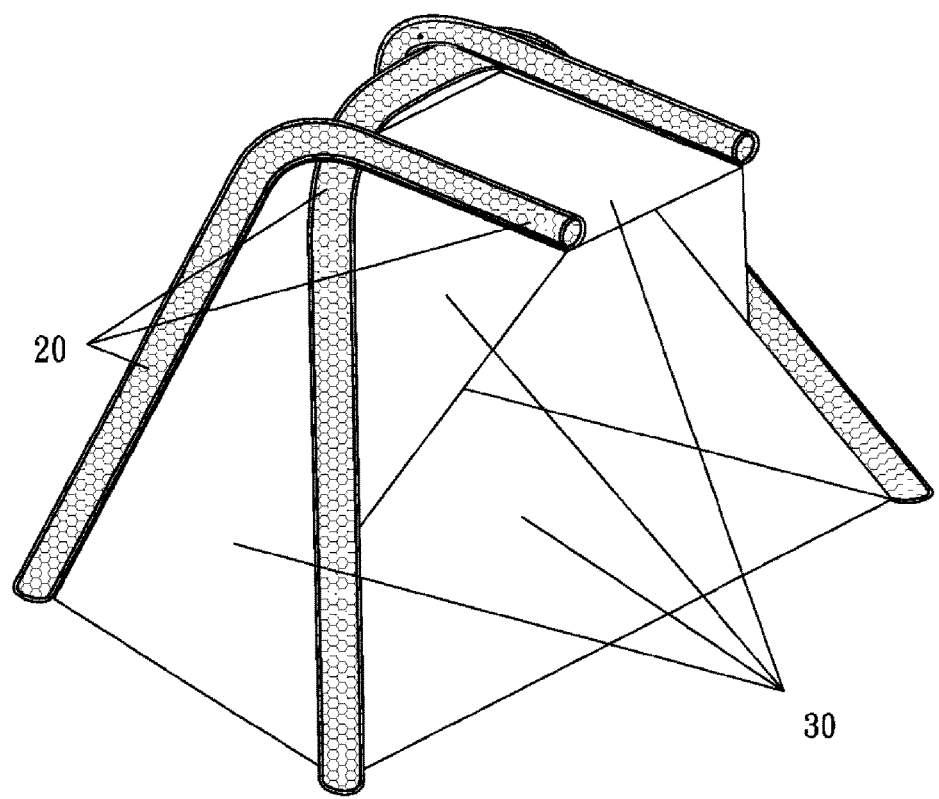
FIG. 24 is a schematic view of a twentieth embodiment.
Figure 25A:
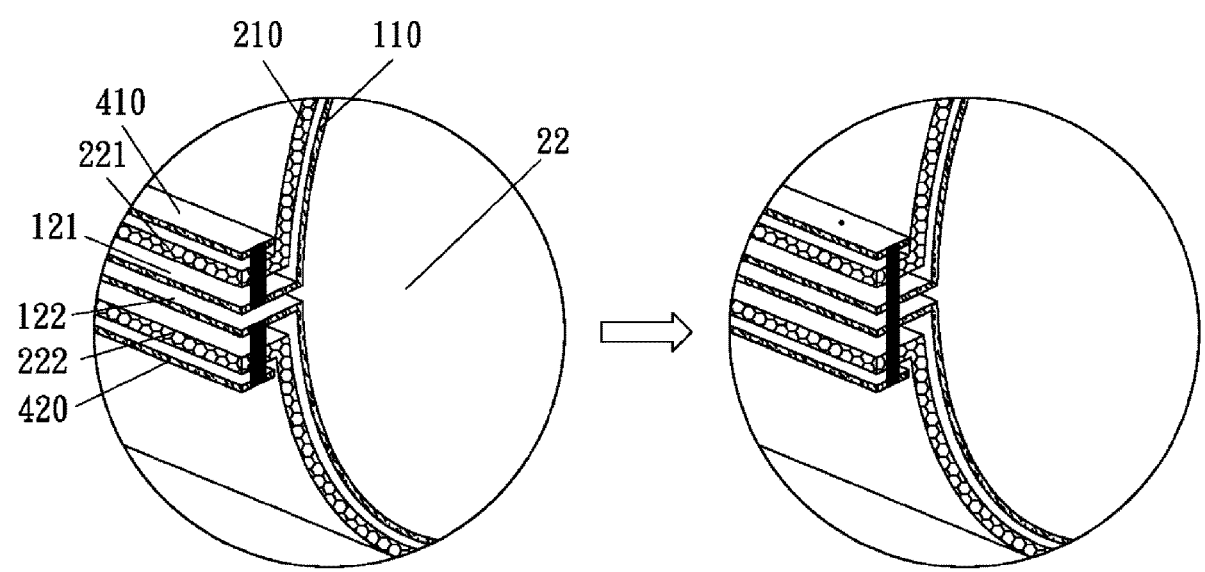
FIG. 25 is a schematic view of a portion of FIG. 24 (FIG. 25*a* is a schematic view of the portion, and FIG. 25*b* depicts the fusion)
Figure 25B:
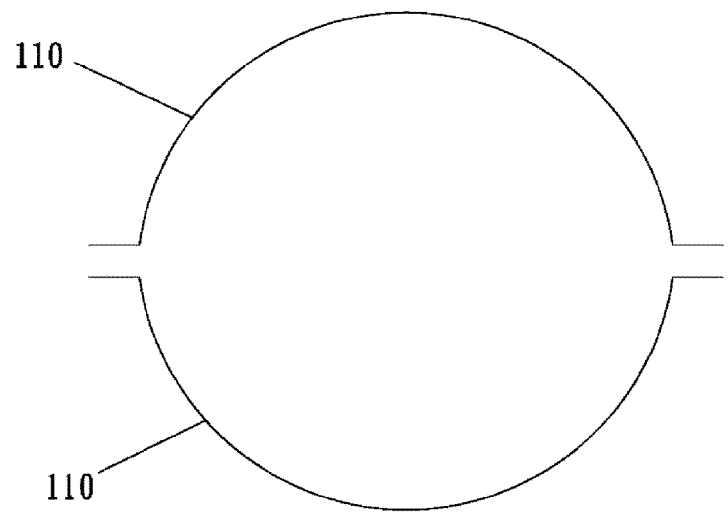

Referring to FIGS. 24 and 25*a*, an inflatable tent includes an inflatable tube 20 and a tent cloth 30. The inflatable tube 20 includes a tube body 22 and a tube end (not shown) disposed on an end portion of the tube body, and the tube body 22 and the tube end are connected by fusion to form an air chamber. The tube body 22 includes an inflatable body. Referring to FIG. 25*b*, the inflatable body is formed by two target fusion layers 110 which are arranged symmetrically and connected by fusion to form a fusion portion thereon. The fusion portion includes a first fusion portion 121 and a second fusion portion 122 (FIG. 25*a* only shows a side of fusion structure, while the other side of fusion structure is omitted).

An anti-stretch sheet is disposed outside the inflatable body for covering the inflatable body. The anti-stretch sheet includes two fusion reinforcement layers 210, a fusion portion is formed thereon, and the fusion portion includes a first fusion portion 221 and a second fusion portion 222.

The inflatable tube 20 further includes a plurality of airtight auxiliary fusion layers which are fused with the fusion portion of the inflatable body and the fusion portion of the anti-stretch sheet. The airtight auxiliary fusion layers include auxiliary fusion layers 410, 420. The target fusion layers 110 and the auxiliary fusion layers 410, 420 are made of polyvinyl chloride (PVC), and the fusion reinforcement layers 210 are mesh fabric.

The first fusion portion 121 and the second fusion portion 122 of the target fusion layers 110 are placed in contact with each other. The first fusion portion 221 and the second fusion portion 222 of the fusion reinforcement layers 210 are respectively placed in contact with the first fusion portion 121 and the second fusion portion 122 of the target fusion layers 110. The auxiliary fusion layers 410, 420 are placed in contact with the first fusion portion 221 and the second fusion portion 222 of the fusion reinforcement layers 210. The tube body 22 having the air chamber is formed by fusion and has an angle at the fusion location after inflation of the inflatable body. During the fusion, the first fusion portion 121 of the target fusion layers 110, the first fusion portion 221 of the fusion reinforcement layers 210 and the auxiliary fusion layer 410 are fused, the second fusion portion 122 of the target fusion layers 110, the second fusion portion 222 of the fusion reinforcement layers 210 and the auxiliary fusion layer 420 are fused, and then the two fusion units are fused.

Twenty-first Embodiment

Figure 26:
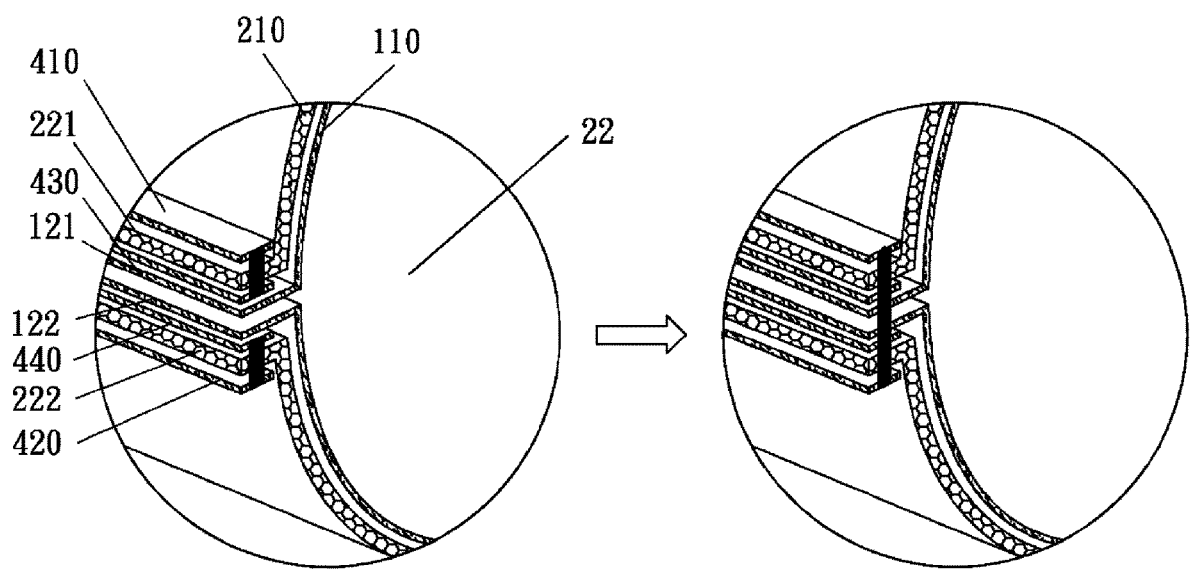
FIG. 26 is a schematic view of a twenty-first embodiment.

Referring to FIG. 26, the twenty-first embodiment is similar to the twentieth embodiment, and the difference therebetween is that an auxiliary fusion layer 430 is additionally provided between the first fusion portion 121 of the target fusion layers 110 and the first fusion portion 221 of the fusion reinforcement layers 210, and an auxiliary fusion layer 440 is additionally provided between the second fusion portion 122 of the target fusion layers 110 and the second fusion portion 222 of the fusion reinforcement layers 210. The tube body 22 having the air chamber is formed by fusion and has an angle at the fusion location after inflation of the inflatable body. During the fusion, the first fusion portion 121 of the target fusion layers 110, the auxiliary fusion layer 430, the first fusion portion 221 of the fusion reinforcement layers 210 and the auxiliary fusion layer 410 are fused, the second fusion portion 122 of the target fusion layers 110, the auxiliary fusion layer 440, the second fusion portion 222 of the fusion reinforcement layers 210 and the auxiliary fusion layer 420 are fused, and then the two fusion units are fused.

Twenty-second Embodiment

Figure 27A:
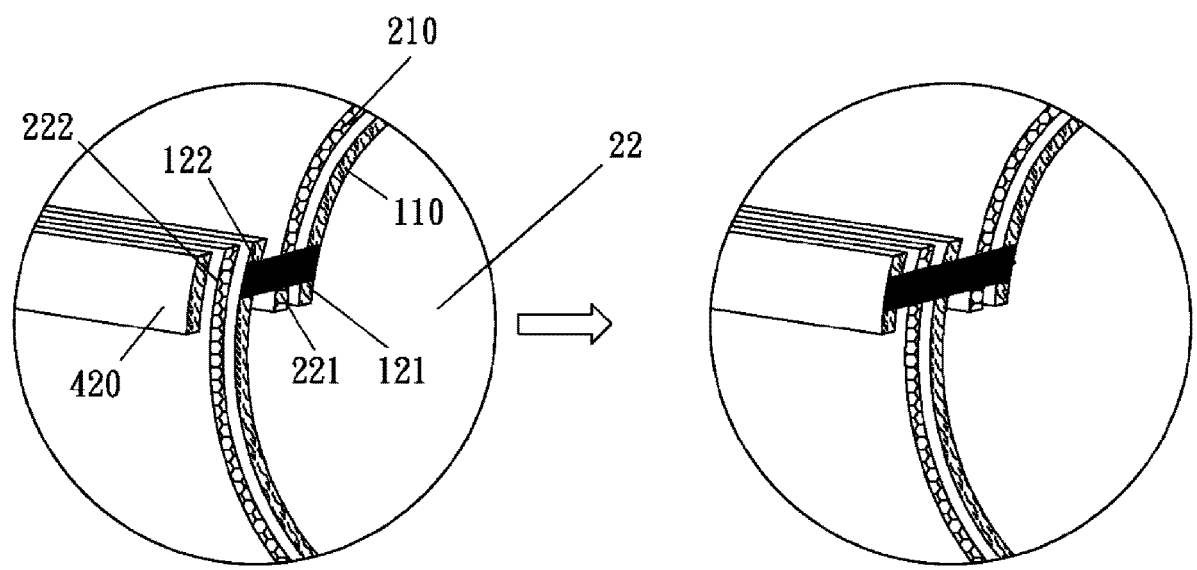
FIG. 27 is a schematic view of a twenty-second embodiment (FIG. 27a is a schematic view of a portion, and FIG. 27b is a schematic view of back sealing by fusion)
Figure 27B:
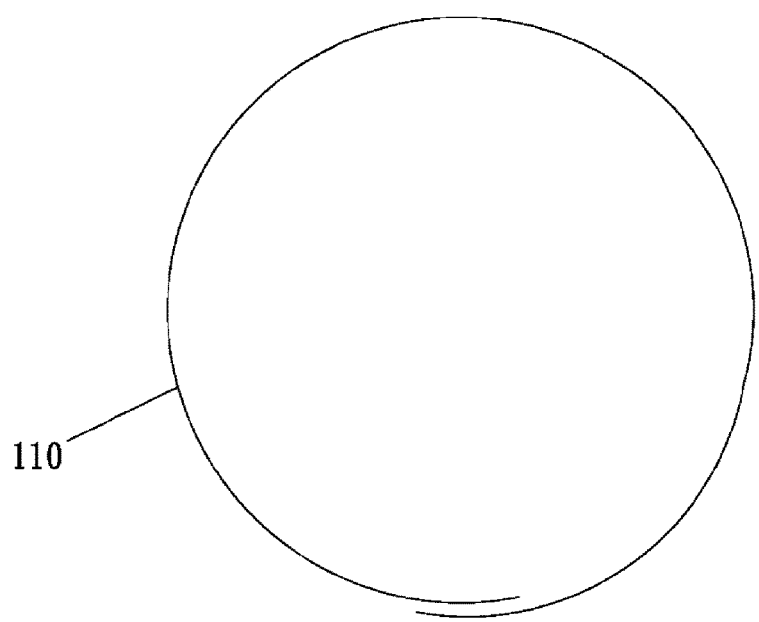

Referring to FIG. 27*a*, the twenty-second embodiment is similar to the twentieth embodiment, and the difference therebetween is that the first fusion portion 121 of the target fusion layer 110 is placed in contact with the first fusion portion 221 of the fusion reinforcement layer 210, the second fusion portion 122 of the target fusion layer 110 is placed in contact with the first fusion portion 221 of the fusion reinforcement layer 210, the second fusion portion 222 of the fusion reinforcement layer 210 is placed in contact with the second fusion portion 122 of the target fusion layer 110, and the auxiliary fusion layer 420 is placed in contact with the second fusion portion 222 of the fusion reinforcement layer 210. Referring to FIG. 27*b*, the target fusion layer 110 is back sealed by fusion to form the tube body 22 having the air chamber. During the fusion, the first fusion portion 121 of the target fusion layer 110, the first fusion portion 221 of the fusion reinforcement layer 210, and the second fusion portion 122 of the target fusion layer 110 are simultaneously fused, and then are fused with the second fusion portion 222 of the fusion reinforcement layer 210 and the auxiliary fusion layer 420.

Twenty-third Embodiment

Figure 28:
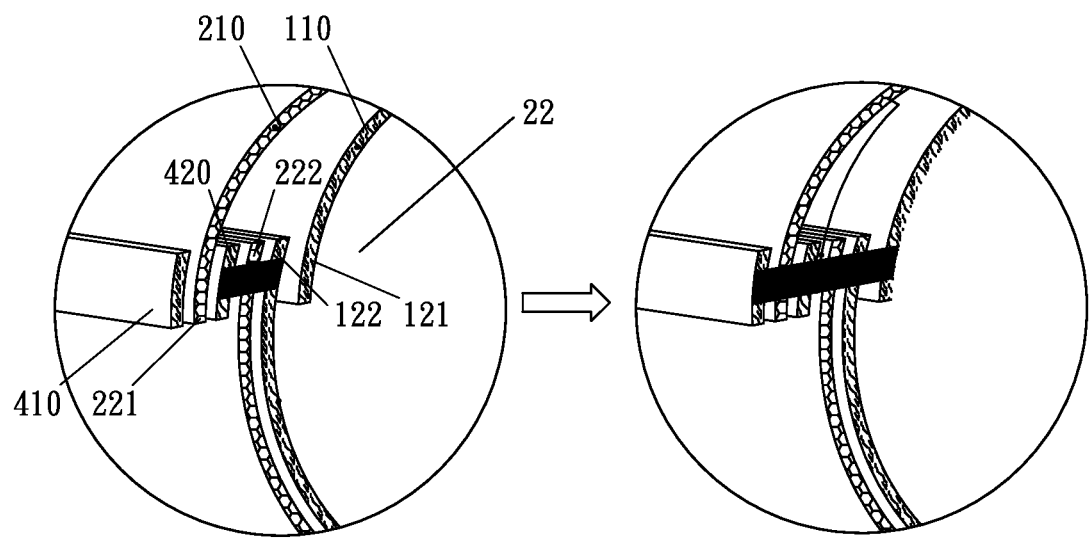
FIG. 28 is a schematic view of a twenty-third embodiment.

Referring to FIG. 28, the twenty-third embodiment is similar to the twenty-second embodiment, and the difference therebetween is that the first fusion portion 121 of the target fusion layer 110 is placed in contact with the second fusion portion 122 of the target fusion layer 110, the second fusion portion 122 of the target fusion layer 110 is placed in contact with the second fusion portion 222 of the fusion reinforcement layer 210, the auxiliary fusion layer 420 is placed in contact with the second fusion portion 222 of the fusion reinforcement layer 210, the first fusion portion 221 of the fusion reinforcement layer 210 is placed in contact with the auxiliary fusion layer 420, and the auxiliary fusion layer 410 is placed in contact with the first fusion portion 221 of the fusion reinforcement layer 210. The tube body 22 having the air chamber is formed by fusion and has a curved shape at the fusion location. During the fusion, the auxiliary fusion layer 420, the second fusion portion 222 of the fusion reinforcement layer 210 and the second fusion portion 122 of the target fusion layer 110 are simultaneously fused, and then are fused with the first fusion portion 121 of the target fusion layer 110, the first fusion portion 221 of the fusion reinforcement layer 210 and the auxiliary fusion layer 410.

Twenty-fourth Embodiment

Figure 29:
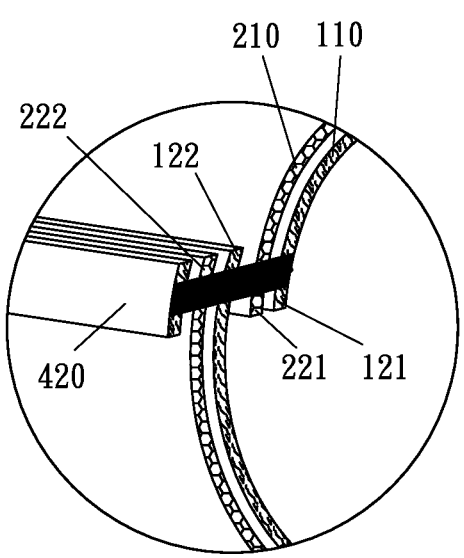
FIG. 29 is a schematic view of a twenty-fourth embodiment.

Referring to FIG. 29, the twenty-fourth embodiment is similar to the twenty-second embodiment, and the difference therebetween is that the first fusion portion 121 of the target fusion layer 110, the first fusion portion 221 of the fusion reinforcement layer 210, the second fusion portion 122 of the target fusion layer 110, the second fusion portion 222 of the fusion reinforcement layer 210 and the auxiliary fusion layer 420 are simultaneously fused.

Twenty-fifth Embodiment

Figure 30:
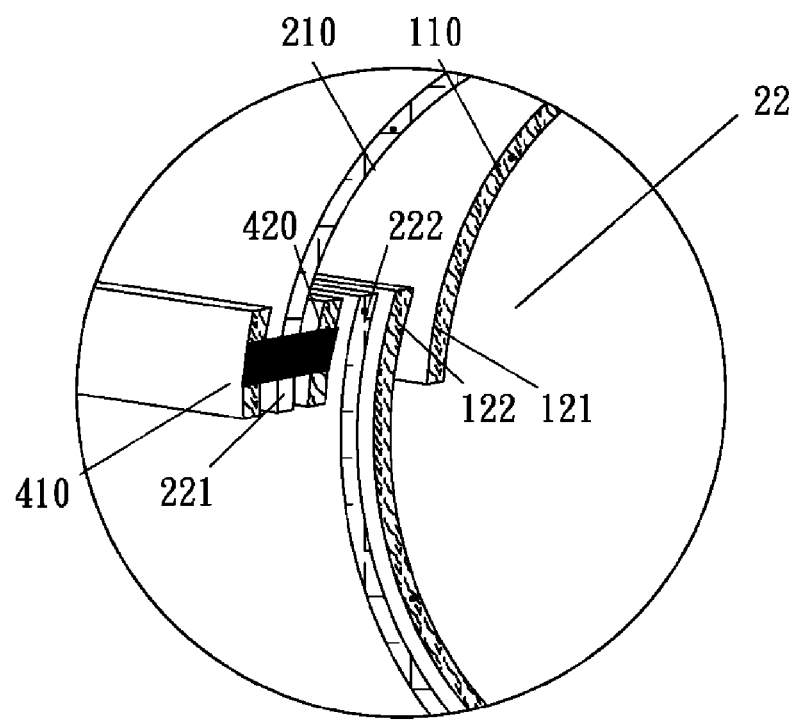
FIG. 30 is a schematic view of a twenty-fifth embodiment.

Referring to FIG. 30, the twenty-fifth embodiment is similar to the twenty-third embodiment, and the difference therebetween is that the auxiliary fusion layer 410, the first fusion portion 221 of the fusion reinforcement layer 210 and the auxiliary fusion layer 420 are simultaneously welded, and then are fused with the second fusion portion 222 of the fusion reinforcement layer 210 and the second fusion portion 122 and the first fusion portion 121 of the target fusion layer 110.

Twenty-sixth Embodiment

Figure 31:
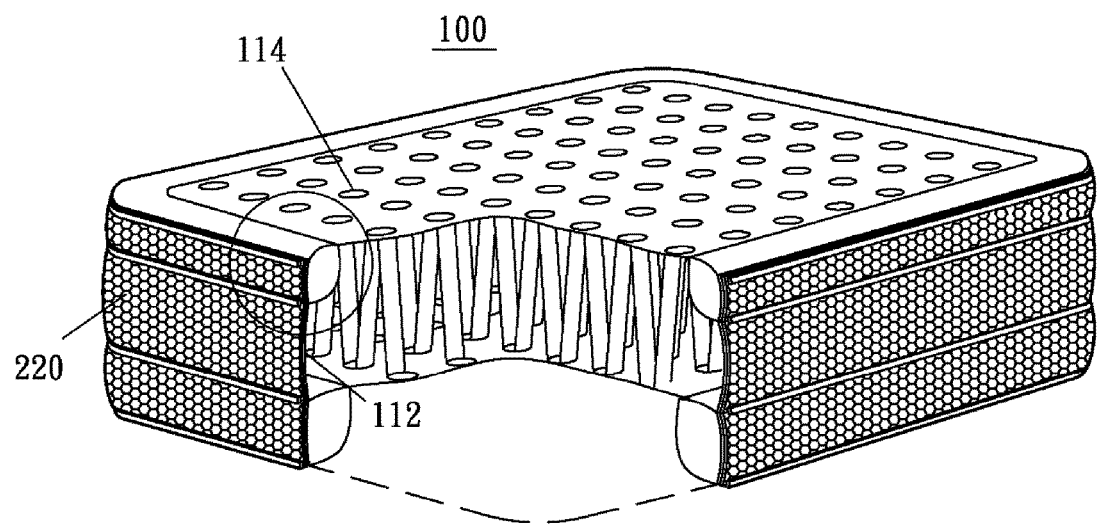
FIG. 31 is a schematic view of a twenty-sixth embodiment.
Figure 32:
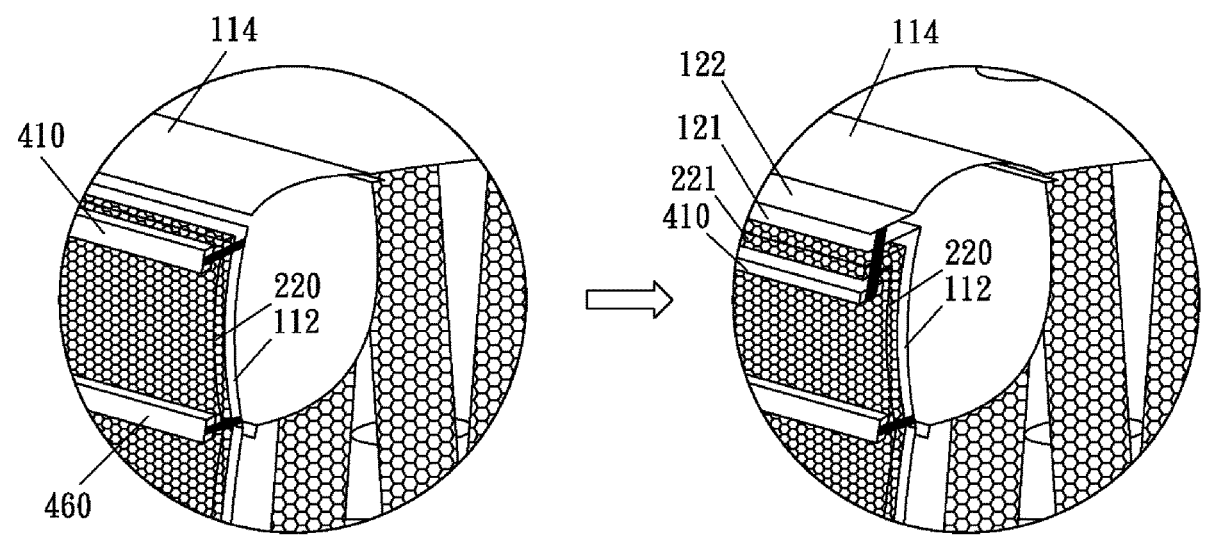
FIG. 32 is a schematic view of a portion of FIG. 31.

Referring to FIGS. 31-32, an inflatable bed includes a top sheet 114, a periphery sheet 112 and a bottom sheet, and peripheries of the three sheets are fused to form an inflatable body 100. Fusion units are formed between the top sheet 114 and the periphery sheet 112 as well as between the periphery sheet 112 and the bottom sheet. The fusion units includes a first fusion portion 121 formed on the periphery of the periphery sheet, a second fusion portion 122 formed on the periphery of the top sheet, and a second fusion portion (not shown) formed on the periphery of the bottom sheet.

The periphery sheet 112 is covered by an anti-stretch sheet, and the anti-stretch sheet includes a fusion reinforcement layer 220 with a first fusion portion 221 formed on the periphery thereof.

The inflatable bed further includes a plurality of airtight auxiliary fusion layers, and the airtight auxiliary fusion layers include an auxiliary fusion layer 410. The top sheet 114, the periphery sheet 112, the bottom sheet and the auxiliary fusion layer 410 are made of polyvinyl chloride (PVC), and the fusion reinforcement layer 220 is mesh fabric.

The first fusion portion 121 of the periphery sheet 112 is placed in contact with the first fusion portion 221 of the fusion reinforcement layer 220, the auxiliary fusion layer 410 is placed in contact with the first fusion portion 221 of the fusion reinforcement layer 220, and the first fusion portion 121 of the periphery sheet 112 is placed in contact with the second fusion portion 122 of the top sheet 114, so that they can be are firmly connected by fusion to form an angle at the fusion location. During the fusion, the first fusion portion 121 of the periphery sheet 112, the first fusion portion 221 of the fusion reinforcement layer 220 and the auxiliary fusion layer 410 are simultaneously fused and then are fused with the second fusion portion 122 of the top sheet 114.

The way that the first fusion portion of the periphery sheet 112 is fused with the second fusion portion of the bottom sheet and the first fusion portion of the fusion reinforcement layer 220 is similar to the above-mentioned way, and therefore the descriptions thereof are omitted.

Furthermore, middle of the fusion reinforcement layer 220 is provided with a plurality of auxiliary fusion layers 460 which are spaced and are firmly connected to the fusion reinforcement layer 220 and the periphery sheet 112 by fusion for improving the pressure bearing ability.

Twenty-seventh Embodiment

Figure 33:
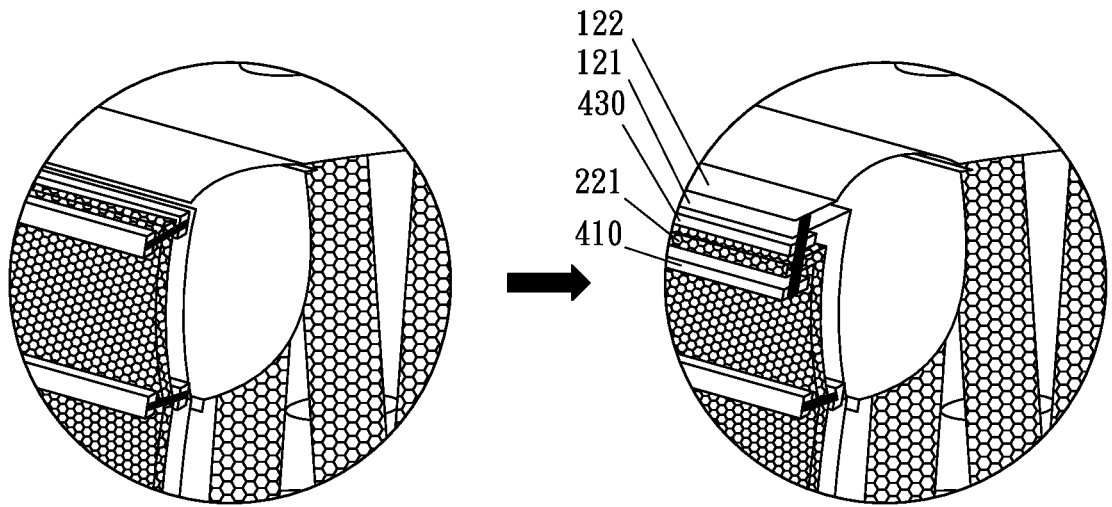
FIG. 33 is a schematic view of a twenty-seventh embodiment.

Referring to FIG. 33, the twenty-seventh embodiment is similar to the twenty-sixth embodiment, and the difference therebetween is that an auxiliary fusion layer 430 is additionally provided between the first fusion portion 121 of the periphery sheet and the first fusion portion 221 of the fusion reinforcement layer. During the fusion, the first fusion portion 121 of the periphery sheet, the auxiliary fusion layer 430, the first fusion portion 221 of the fusion reinforcement layer and the auxiliary fusion layer 410 are simultaneously fused and then are fused with the second fusion portion 122 of the top sheet.

Twenty-eighth Embodiment

Figure 34:
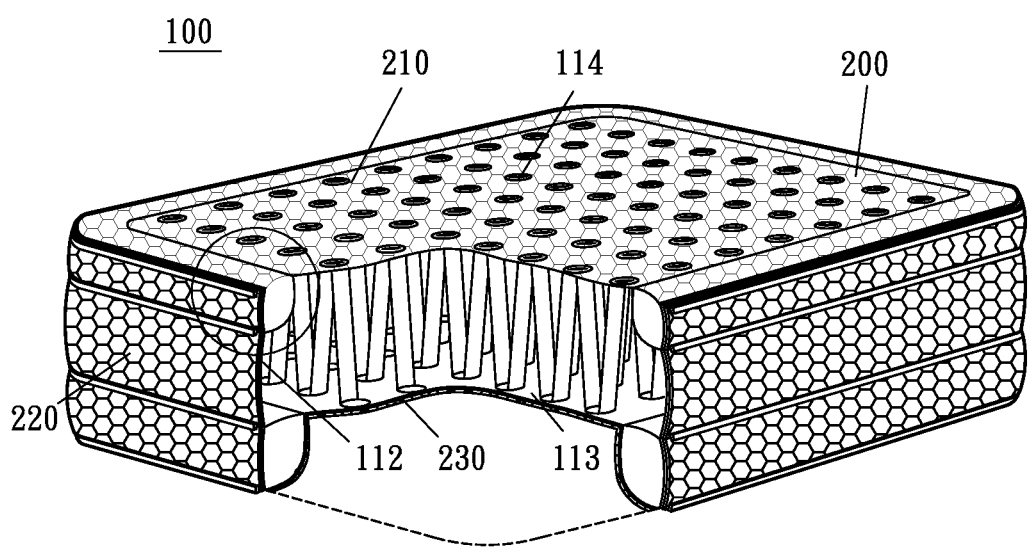
FIG. 34 is a schematic view of a twenty-eighth embodiment.
Figure 35:
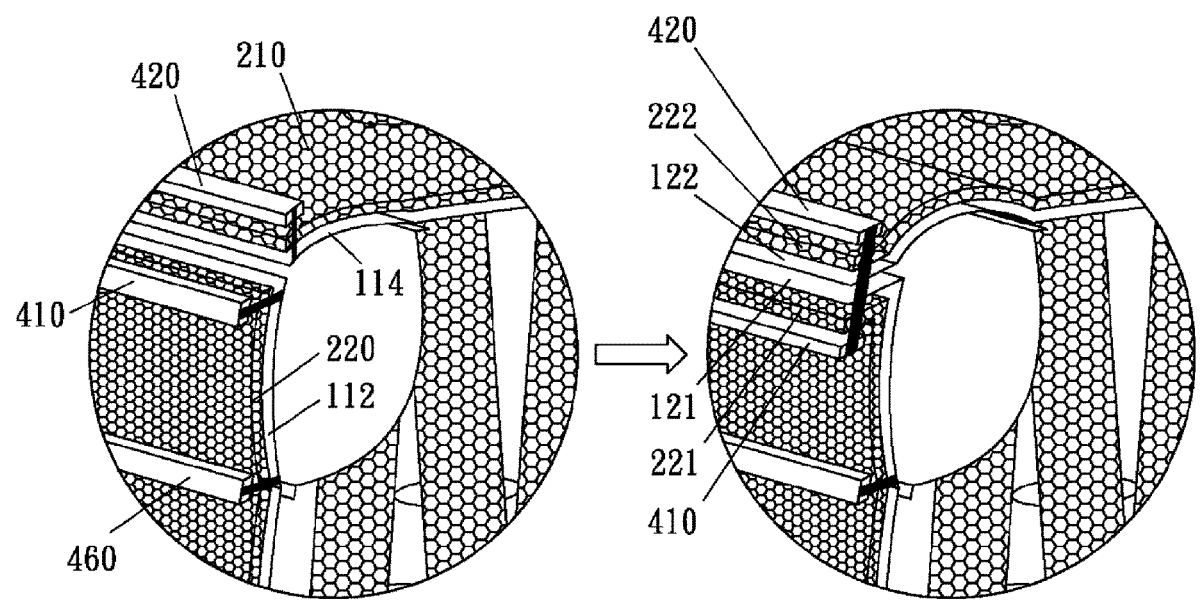
FIG. 35 is a schematic view of a portion of FIG. 34.

Referring to FIGS. 34-35, an inflatable bed includes a top sheet 114, a periphery sheet 112 and a bottom sheet 113, and peripheries of the three sheets are fused to form an inflatable body 100. Fusion portions are formed between the top sheet 114 and the periphery sheet 112 as well as between the periphery sheet 112 and the bottom sheet 113. The fusion portions includes a first fusion portion 121 formed on the periphery of the periphery sheet 112, a second fusion portion 122 formed on the periphery of the top sheet 114 and a second fusion portion (not shown) formed on the periphery of the bottom sheet 113.

The inflatable bed further includes an anti-stretch sheet 200, and the anti-stretch sheet 200 includes a fusion reinforcement layer 220 covering the periphery sheet 112, a fusion reinforcement layer 210 covering the top sheet 114 and a fusion reinforcement layer 230 covering the bottom sheet 113. A second fusion portion 222 is formed on periphery of the fusion reinforcement layer 210, a first fusion portion 221 is formed on periphery of the fusion reinforcement layer 220, and a second fusion portion is formed on periphery of the fusion reinforcement layer 230.

The inflatable bed further includes a plurality of airtight auxiliary fusion layers, and the airtight auxiliary fusion layers include an auxiliary fusion layer 410 and an auxiliary fusion layer 420. The top sheet 114, the periphery sheet 112, the bottom sheet 113 and the auxiliary fusion layers 410, 420 are made of polyvinyl chloride (PVC), and the fusion reinforcement layers 210, 220, 230 are mesh fabric.

The first fusion portion 121 of the periphery sheet 112 is placed in contact with the first fusion portion 221 of the fusion reinforcement layer 220, and the auxiliary fusion layer 410 is placed in contact with the first fusion portion 221 of the fusion reinforcement layer 220, so as to be connected by a first fusion. The second fusion portion 122 of the top sheet 114 is placed in contact with the second fusion portion 222 of the fusion reinforcement layer 210, and the auxiliary fusion layer 420 is placed in contact with the second fusion portion 222 of the fusion reinforcement layer 210, so as to be connected by a second fusion. The first fusion portion 121 of the periphery sheet 112 is placed in contact with the second fusion portion 122 of the top sheet 114. Then, the first fusion portion 121 and the second fusion portion 122 are firmly connected by the second fusion and have an angle at the fusion location after inflation of the inflatable body.

The way to fuse the first fusion portion of the periphery sheet 112, the second fusion portion of the bottom sheet 113, the first fusion portion 221 of the fusion reinforcement layer 220 and the second fusion portion of the fusion reinforcement layer 230 is similar to the above-mentioned way, and therefore the descriptions thereof are omitted.

Furthermore, middle of the fusion reinforcement layer 220 is provided with a plurality of auxiliary fusion layers 460 which are spaced and are firmly connected to the fusion reinforcement layer 220 and the periphery sheet 112 by fusion for improving the pressure bearing ability.

Twenty-ninth Embodiment

Figure 36:
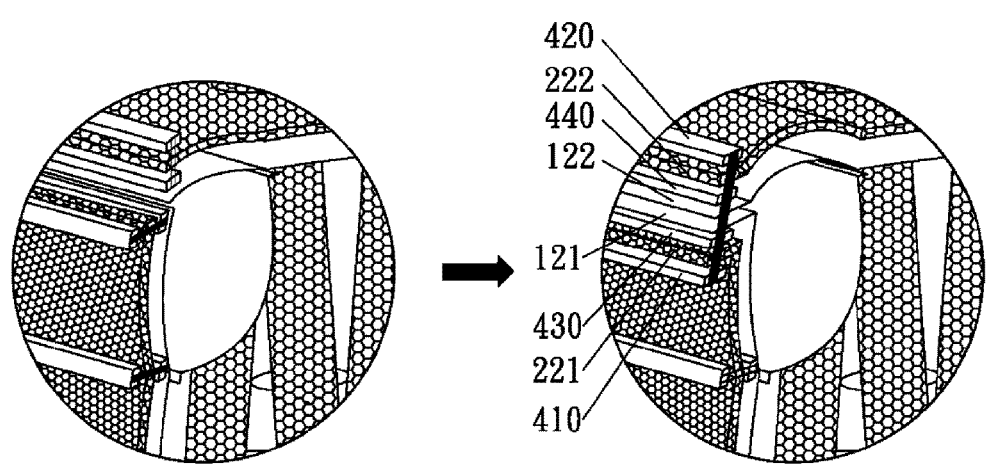
FIG. 36 is a schematic view of a twenty-ninth embodiment.

Referring to FIG. 36, the twenty-ninth embodiment is similar to the twenty-eighth embodiment, and the difference therebetween is that an auxiliary fusion layer 430 is additionally provided between the first fusion portion 121 of the periphery sheet and the first fusion portion 221 of the fusion reinforcement layer, an auxiliary fusion layer 440 is additionally provided between the second fusion portion 122 of the top sheet and the second fusion portion 222 of the fusion reinforcement layer, and an auxiliary fusion layer (not shown) is additionally provided between the second fusion portion of the bottom sheet and the second fusion portion of the fusion reinforcement layer.

Thirtieth Embodiment

Figure 37:
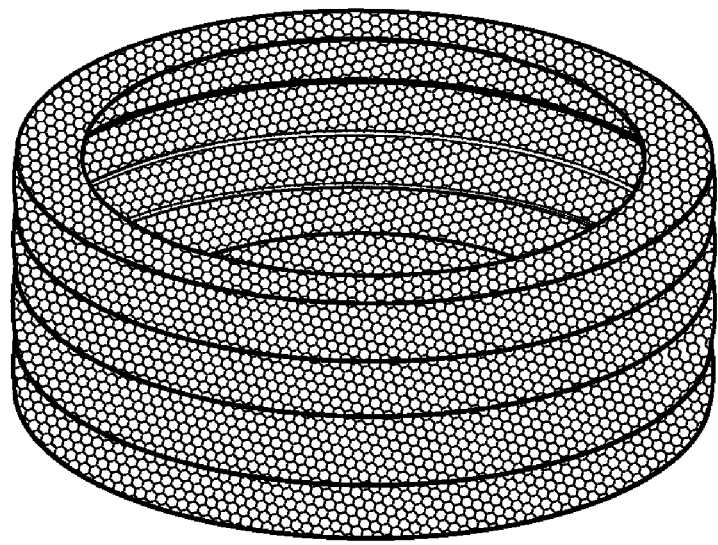
FIG. 37 is a schematic view of a thirtieth embodiment.
Figure 38:
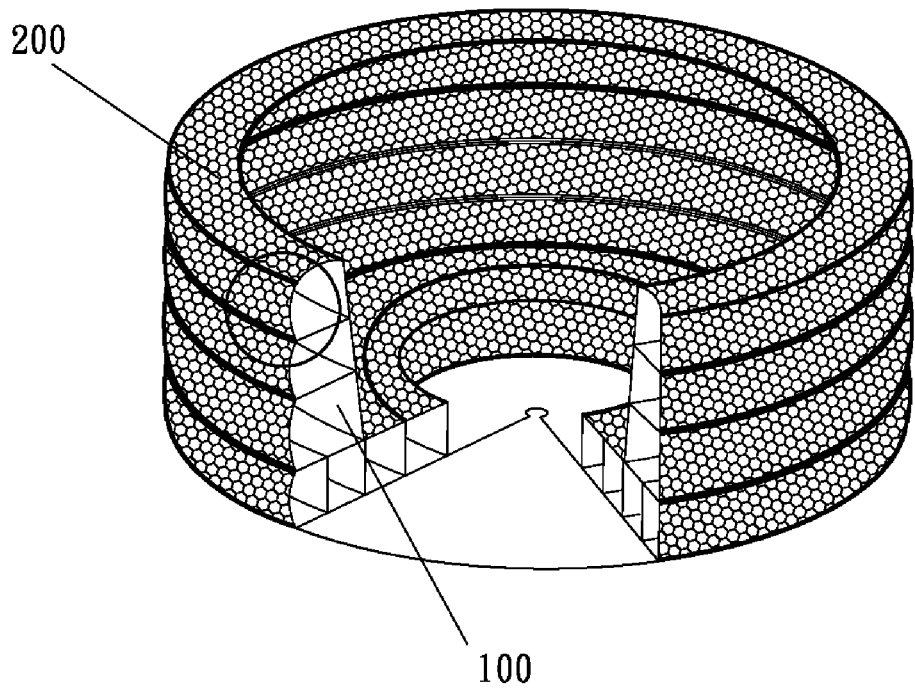
FIG. 38 is a schematic view of the thirtieth embodiment.
Figure 39:
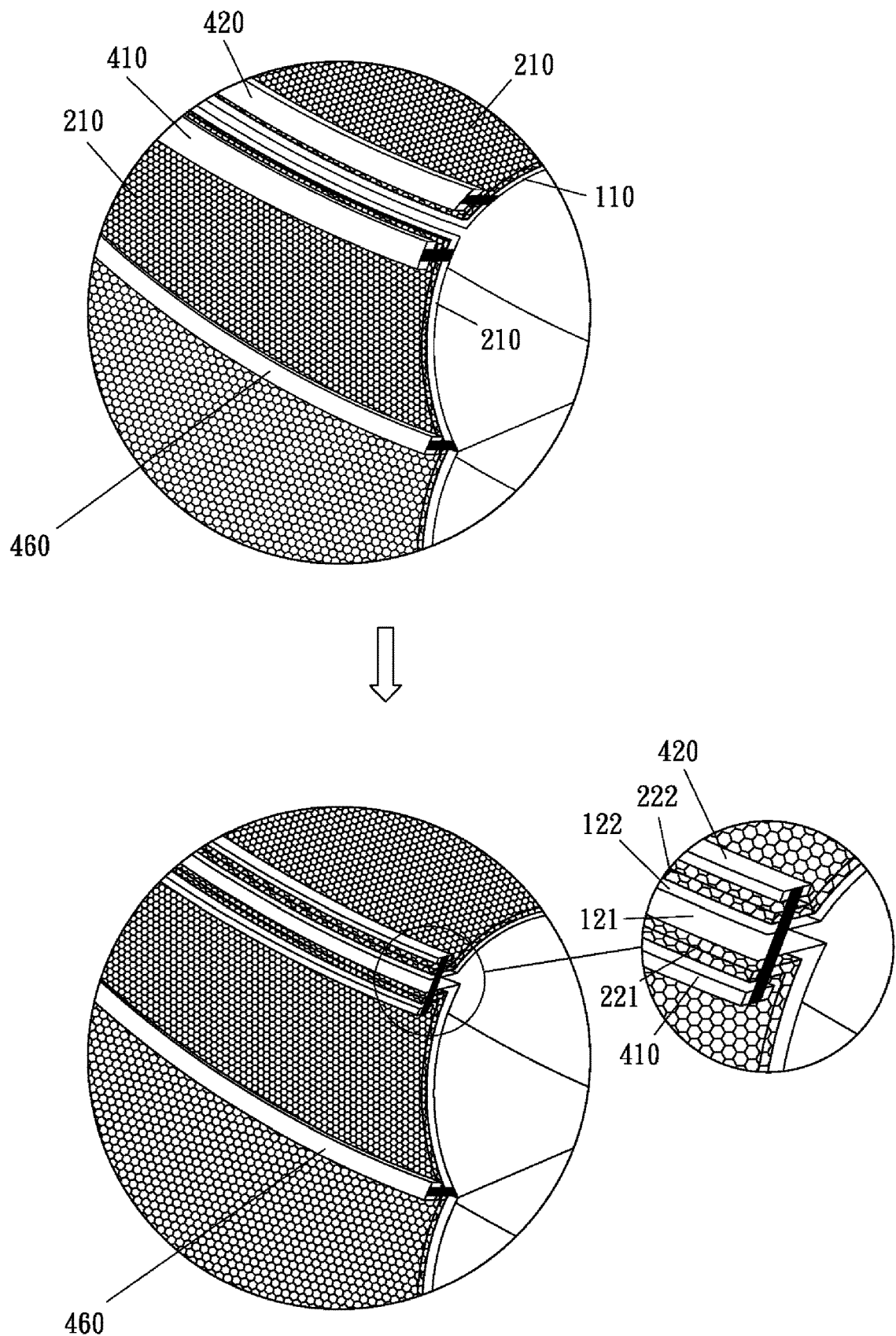
FIG. 39 is a schematic view of a portion of FIG. 38.

Referring to FIGS. 37-39, an inflatable pool includes an inflatable body 100. The inflatable body 100 is formed by fusing a plurality of target fusion layers 110, and a fusion portion is formed thereon. The fusion portion includes a first fusion portion 121 and a second fusion portion 122.

An anti-stretch sheet 200 is disposed outside the inflatable body 100 for covering the inflatable body 100. The anti-stretch sheet 200 includes a plurality of fusion reinforcement layers 210, and a fusion portion is formed thereon. The fusion portion includes a first fusion portion 221 and a second fusion portion 222.

The inflatable pool further includes a plurality of airtight auxiliary fusion layers which are firmly connected to the fusion portion of the inflatable body and the fusion portion of the anti-stretch sheet by fusion. The airtight auxiliary fusion layers include auxiliary fusion layers 410, 420. The target fusion layers 110 and the auxiliary fusion layers 410, 420 are made of polyvinyl chloride (PVC), and the fusion reinforcement layers 210 are mesh fabric.

The first fusion portion 121 and the second fusion portion 122 of the target fusion layers 110 are placed in contact with each other, the first fusion portion 221 and the second fusion portion 222 of the fusion reinforcement layers 210 are respectively placed in contact with the first fusion portion 121 and the second fusion portion 122 of the target fusion layers 110, and the auxiliary fusion layers 410, 420 are respectively placed in contact with the first fusion portion 221 and the second fusion portion 222 of the fusion reinforcement layers 210, so that they can be firmly connected by fusion and have an angle at the fusion locations. During the fusion, the first fusion portion 121 of the target fusion layers 110, the first fusion portion 221 of the fusion reinforcement layers 210 and the auxiliary fusion layer 410 are simultaneously fused, the second fusion portion 122 of the target fusion layers 110, the second fusion portion 222 of the fusion reinforcement layers 210 and the auxiliary fusion layer 420 are simultaneously fused, and then the above-mentioned structures which are individually fused have their fused portions firmly connected by further fusion.

Furthermore, middle of the fusion reinforcement layer 210 is provided with a plurality of auxiliary fusion layers 460 which are spaced and are firmly connected to the fusion reinforcement layer 210 and the target fusion layer 110 by fusion for improving the pressure bearing ability.

Thirty-first Embodiment

Figure 40:
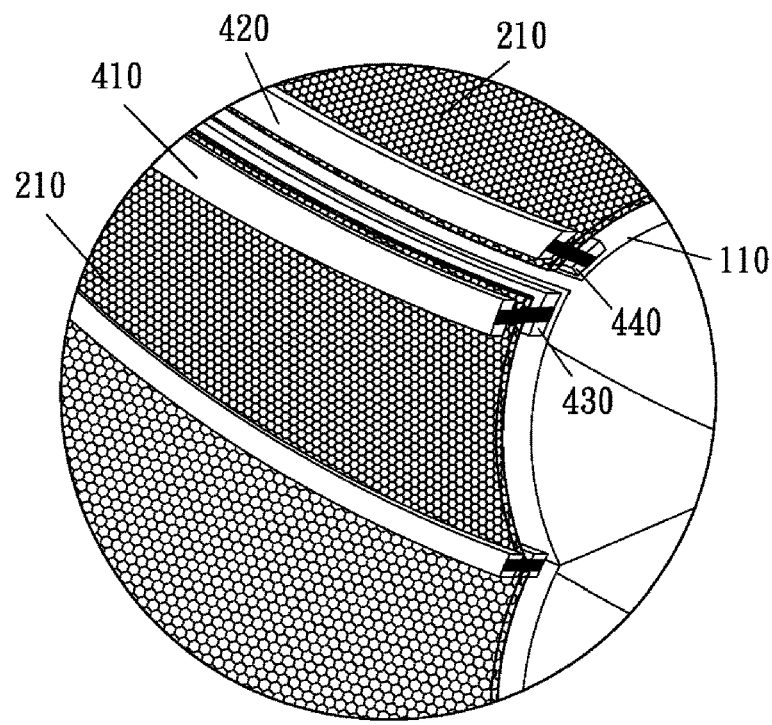
FIG. 40 is a schematic view of a thirty-first embodiment.
Figure 40:
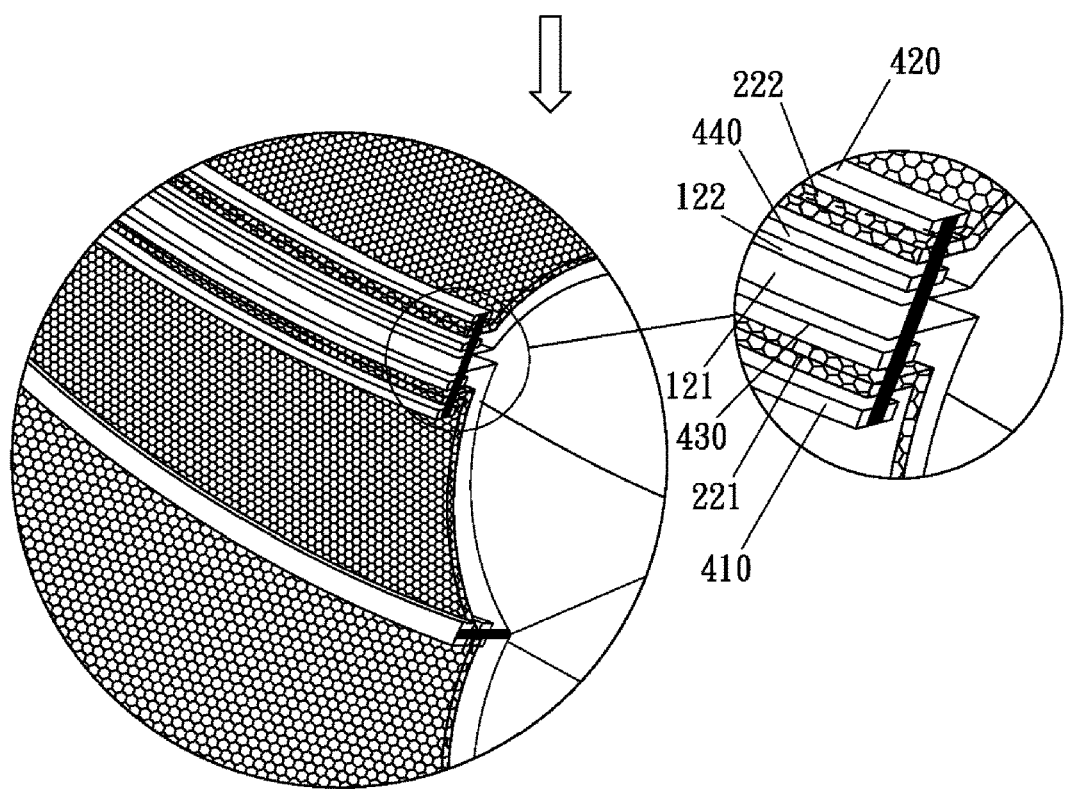

Referring to FIG. 40, the thirty-first embodiment is similar to the thirtieth embodiment, and the difference therebetween is that an auxiliary fusion layer 430 is additionally provided between the first fusion portion 121 of the target fusion layer 110 and the first fusion portion 221 of the fusion reinforcement layer 210, and an auxiliary fusion layer 440 is additionally provided between the second fusion portion 122 of the target fusion layer 110 and first fusion portion 222 of the fusion reinforcement layer 210.

Thirty-second Embodiment

Figure 41:
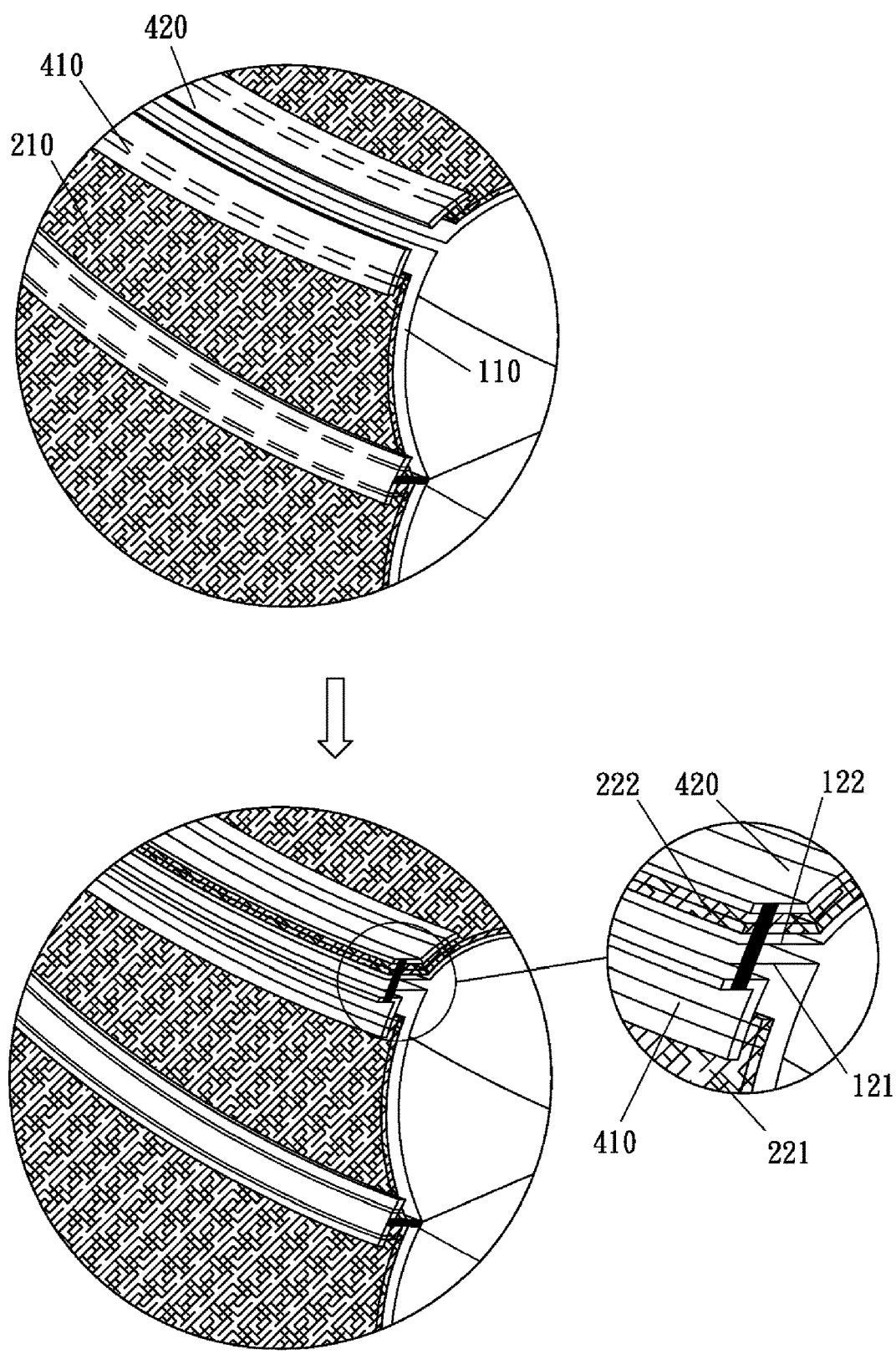
FIG. 41 is a schematic view of a thirty-second embodiment.

Referring to FIG. 41, the thirty-second embodiment is similar to the thirtieth embodiment, and the difference therebetween is that during the fusion, the first fusion portion 221 of the fusion reinforcement layer 210 and the auxiliary fusion layer 410 are fixed by sewing, the first fusion portion 222 of the fusion reinforcement layer 210 and the auxiliary fusion layer 420 are fixed by sewing, and the first fusion portion 121 and the second fusion portion 122 of the target fusion layer 110 are placed in contact with each other and then fused together to fix the whole fused portion.

Thirty-third Embodiment

Figure 42A:
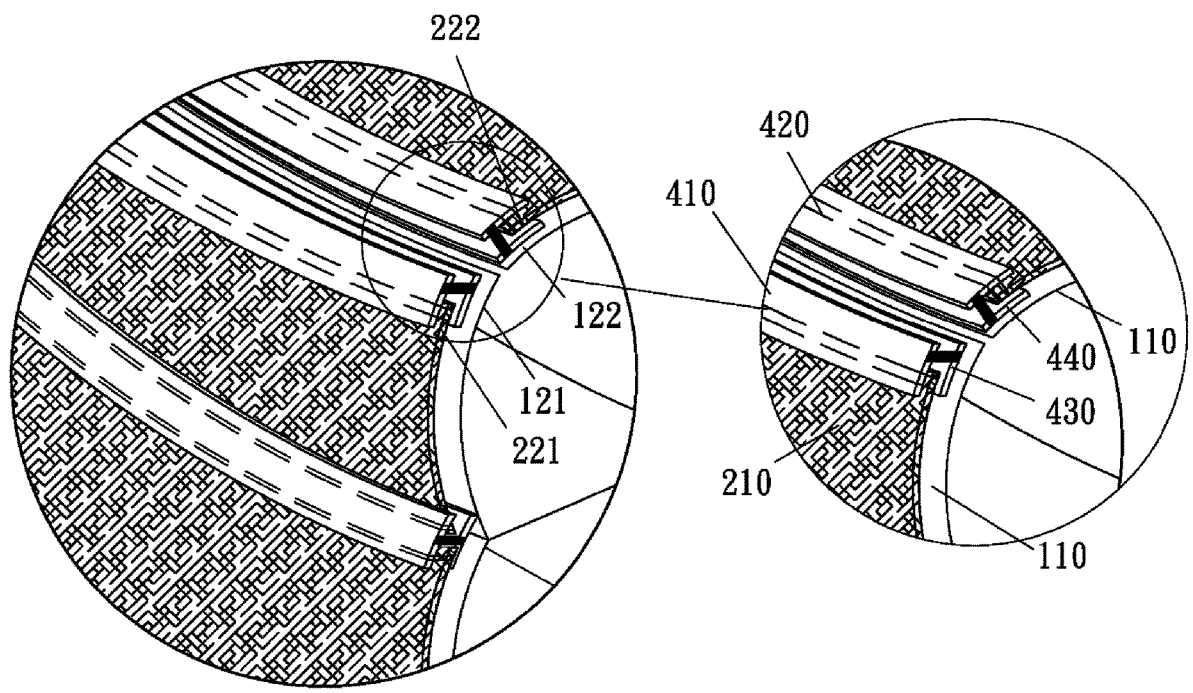
FIG. 42 is a schematic view of a thirty-third embodiment (FIG. 42a shows the sewing and fusion at an early stage, and FIG. 42b shows all the fusion at a late stage)
Figure 42A:
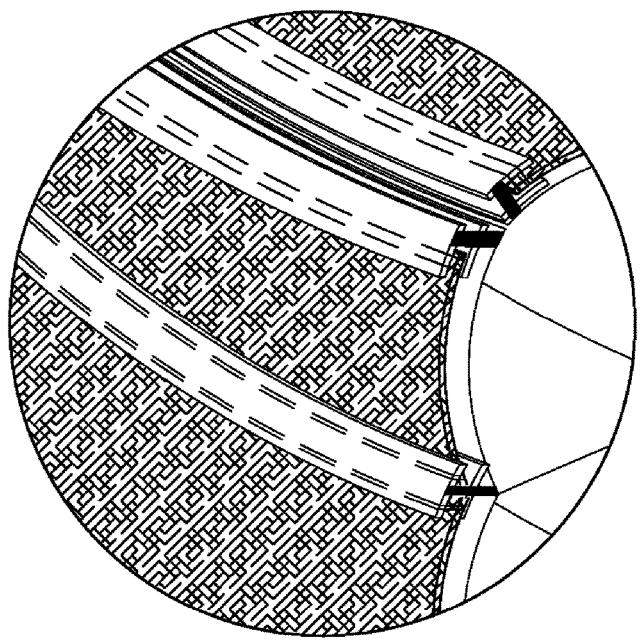
Figure 42B:
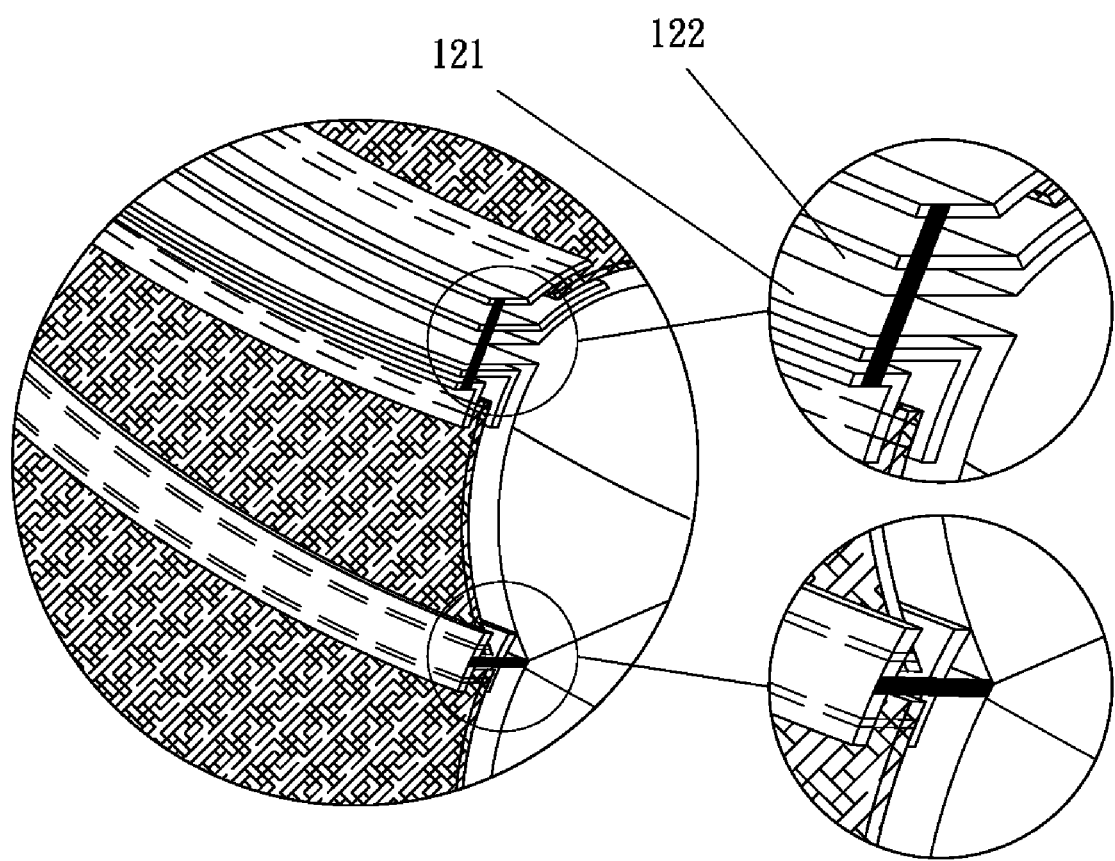

Referring to FIG. 42a, the thirty-third embodiment is similar to the thirty-first embodiment, and the difference therebetween is that during the fusion, the first fusion portion 221 of the fusion reinforcement layer 210 and the auxiliary fusion layer 410 are fixed by sewing, the auxiliary fusion layer 410 and the auxiliary fusion layer 430 are firmly connected by fusion and are then firmly connected to the first fusion portion 121 of the target fusion layer 110 by further fusion, the second fusion portion 222 of the fusion reinforcement layer 210 and the auxiliary fusion layer 420 are fixed by sewing, and the auxiliary fusion layer 420 and the auxiliary fusion layer 440 are firmly connected by fusion and are then firmly connected to the second fusion portion 122 of the target fusion layer 110 by further fusion. Referring to FIG. 42b, the first fusion portion 121 and the second fusion portion 122 of the target fusion layer 110 are placed in contact with each other, and then fused together to fix the whole fused portion.

Thirty-fourth Embodiment

Figure 43A:
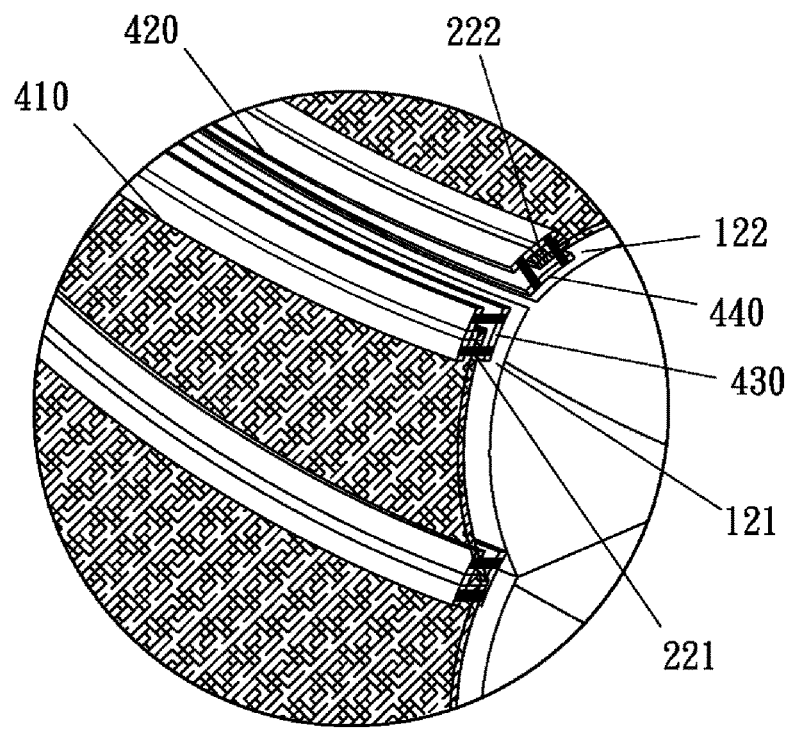
FIG. 43 is a schematic view of a thirty-fourth embodiment (FIG. 43a shows the sewing and fusion at an early stage, and FIG. 43b shows all the fusion at a late stage)
Figure 43A:
Figure 43A:
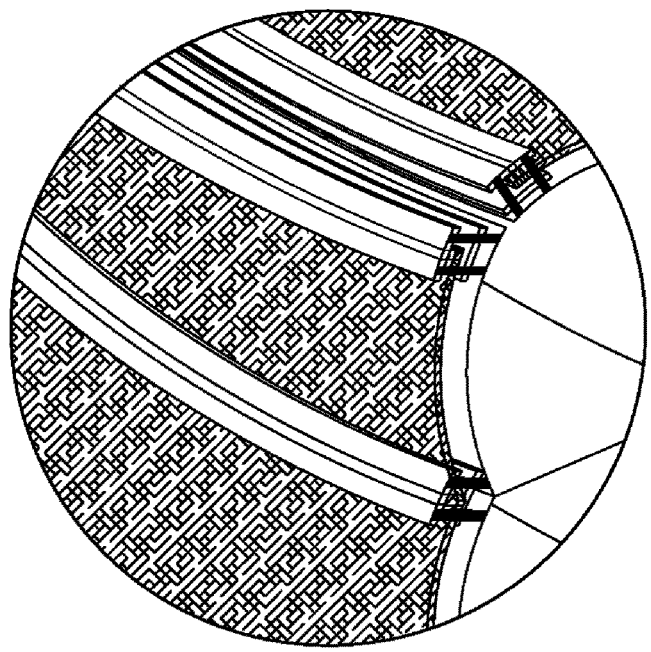
Figure 43B:
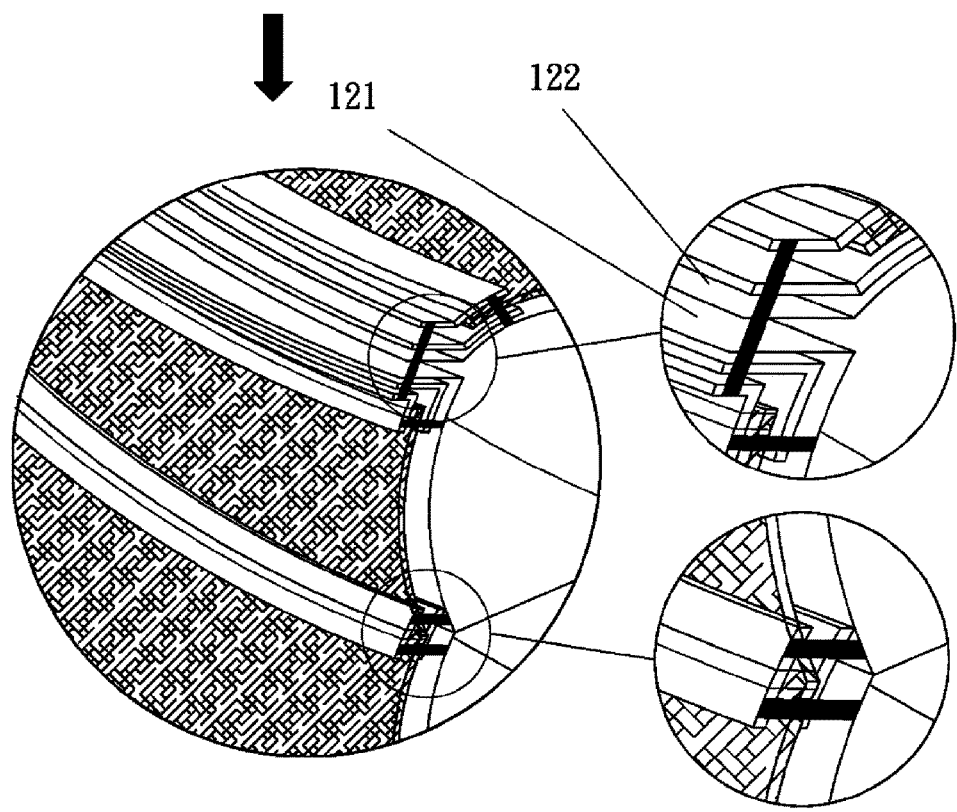

Referring to FIG. 43a, the thirty-fourth embodiment is similar to the thirty-third embodiment, and the difference therebetween is that during the fusion, the first fusion portion 221 of the fusion reinforcement layer and the auxiliary fusion layer 410 are fixed by sewing, the auxiliary fusion layer 410 and the auxiliary fusion layer 430 are firmly connected by fusion (fused at two different locations) and are then firmly connected to the first fusion portion 121 of the target fusion layer by further fusion, the second fusion portion 222 of the fusion reinforcement layer and the auxiliary fusion layer 420 are fixed by sewing, and the auxiliary fusion layer 420 and the auxiliary fusion layer 440 are firmly connected by fusion (fused at two different locations) and are then firmly connected to the second fusion portion 122 of the target fusion layer by further fusion. Referring to FIG. 43b, the first fusion portion 121 and the second fusion portion 122 of the target fusion layer are placed in contact with each other to fix the whole fused portion.

Thirty-fifth Embodiment

Figure 44:
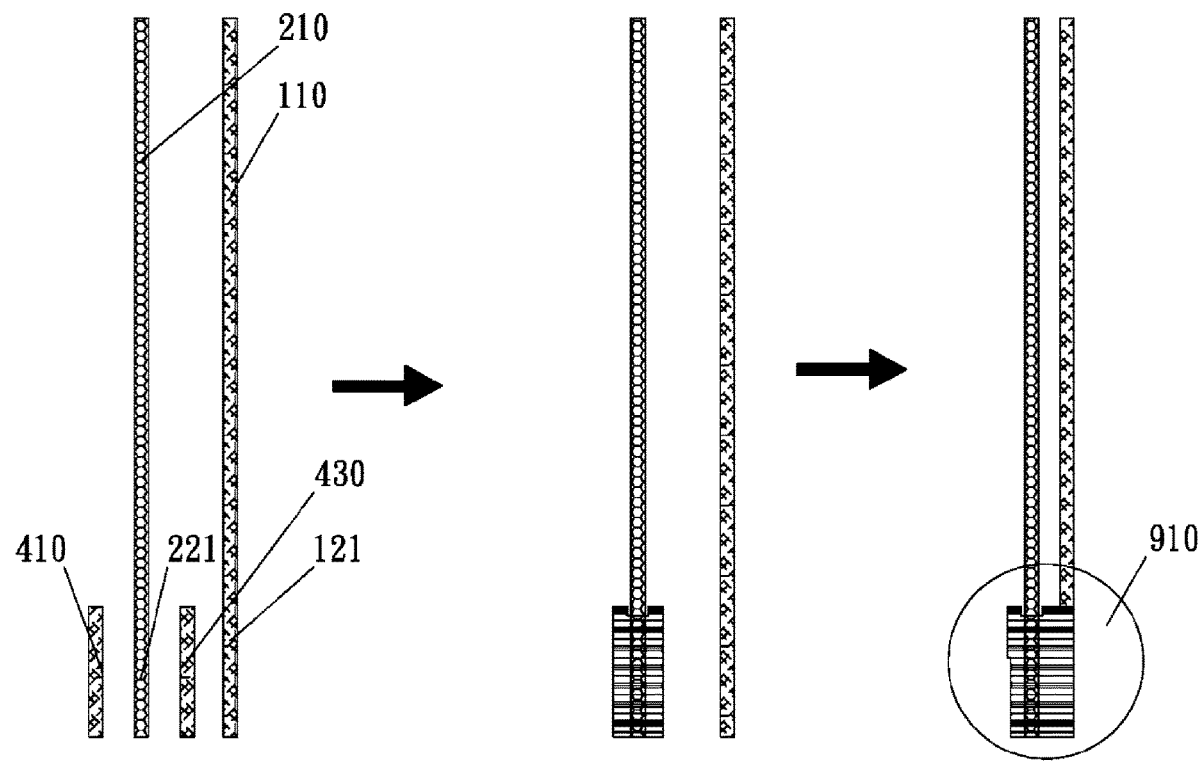
FIG. 44 is a schematic view of a thirty-fifth embodiment.

Referring to FIG. 44, fusion portions of an inflatable product are formed as a fusion structure, and the fusion structure includes a first fusion unit 910 and a second fusion unit (FIG. 44 shows the first fusion unit 910 but does not show the second fusion unit) which are welded to each other. As shown in FIG. 44, the way to produce the first fusion unit is that an auxiliary fusion layer 410 and an auxiliary fusion layer 430 are placed to firmly hold a fusion portion 221 of an anti-stretch sheet and are then firmly connected to a fusion portion 121 of an inflatable body by fusion. The anti-stretch sheet includes a target fusion layer 210, and the inflatable body includes a target fusion layer 110. The way to produce the second fusion unit is same as that to produce the first fusion unit.

Thirty-sixth Embodiment

Figure 45:
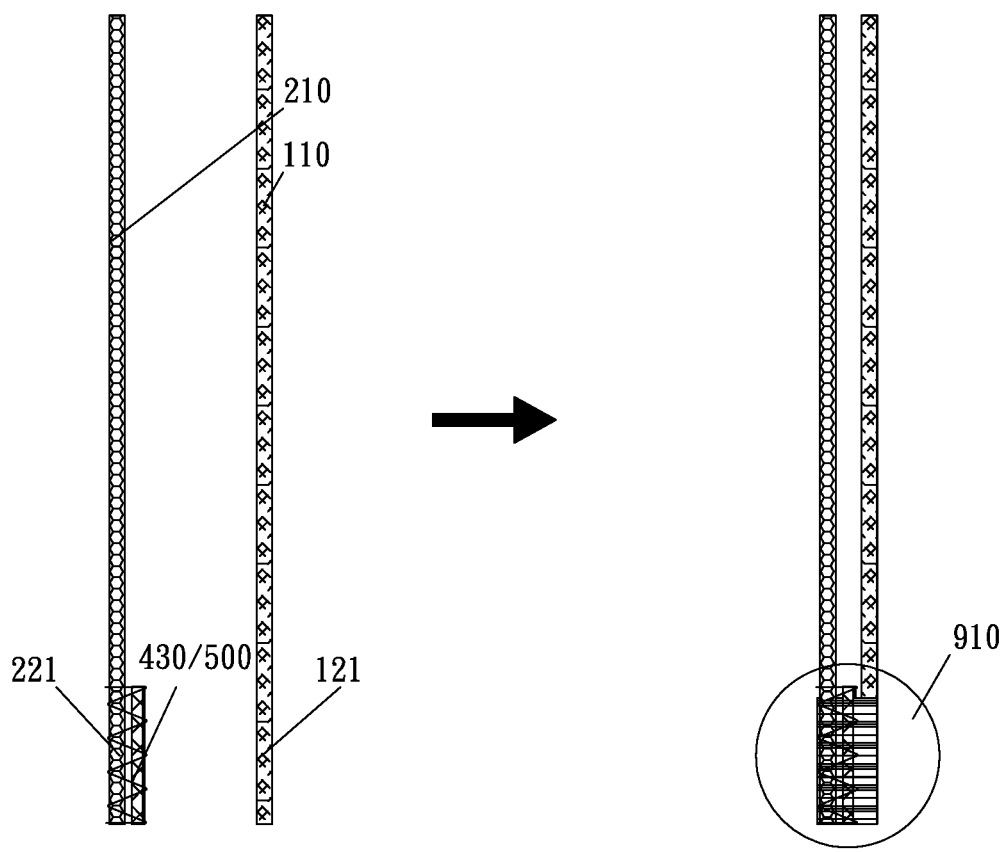
FIG. 45 is a schematic view of a thirty-sixth embodiment.

Referring to FIG. 45, fusion portions of an inflatable product are formed as a fusion structure, and the fusion structure includes a first fusion unit 910 and a second fusion unit (FIG. 45 shows the first fusion unit 910 but does not show the second fusion unit) which are fused with each other. As shown in FIG. 45, the way to produce the first fusion unit is that an auxiliary fusion layer 430 or a fusion reinforcement layer 500 is fixed to a fusion portion 221 of an anti-stretch sheet by sewing and is then firmly connected to a fusion portion 121 of an inflatable body by fusion. The fusion portion 121 of the inflatable body is placed in contact with the auxiliary fusion layer 430 or the fusion reinforcement layer 500. The anti-stretch sheet includes a target fusion layer 210, and the inflatable body includes a target fusion layer 110. The way to produce the second fusion unit is same as that to produce the first fusion unit.

Thirty-seventh Embodiment

Figure 46:
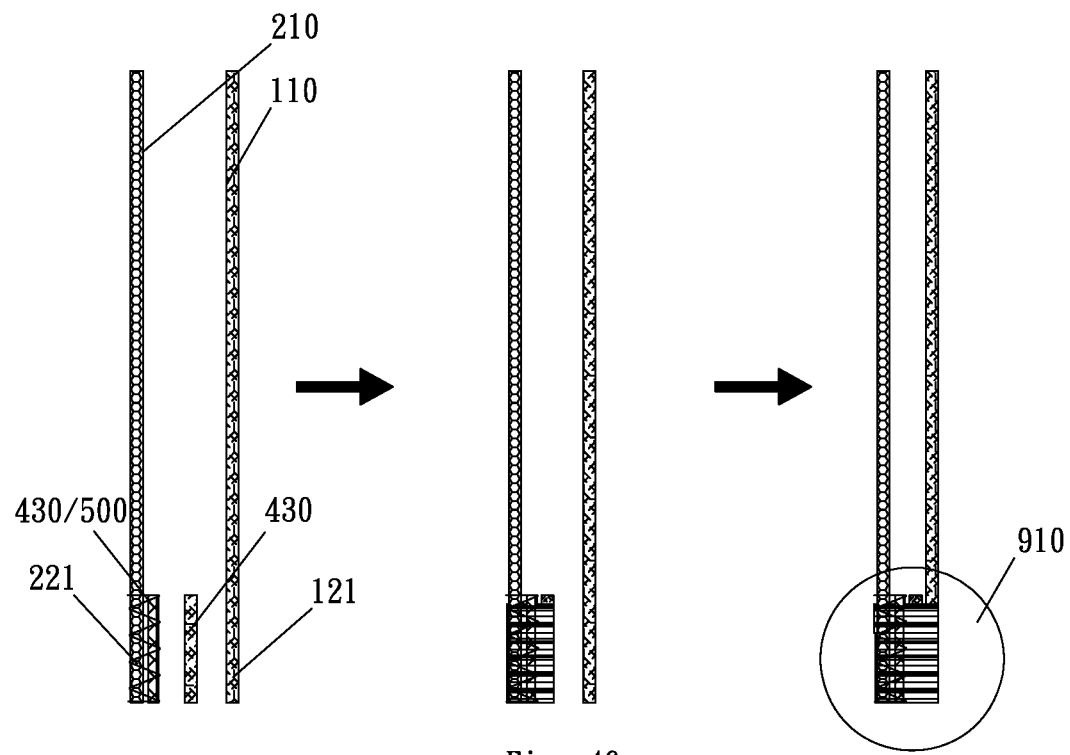
FIG. 46 is a schematic view of a thirty-seventh embodiment.

Referring to FIG. 46, fusion portions of an inflatable product are formed as a fusion structure, and the fusion structure includes a first fusion unit 910 and a second fusion unit (FIG. 46 shows the first fusion unit 910 but does not show the second fusion unit) which are fused with each other. The way to produce the first fusion unit is that an auxiliary fusion layer 430 or a fusion reinforcement layer 500 is fixed to a fusion portion 221 of an anti-stretch sheet by sewing, is fixed to another auxiliary fusion layer 430, and is firmly connected to a fusion portion 121 of an inflatable body by fusion. The fusion portion 121 of the inflatable body is placed in contact with another auxiliary fusion layer 430. The anti-stretch sheet includes a target fusion layer 210, and the inflatable body includes a target fusion layer 110. The way to produce the second fusion unit is same as that to produce the first fusion unit.

Thirty-eighth Embodiment

Figure 47:
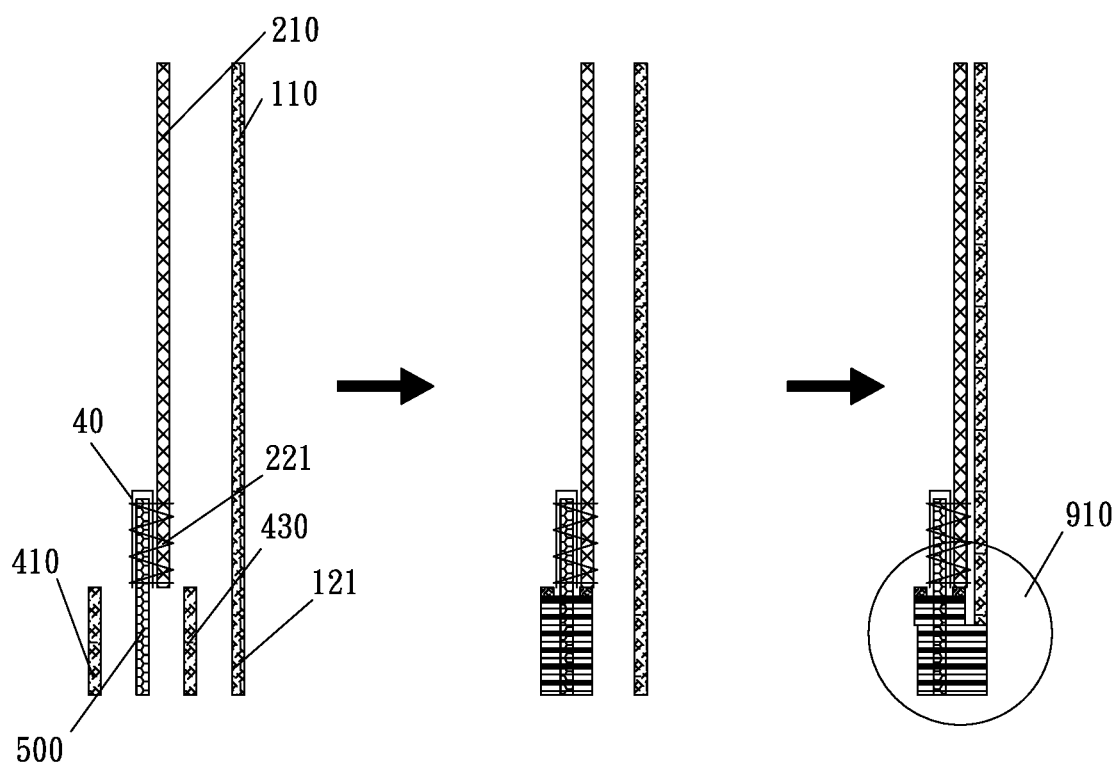
FIG. 47 is a schematic view of a thirty-eighth embodiment.

Referring to FIG. 47, fusion portions of an inflatable product are formed as a fusion structure, and the fusion structure includes a first fusion unit 910 and a second fusion unit (FIG. 46 shows the first fusion unit 910 but does not show the second fusion unit) which are fused with each other. The way to produce the first fusion unit is that a portion of a fusion reinforcement layer 500 is wrapped by a cloth 40 and is fixed to a fusion portion 221 of an anti-stretch sheet by sewing, and another portion of the fusion reinforcement layer 500 which is not wrapped by the cloth 40 is firmly held between two auxiliary fusion layers 410, 430 and is firmly connected to a fusion portion 121 of an inflatable body by fusion. The fusion portion 121 of the inflatable body is placed in contact with the auxiliary fusion layer 430. The anti-stretch sheet includes a target fusion layer 210, and the inflatable body includes a target fusion layer 110. The way to produce the second fusion unit is same as that to produce the first fusion unit.

Thirty-ninth Embodiment

Figure 48:
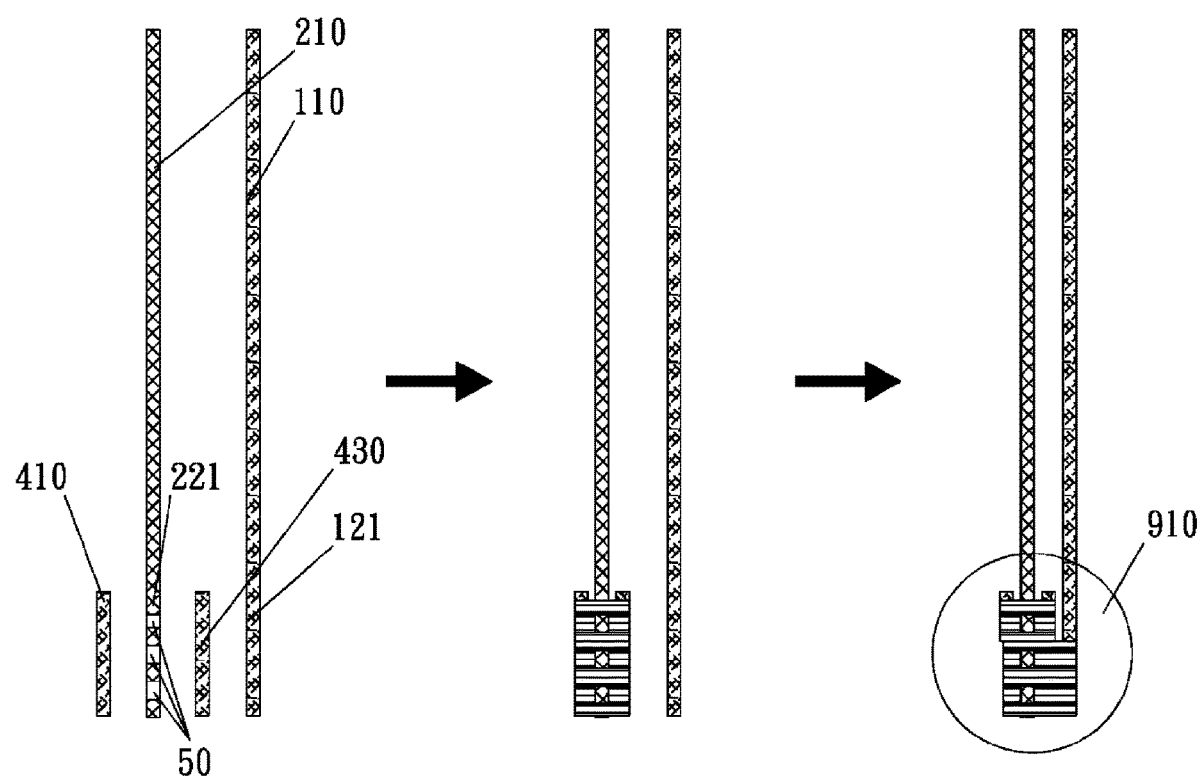
FIG. 48 is a schematic view of a thirty-ninth embodiment.

Referring to FIG. 48, the structure of a first fusion unit is similar to that of the thirty-fifth embodiment, and the difference therebetween is that the fusion portion 221 of the anti-stretch sheet is provided with a punch hole 50.

It is apparent that the above-described embodiments of the invention are merely examples for clearly illustrating the invention and does not limit the applications of the invention. For those skilled in the art, variations or modifications of other different forms may be made in light of the above description. There is no need and possibility to exhaust all of the applications. Any modifications, equivalent replacement and improvement without departing from the spirit and principles of the invention are intended to fall within the scope of the appended claims.

What is claimed is:
1. An inflatable product comprising:
a first sheet; and
a second sheet;
wherein the first sheet and the second sheet are connected by a fusion structure; the fusion structure comprises at least one fusion unit; the fusion unit comprises a target fusion layer, at least one fusion reinforcement layer and at least one auxiliary fusion layer which are fused together; the fusion reinforcement layer and the auxiliary fusion layer are alternately disposed at a side of the target fusion layer, or both the fusion reinforcement layer and the auxiliary fusion layer are alternately disposed at each of two sides of the target fusion layer; a material of the target fusion layer is the same as or compatible with that of the auxiliary fusion layer;
wherein an air chamber is formed between the first sheet and the second sheet, an anti-stretch sheet is disposed within and/or outside the air chamber, and the anti-stretch sheet is fixed to the fusion structure for covering the air chamber or being covered by the air chamber;
wherein the fusion unit comprises a target fusion layer, a second auxiliary fusion layer, a first fusion reinforcement layer and a first auxiliary fusion layer which are sequentially arranged; a portion of the first fusion reinforcement layer is wrapped by a cloth and is then fixed to the anti-stretch sheet by sewing; the target fusion layer, the second auxiliary fusion layer, an unwrapped portion of the first fusion reinforcement layer that is not wrapped by the cloth, and the first auxiliary fusion layer are connected by fusion, and the anti-stretch sheet covers the target fusion layer.
2. An inflatable product comprising:
an air chamber that is expandable during inflation, comprising a first fusion portion;
an anti-stretch sheet comprising a second fusion portion fixed to the first fusion portion of the air chamber;
an auxiliary fusion layer;
a cloth;
a fusion reinforcement layer comprising a first portion and a second portion;
wherein the anti-stretch sheet is configured to restrict expansion of the air chamber during inflation, thereby protecting connection between the first fusion portion and the second fusion portion from failure;

wherein the first portion of the fusion reinforcement layer is wrapped by the cloth and is fixed to the anti-stretch sheet by sewing;

wherein the auxiliary fusion layer is configured to fix the second portion of the fusion reinforcement layer to the air chamber by fusion.

3. An inflatable product, comprising:

an air chamber that is expandable during inflation, comprising a first fusion portion;

an anti-stretch sheet comprising a second fusion portion fixed to the first fusion portion of the air chamber;

an auxiliary fusion layer;

a cloth;

a fusion reinforcement layer comprising a first portion and a second portion;

wherein the anti-stretch sheet is made of fabric so as to be stretched less than the air chamber under a same magnitude of tension;

wherein the anti-stretch sheet is configured to restrict expansion of the air chamber during inflation, thereby protecting connection between the first fusion portion and the second fusion portion from failure;

wherein the first portion, the cloth and the anti-stretch sheet are fixed together by sewing;

wherein the auxiliary fusion layer is configured to fix the second portion of the fusion reinforcement layer to the air chamber by fusion.

* * * * *